(12) United States Patent
Ikeda et al.

(10) Patent No.: US 11,703,941 B2
(45) Date of Patent: *Jul. 18, 2023

(54) INFORMATION PROCESSING SYSTEM, INFORMATION PROCESSING METHOD, AND PROGRAM

(71) Applicant: SONY CORPORATION, Tokyo (JP)

(72) Inventors: Tetsuo Ikeda, Tokyo (JP); Yusuke Sakai, Kanagawa (JP); Haruo Oba, Kanagawa (JP); Makoto Niijima, Saitama (JP); Tomohiro Ishii, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/355,561

(22) Filed: Jun. 23, 2021

(65) Prior Publication Data
US 2021/0318749 A1    Oct. 14, 2021

Related U.S. Application Data

(63) Continuation of application No. 16/616,683, filed as application No. PCT/JP2018/016509 on Apr. 24, 2018, now Pat. No. 11,048,326.

(30) Foreign Application Priority Data

Jun. 12, 2017 (JP) ................. 2017-115265

(51) Int. Cl.
*G06F 3/01* (2006.01)
*G06F 3/16* (2006.01)
(Continued)

(52) U.S. Cl.
CPC ............. *G06F 3/011* (2013.01); *G06F 3/165* (2013.01); *G06V 40/107* (2022.01); *G06V 40/28* (2022.01)

(58) Field of Classification Search
None
See application file for complete search history.

(56) References Cited

U.S. PATENT DOCUMENTS

2016/0055675 A1    2/2016 Kasahara et al.
2017/0228981 A1*   8/2017 Van Asdale ........... G07F 17/322

FOREIGN PATENT DOCUMENTS

CN    102301317 A    12/2011
CN    102460373 A    5/2012
(Continued)

OTHER PUBLICATIONS

Mar. 29, 2023, Chinese Office Action issued for related CN Application No. 201880037496.6.

*Primary Examiner* — Duane N Taylor, Jr.
(74) *Attorney, Agent, or Firm* — Paratus Law Group, PLLC

(57) ABSTRACT

There is provided an information processing system, method, and program capable of displaying an image corresponding to an operation body in a certain place adaptively generated for an operation of the operation body in another place, the system including an information acquisition unit configured to acquire first transmission information according to an operation of an operation body related to a first user located in a first place, the first transmission information being for communication with a second user located in a second place, and an output control unit configured to display, on a display surface in the second place, an image corresponding to the operation body generated based on a pointing position of the operation body in the second place and a first virtual position of the first user in the second place, the pointing position and the first virtual position being specified based on the first transmission information.

14 Claims, 83 Drawing Sheets

(51) Int. Cl.
 *G06V 40/20* (2022.01)
 *G06V 40/10* (2022.01)

(56) References Cited

FOREIGN PATENT DOCUMENTS

| | | |
|---|---|---|
| CN | 102693047 A | 9/2012 |
| EP | 1883238 A2 | 1/2008 |
| JP | H11-224152 A | 8/1999 |
| JP | 2000-231644 A | 8/2000 |
| JP | 2010-170354 A | 8/2010 |
| JP | 2011-145794 A | 7/2011 |
| JP | 2015-228054 A | 12/2015 |
| JP | 2015-228256 A | 12/2015 |
| JP | 2017-034658 A | 2/2017 |
| WO | WO 2012/081194 A1 | 6/2012 |
| WO | WO 2016/002445 A1 | 1/2016 |
| WO | WO 2017/033544 A1 | 3/2017 |

\* cited by examiner

FIG. 7
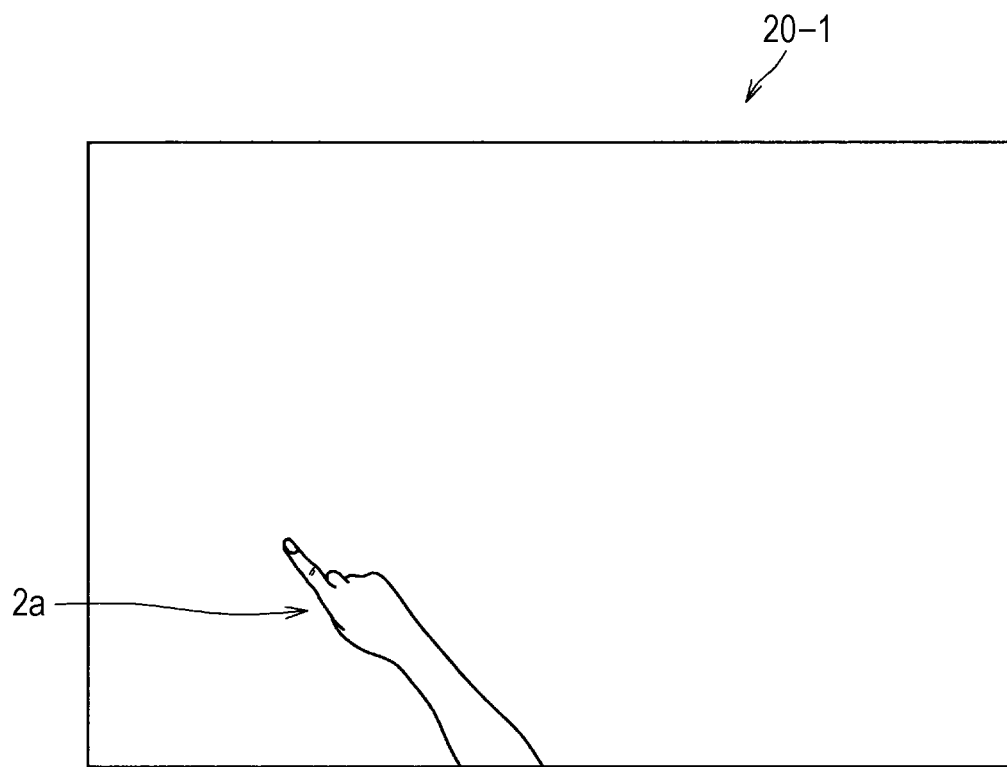
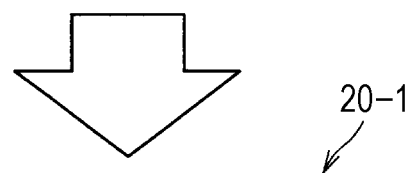
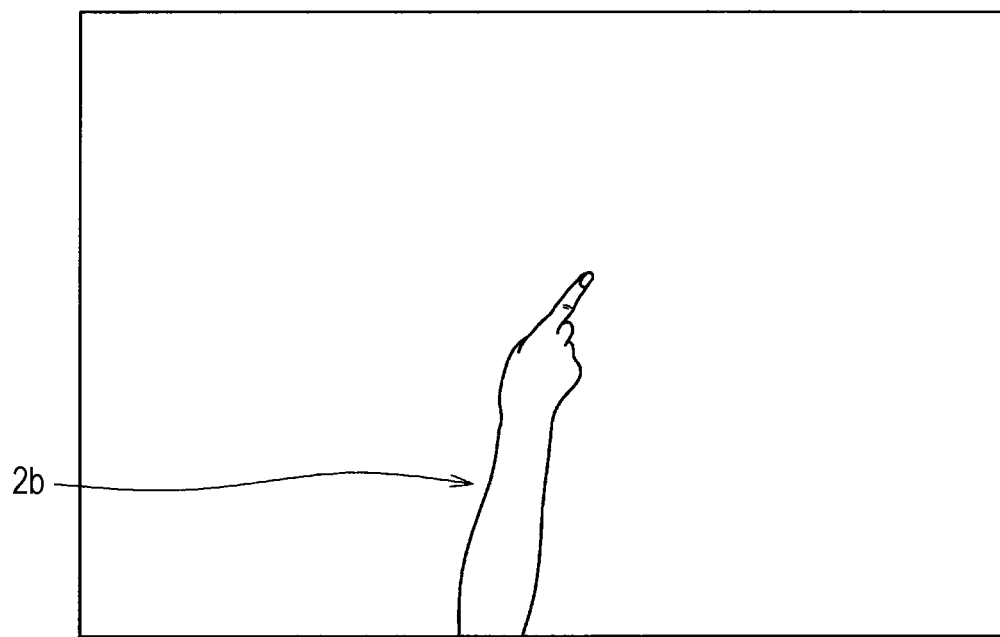

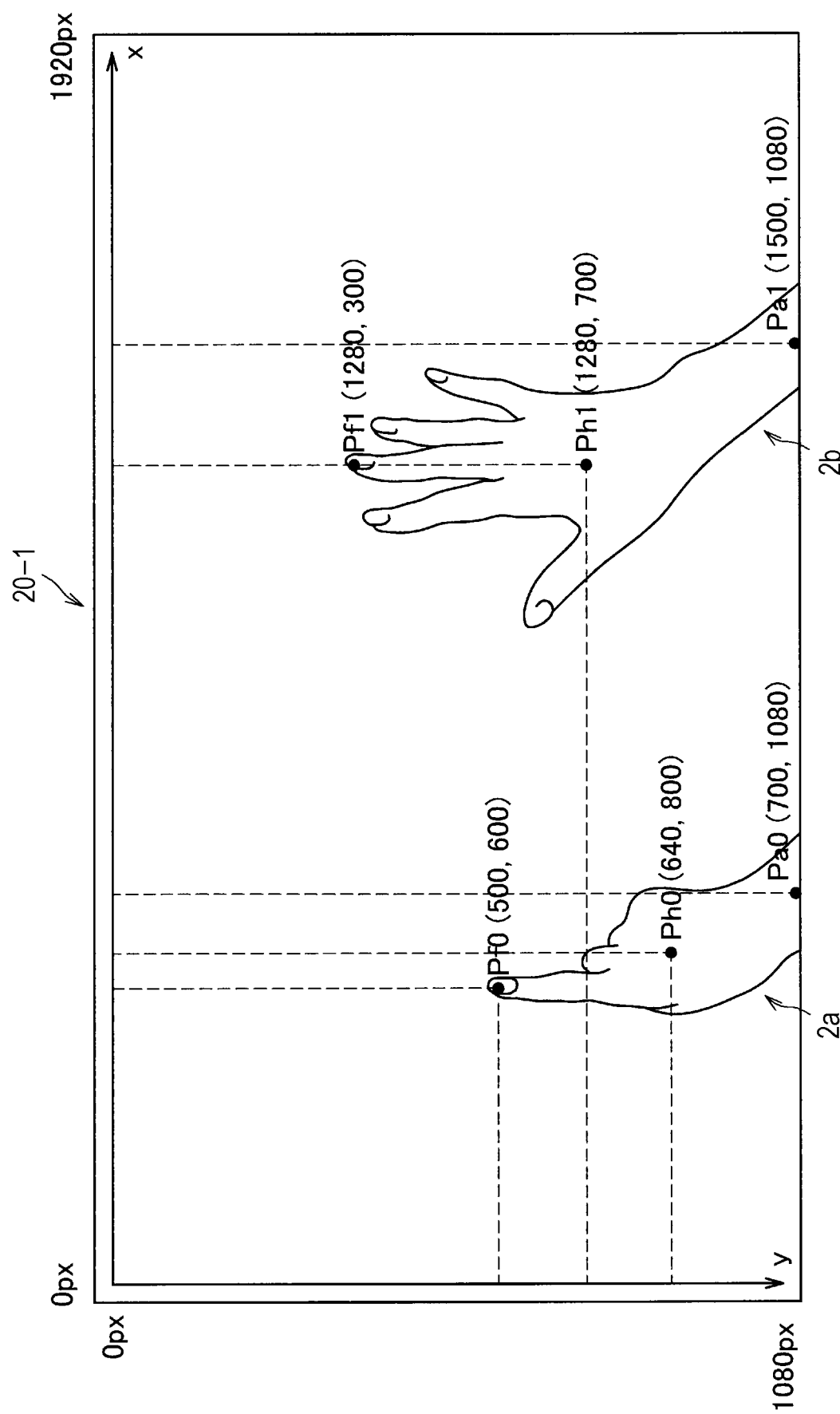

| ID | INFORMATION TYPE | CONDITION AT GENERATION | PROCESSING AT GENERATION | PROCESSING AT REPRODUCTION |
|---|---|---|---|---|
| 1 | POSITION INFORMATION OF FINGER | — | RECORD x AND y COORDINATES | DRAW HAND, FINGER, AND FOREARM USING POSITION INFORMATION OF FINGER, HAND, AND ARM |
| 2 | POSITION INFORMATION OF HAND | — | RECORD x AND y COORDINATES | |
| 3 | POSITION INFORMATION OF ARM | — | RECORD x AND y COORDINATES | |
| 4 | SHAPE OF HAND | — | RECORD HAND SHAPE FLAG | DRAW HAND WITH OPEN IN CASE OF HAND SHAPE FLAG: true<br>DRAW HAND WITH CLOSED IN CASE OF HAND SHAPE FLAG: false |

1300  1302  1304  1306  1308

FIG. 13
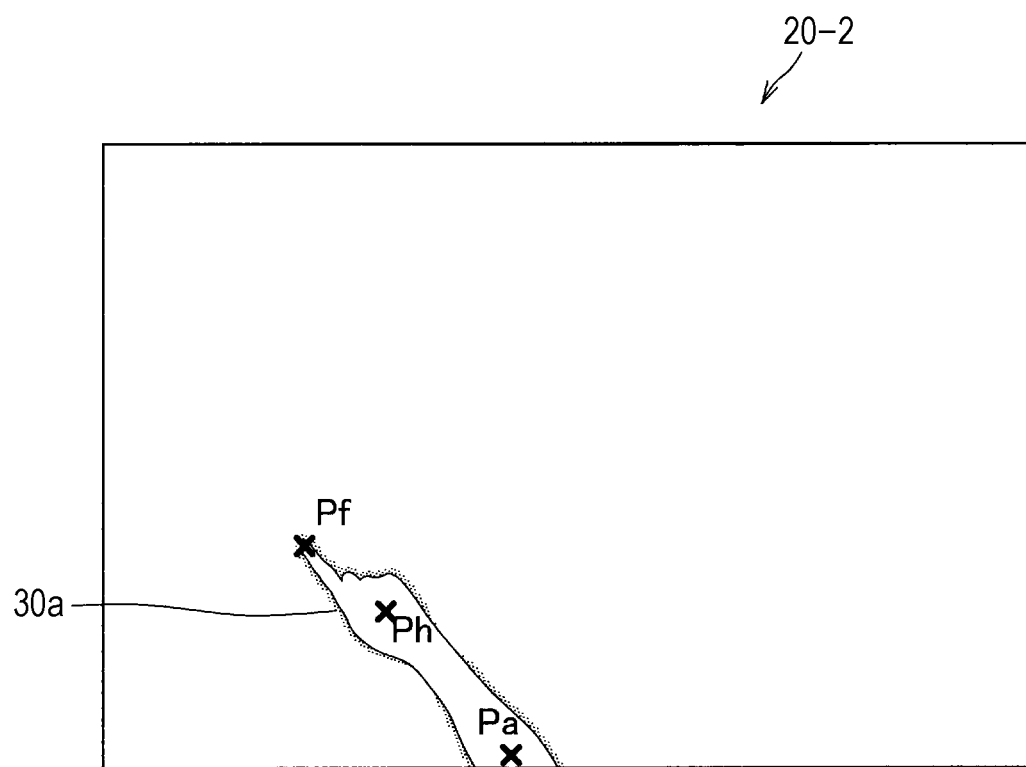
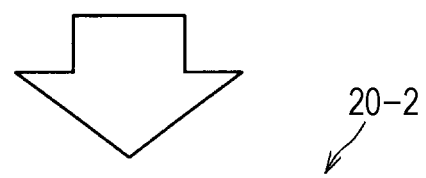
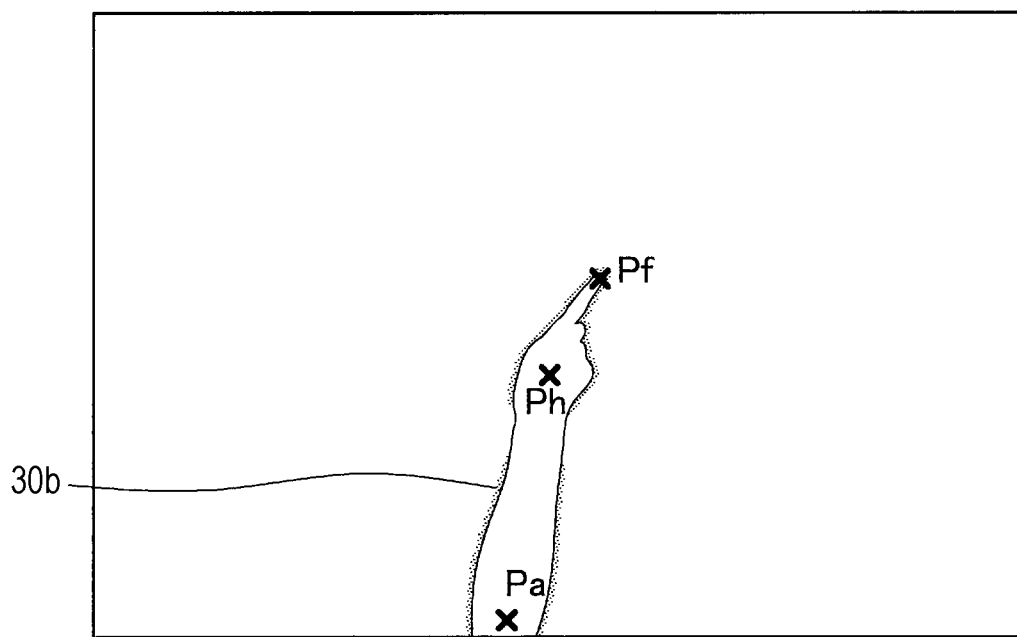

| ID | INFORMATION TYPE | CONDITION AT GENERATION | PROCESSING AT GENERATION | PROCESSING AT REPRODUCTION |
|---|---|---|---|---|
| ... | ... | ... | ... | ... |
| 5 | WRITE INFORMATION | – | RECORD WRITTEN INFORMATION AS POINT GROUP | DRAW LINE SEGMENTS CONNECTING POINT GROUP IN ORDER |

1300　1302　1304　1306　1308

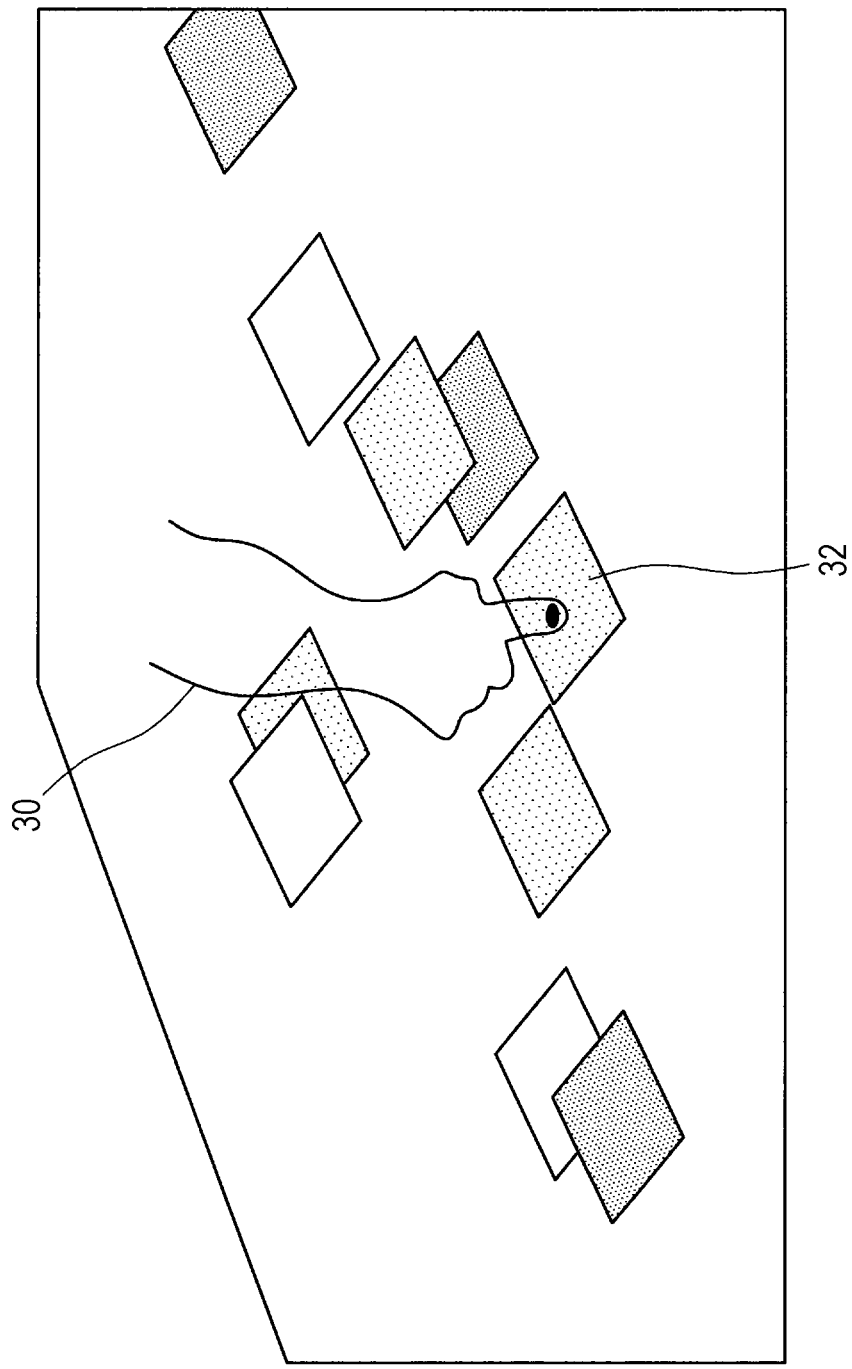

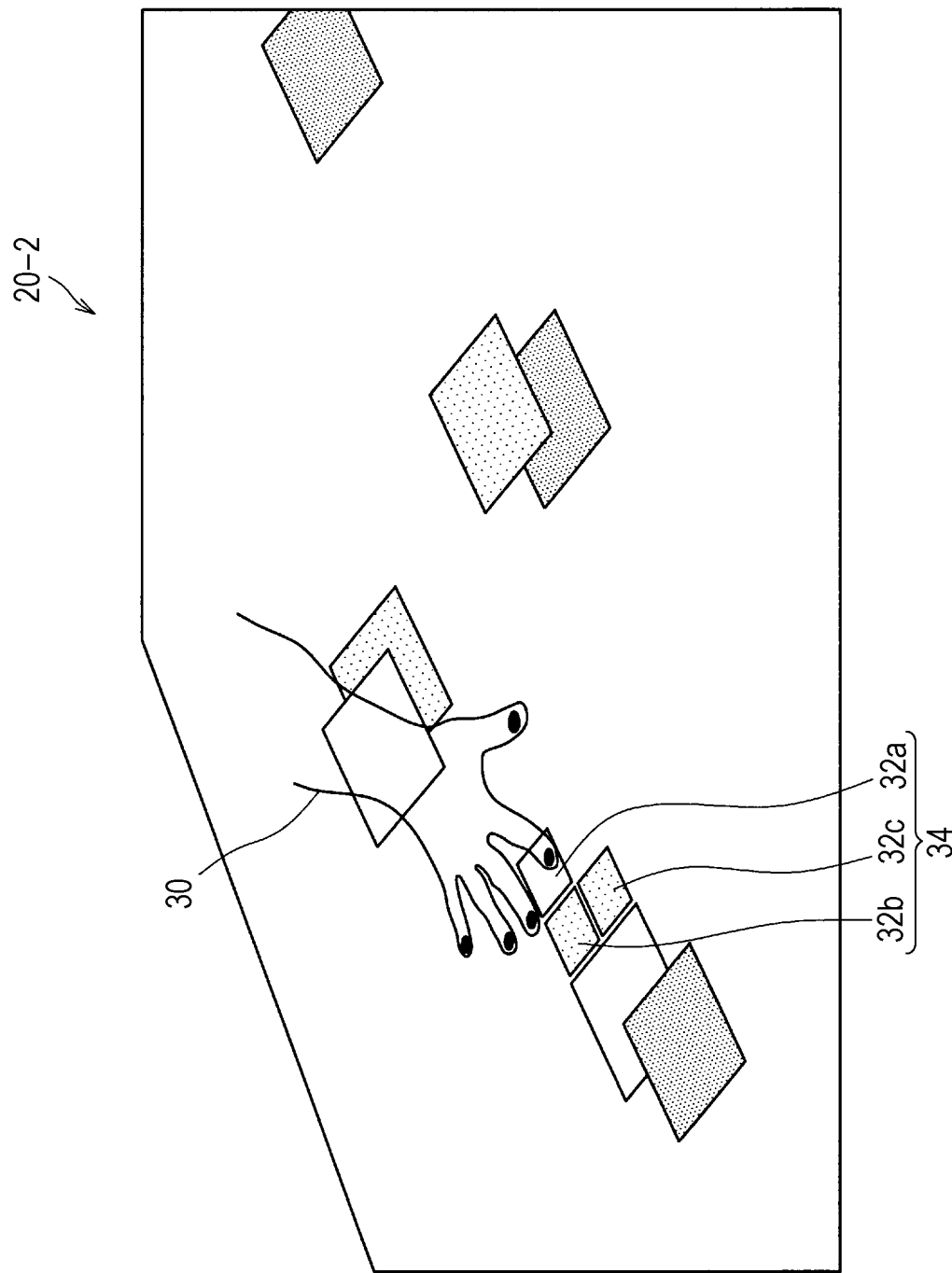

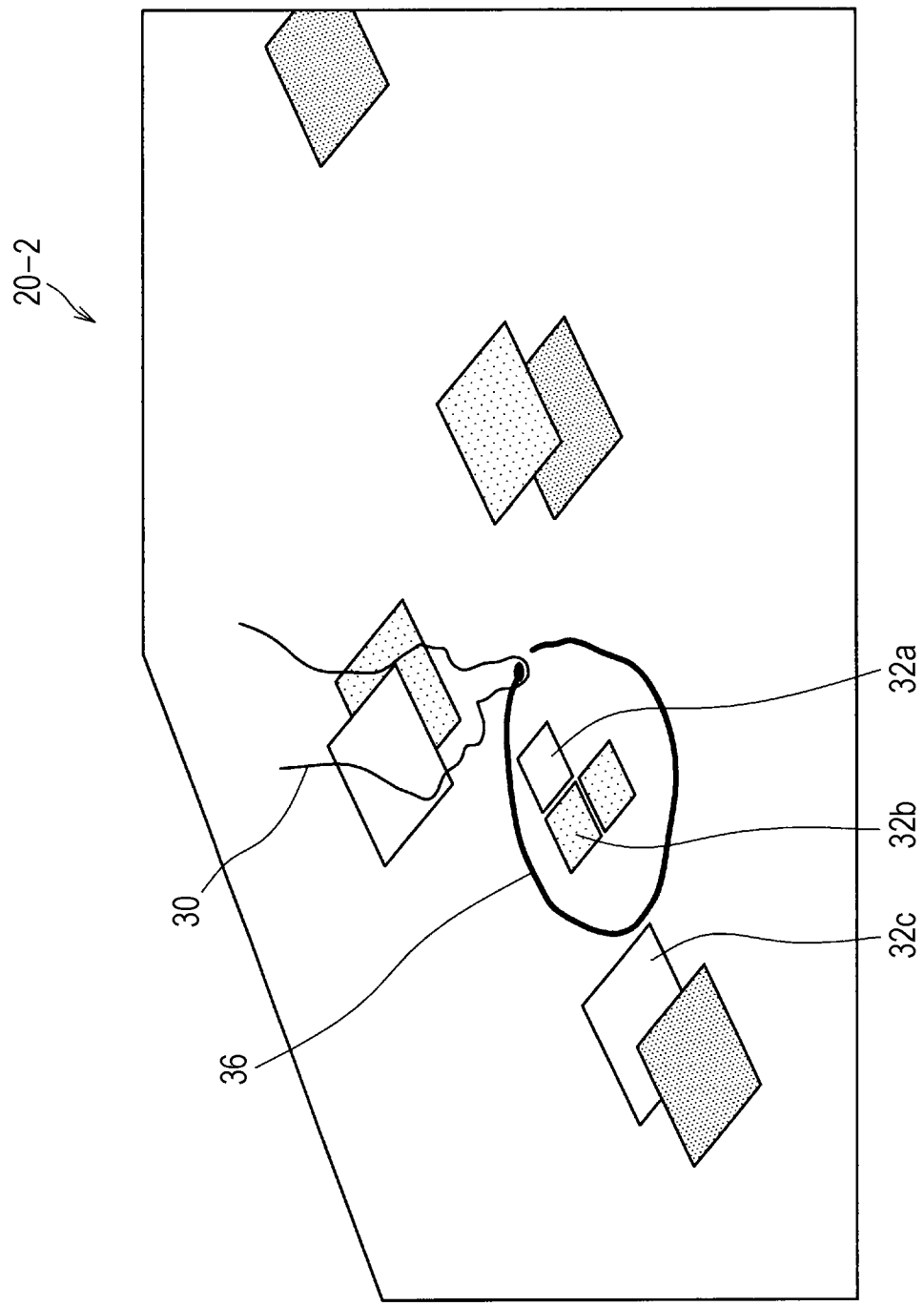

| ID (1320) | INFORMATION TYPE (1322) | CHECK TARGET (1324) | CONFORMITY CONDITION (1326) | PROCESSING AT CONDITION UNESTABLISHED (1328) |
|---|---|---|---|---|
| 1 | POSITION INFORMATION OF FINGER | ANGLE FORMED BY STRAIGHT LINE MADE BY FINGER POSITION AND HAND POSITION AND STRAIGHT LINE MADE BY HAND POSITION AND ARM POSITION | −30 DEGREES TO 30 DEGREES | ① USE FINGER POSITION AS IT IS<br>② SET INTERSECTION OF STRAIGHT LINE DRAWN PERPENDICULARLY FROM FINGER POSITION TO SCREEN END CLOSEST TO ARM POSITION AND SCREEN END AS VIRTUAL ARM POSITION<br>③ SET POINT SHIFTED BY HAND SIZE FROM FINGER POSITION TO ARM POSITION ON STRAIGHT LINE CONNECTING FINGER POSITION AND ARM POSITION AS VIRTUAL HAND POSITION |
| | POSITION INFORMATION OF HAND | | | |
| | POSITION INFORMATION OF ARM | | | |

| ID | INFORMATION TYPE 1302 | CONDITION AT GENERATION 1304 | PROCESSING AT GENERATION 1306 | PROCESSING AT REPRODUCTION 1308 |
|---|---|---|---|---|
| ... | ... | ... | ... | ... |
| 6 | OCCUPATION | — | RECORD OCCUPATION INFORMATION | ① DRAW HAND, FINGER, AND FOREARM IN RED IN CASE WHERE OCCUPATION IS ENGINEER<br>② DRAW HAND, FINGER, AND FOREARM IN BLUE IN CASE WHERE OCCUPATION IS DESIGNER |

1300

FIG. 25A
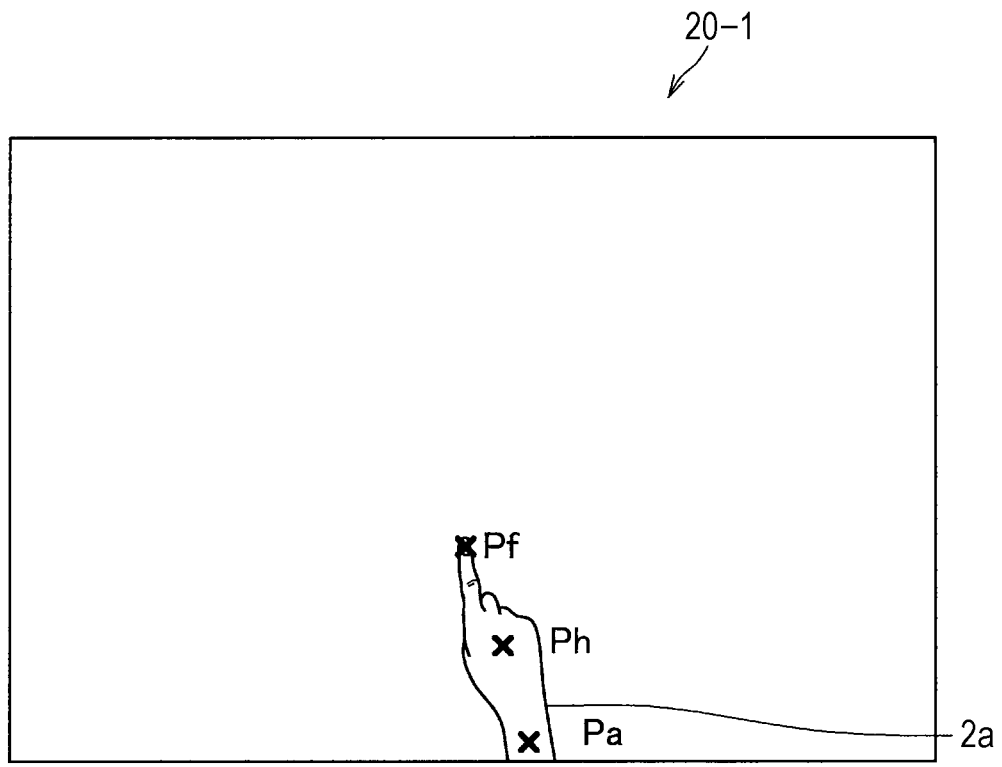
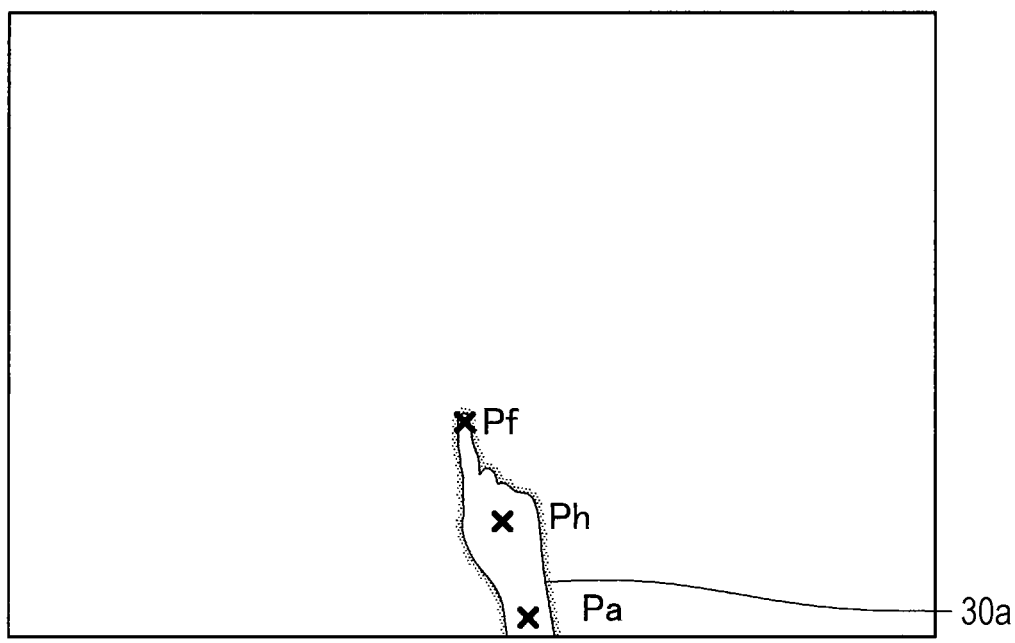

FIG. 25B
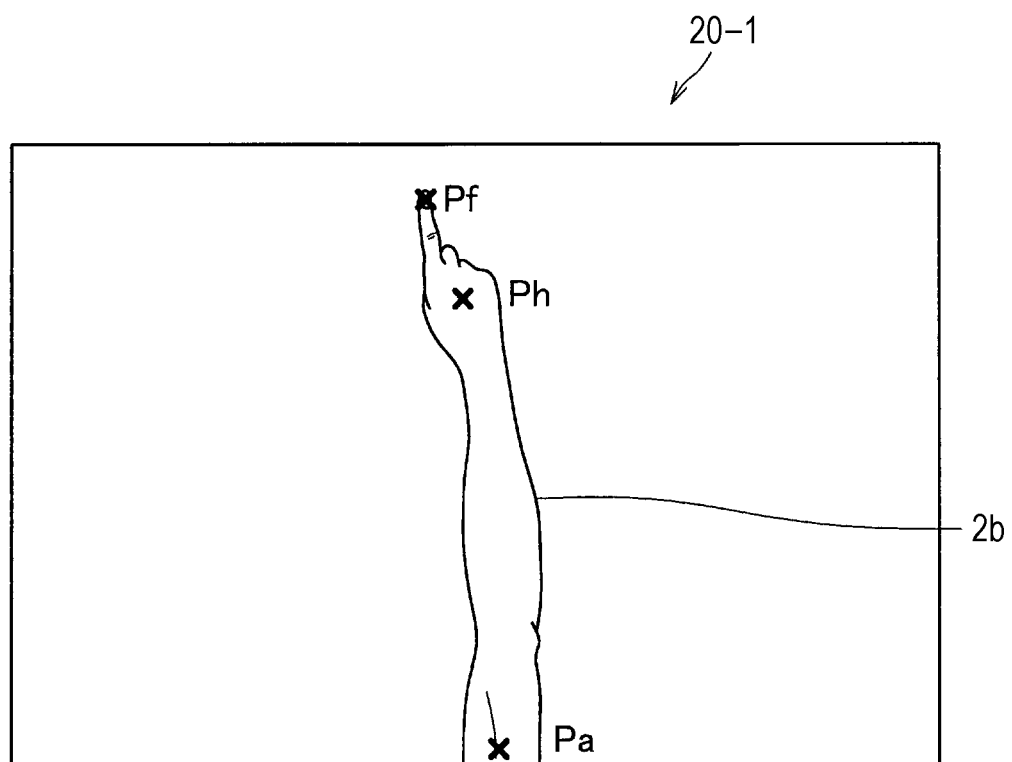
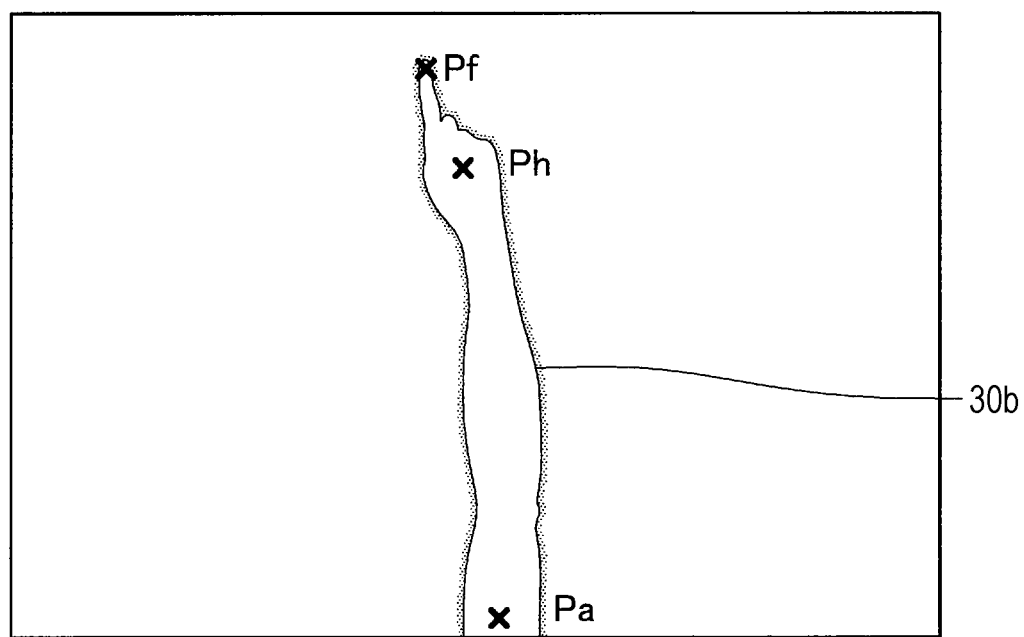

| | 1320 | 1322 | 1324 | 1326 | 1328 |
|---|---|---|---|---|---|
| ID | INFORMATION TYPE | | CHECK TARGET | CONFORMITY CONDITION | PROCESSING AT CONDITION UNESTABLISHED |
| ... | ... | | ... | ... | ... |
| 2 | POSITION INFORMATION OF HAND | POSITION INFORMATION OF ARM | DISTANCE BETWEEN HAND POSITION AND ARM POSITION | 300 PIXELS OR LESS | ① USE ARM POSITION AS IT IS<br>② DISPLAY POINT AT POSITION POINTED AT FINGER POSITION<br>③ SET POSITION OF 300 PIXELS FROM ARM POSITION AS VIRTUAL FINGER POSITION<br>④ SET POSITION SHORT OF STRAIGHT LINE CONNECTING POINTING POSITION AND VIRTUAL FINGER POSITION AS VIRTUAL HAND POSITION<br>⑤ DRAW LINE SEGMENT CONNECTING POINTING POSITION AND VIRTUAL FINGER POSITION TO POINT AT POINTING POSITION FROM VIRTUAL FINGER POSITION |

FIG. 27
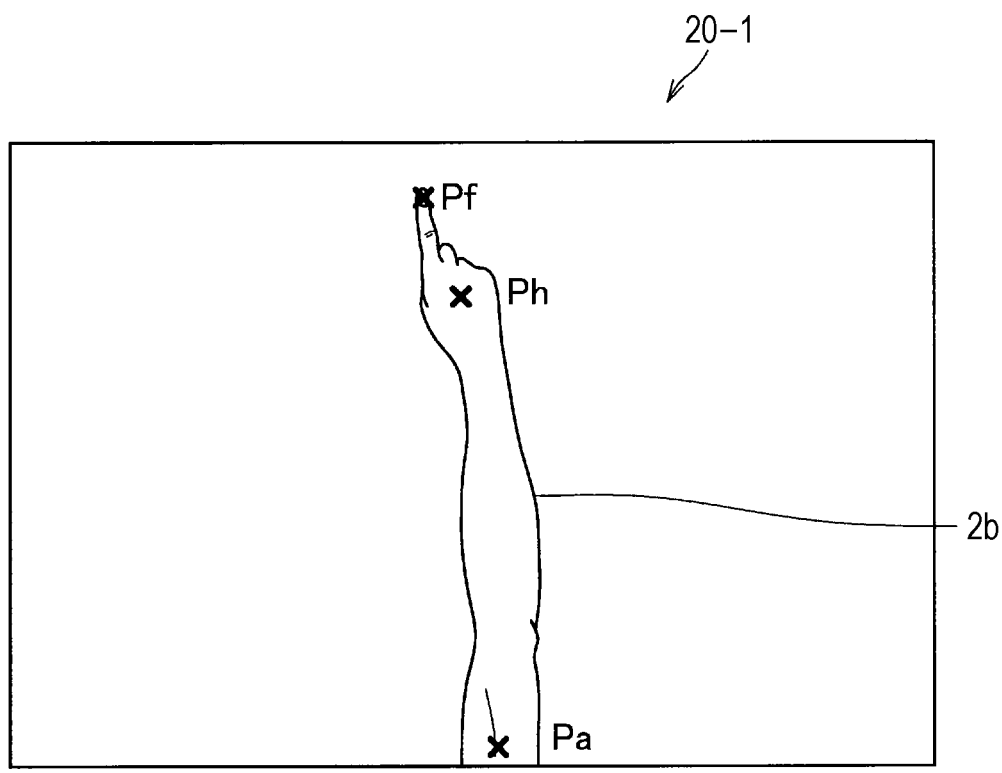
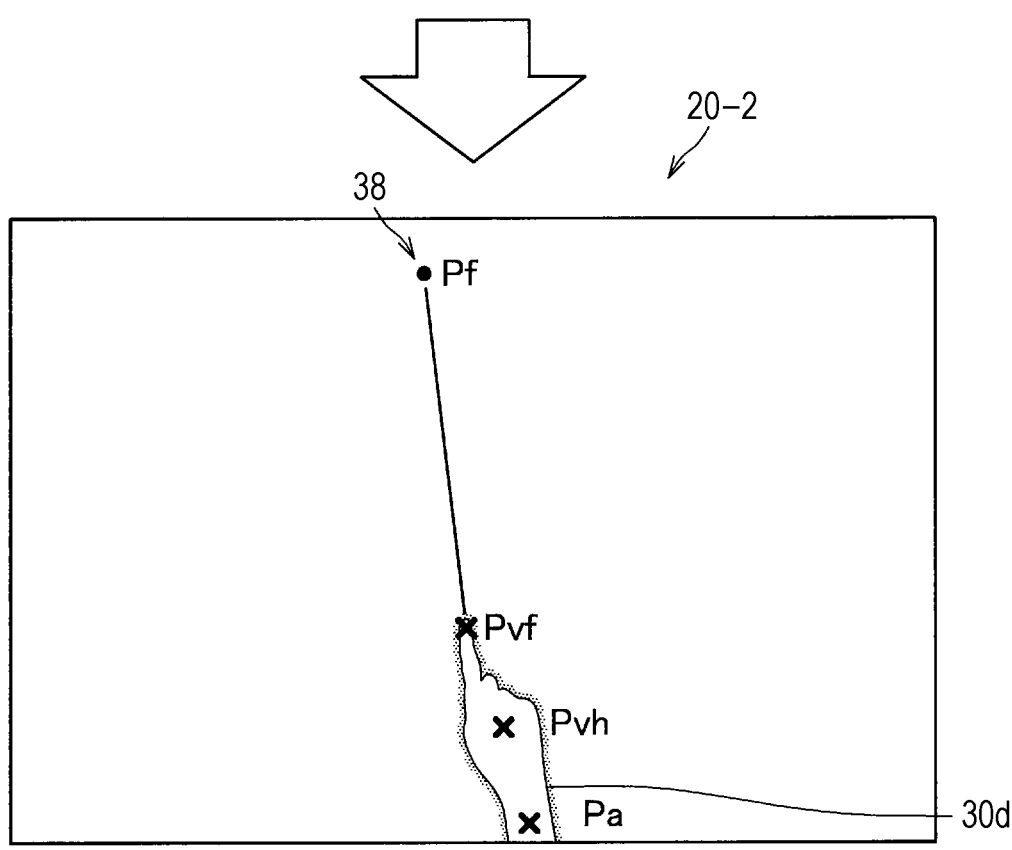

FIG. 29

| 1300 | 1302 | 1304 | 1306 | 1308 |
|---|---|---|---|---|
| ID | INFORMATION TYPE | CONDITION AT GENERATION | PROCESSING AT GENERATION | PROCESSING AT REPRODUCTION |
| ... | ... | ... | ... | ... |
| 6 | z POSITION INFORMATION OF FINGER | — | RECORD z COORDINATE | CHANGE TRANSPARENCY OF IMAGE OF HAND, FINGER, AND FOREARM ACCORDING TO z COORDINATE |

130d

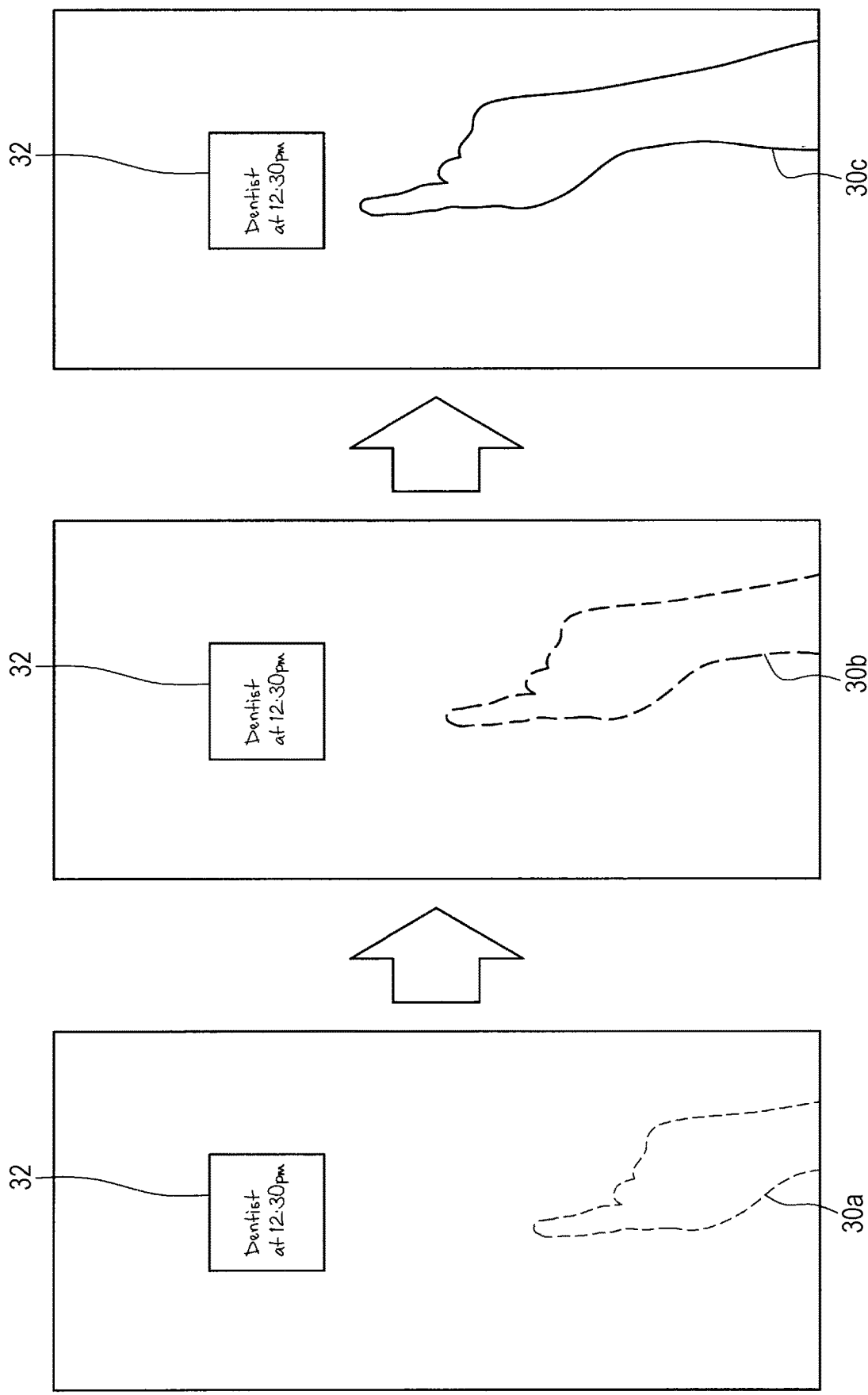

FIG. 31A
POINT A
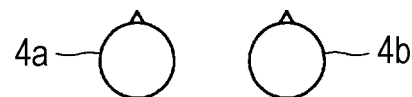
4a — 4b
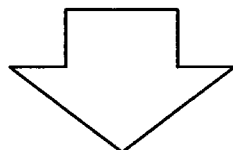
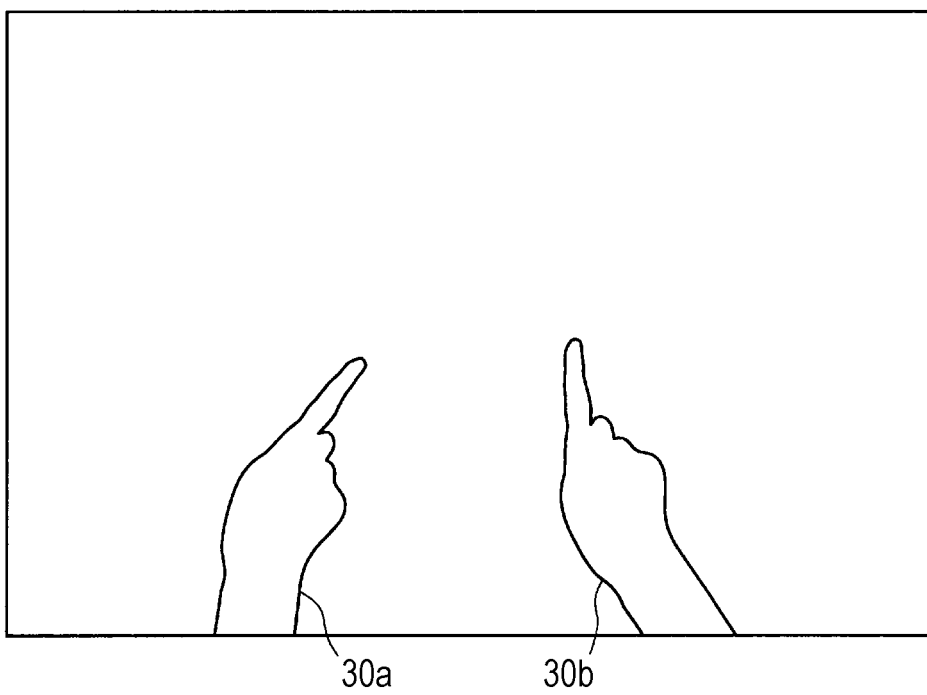
30a   30b FIG. 31B
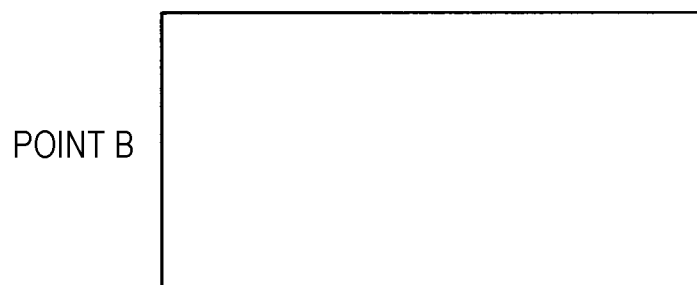
POINT B
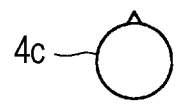
4c
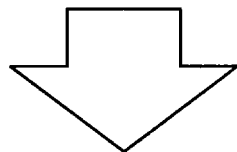
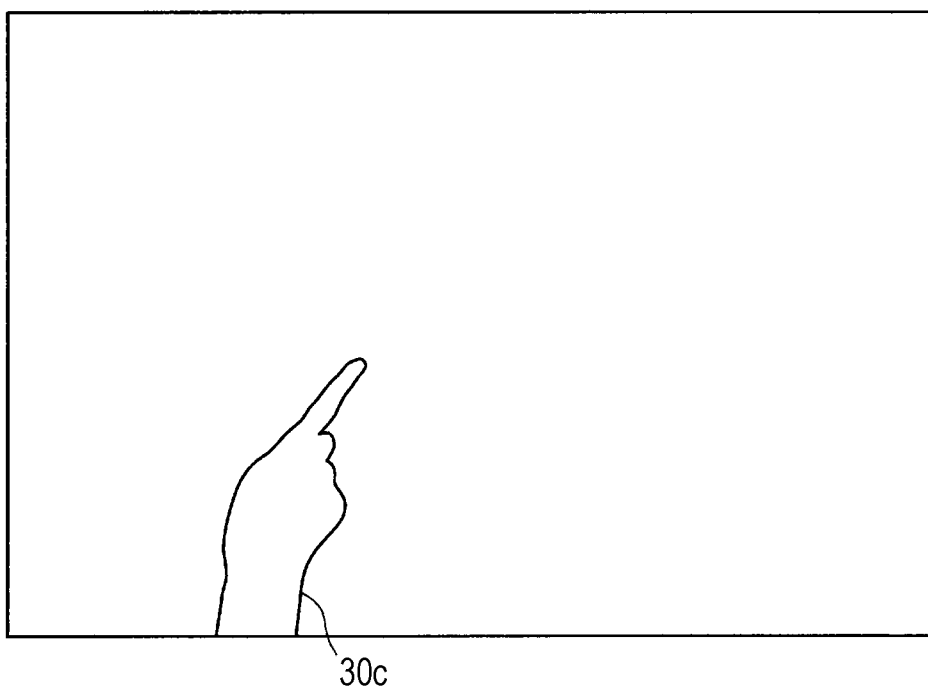
30c

| ID 1320 | INFORMATION TYPE 1322 | CHECK TARGET 1324 | CONFORMITY CONDITION 1326 | PROCESSING AT CONDITION UNESTABLISHED 1328 |
|---|---|---|---|---|
| ... | ... | ... | ... | ... |
| 3 | POSITION INFORMATION OF ARM | NUMBER OF ARM POSITIONS EXISTING ON ONE SIDE OF SCREEN | TWO OR LESS | ① MOVE ARM POSITION TO CAUSE HAND TO STICK OUT FROM ANOTHER SIDE WHILE MAINTAINING FINGER POSITION ② MOVE HAND POSITION TO LOCATE HAND POSITION AT NATURAL LOCATION WITH MOVEMENT OF ARM POSITION |

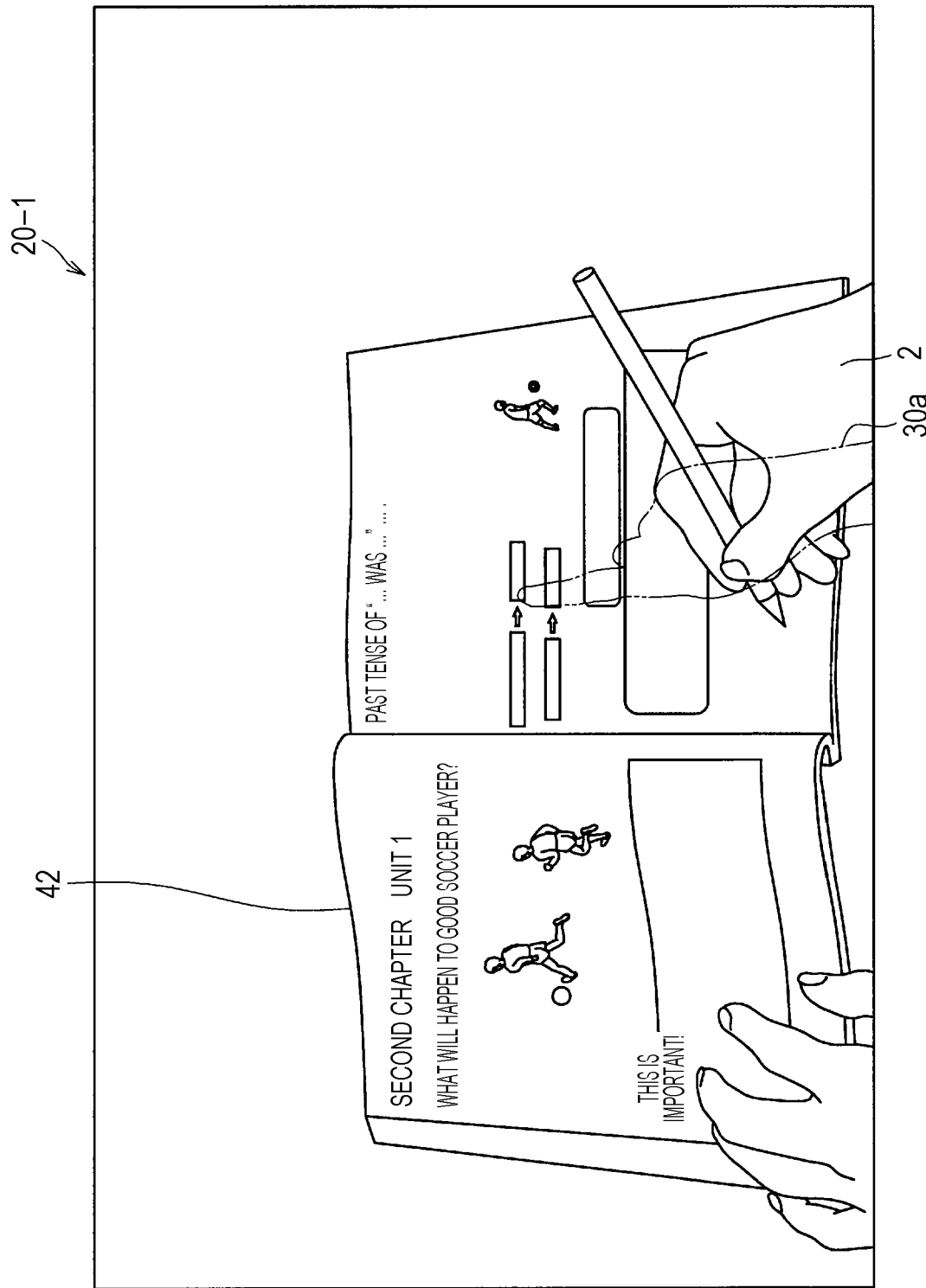

| ID | Information Type (1322) | Check Target (1324) | Conformity Condition (1326) | Processing at Condition Unestablished (1328) |
|---|---|---|---|---|
| ... | ... | ... | ... | ... |
| 3 | Position information of arm | Number of arm positions existing on one side of screen | One or less | ① Move arm position to cause hand to stick out from another side while maintaining finger position ② Move hand position to locate hand position at natural location with movement of arm position |

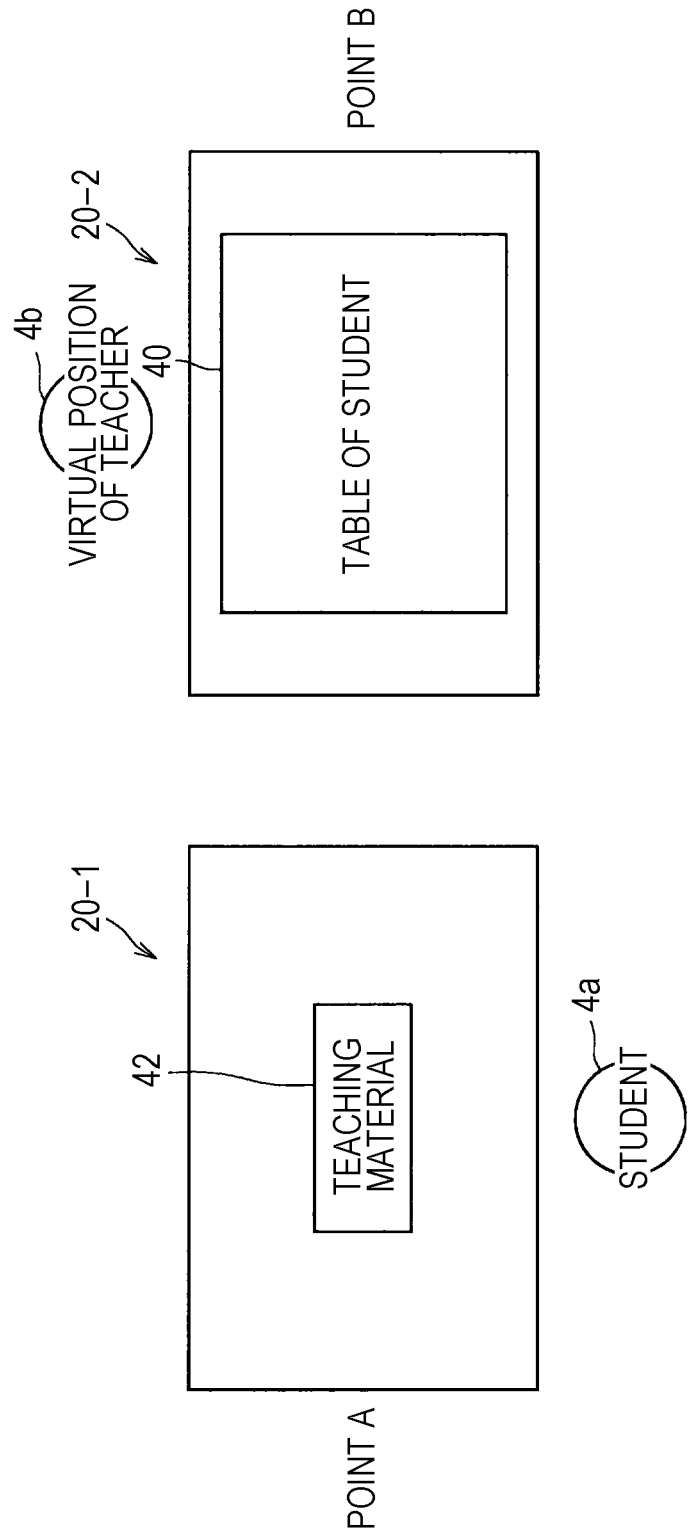

| ID | INFORMATION TYPE | CONDITION AT GENERATION | PROCESSING AT GENERATION | PROCESSING AT REPRODUCTION |
|---|---|---|---|---|
| ... | ... | ... | ... | ... |
| 7 | MOUSE POSITION INFORMATION | — | RECORD x AND y COORDINATES OF POINTING TIP OF MOUSE | ① SET CURSOR POSITION AS FINGER POSITION<br>② SET VIRTUAL HAND POSITION AND VIRTUAL ARM POSITION AT NATURAL POSITIONS ON THE BASIS OF FINGER POSITION<br>③ CHANGE FINGER POSITION FOLLOWING CURSOR POSITION WHEN CURSOR POSITION MOVES. CHANGE HAND POSITION BY SHORTER DISTANCE THAN CHANGE OF FINGER POSITION AT THE SAME TIME. CHANGE ARM POSITION BY FURTHER SHORTER DISTANCE THAN CHANGE OF HAND POSITION AT THE SAME TIME. |

1300　1302　1304　1306　1308

FIG. 38C
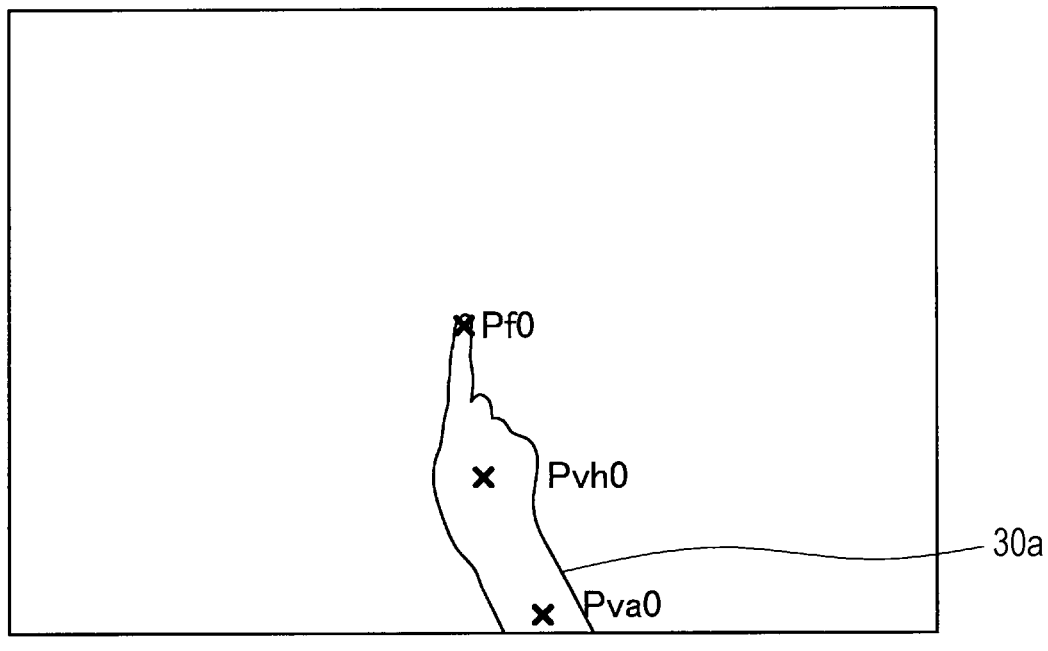
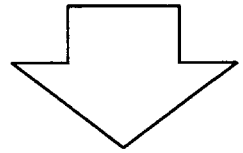
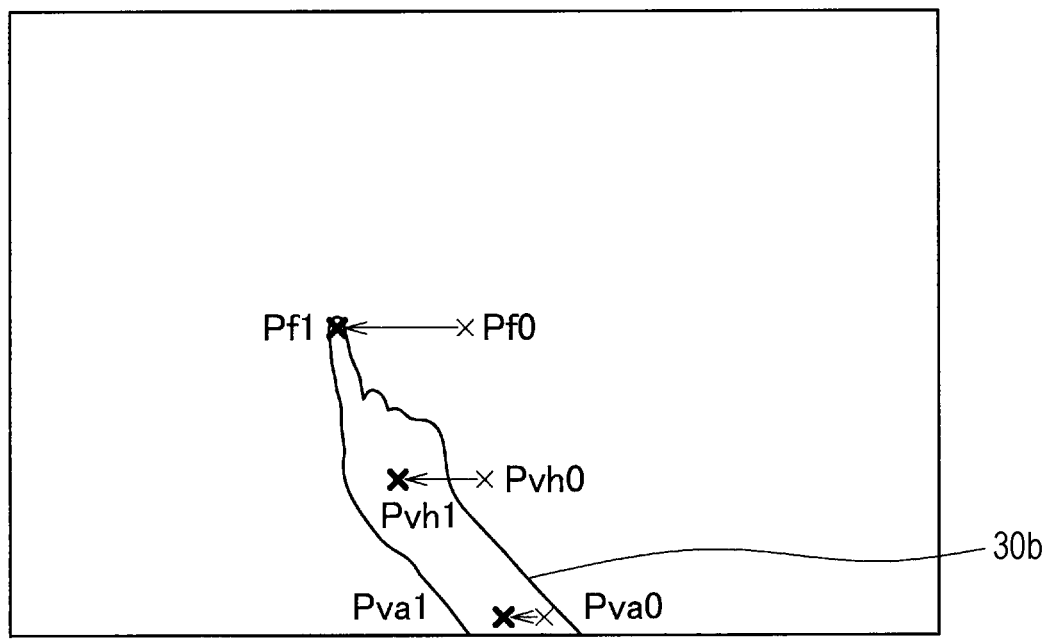

| ID | INFORMATION TYPE 1302 | CONDITION AT GENERATION 1304 | PROCESSING AT GENERATION 1306 | PROCESSING AT REPRODUCTION 1308 |
|---|---|---|---|---|
| 1 | POSITION INFORMATION OF FINGER | — | RECORD x AND y COORDINATES | DRAW HAND, FINGER, AND FOREARM USING POSITION INFORMATION OF FINGER, HAND, AND ARM |
| 2 | POSITION INFORMATION OF HAND | — | RECORD x AND y COORDINATES | |
| 3 | POSITION INFORMATION OF ARM | — | RECORD x AND y COORDINATES | |
| 4 | GENDER INFORMATION | FAMILIARITY LEVEL IS 2 OR MORE | RECORD GENDER FLAG | ① SET DISPLAY COLOR OF HAND, FINGER, AND FOREARM TO RED IN CASE OF FEMALE ② SET DISPLAY COLOR OF HAND, FINGER, AND FOREARM TO BLUE IN CASE OF MALE |
| 5 | SIZE OF HAND | FAMILIARITY LEVEL IS 2 OR MORE | RECORD SIZE | SET SIZE OF HAND TO SPECIFIED SIZE |
| 6 | SIZE OF ARM | FAMILIARITY LEVEL IS 2 OR MORE | RECORD SIZE | SET SIZE OF ARM TO SPECIFIED SIZE |

FIG. 41

| ID | INFORMATION TYPE | CONDITION AT GENERATION | PROCESSING AT GENERATION | PROCESSING AT REPRODUCTION |
|---|---|---|---|---|
| ... | ... | ... | ... | ... |
| 7 | MICROPHONE VOLUME | — | RECORD ABSOLUTE INTENSITY OF VOLUME | DRAW HAND, FINGER, AND FOREARM AT TRANSPARENCY ACCORDING TO INTENSITY OF VOLUME |

FIG. 43

| ID | INFORMATION TYPE | CONDITION AT GENERATION | PROCESSING AT GENERATION | PROCESSING AT REPRODUCTION |
|---|---|---|---|---|
| ... | ... | ... | ... | ... |
| 7 | MICROPHONE VOLUME | — | RECORD INTENSITY OF VOLUME ACCORDING TO ANGLE | ① DRAW HAND, FINGER, AND FOREARM<br>② DRAW EFFECT TO BASE OF ARM POSITION EXISTING AT ANGLE WITH LARGEST VOLUME INTENSITY |

FIG. 45

| ID | INFORMATION TYPE | CONDITION AT GENERATION | PROCESSING AT GENERATION | PROCESSING AT REPRODUCTION |
|---|---|---|---|---|
| ... | ... | ... | ... | ... |
| 7 | MICROPHONE VOLUME | — | RECORD INTENSITY OF VOLUME ACCORDING TO ANGLE | ① DRAW CHARACTER STRING TO BASE OF ARM POSITION EXISTING AT ANGLE WITH LARGEST VOLUME INTENSITY<br>② ALLOCATE SOUND SOURCE AND TEXT TO POINTED ELEMENT |
| 8 | UTTERANCE TEXT | — | RECORD CHARACTER STRING OF VOICE RECOGNITION RESULT | |
| 9 | UTTERANCE SOUND SOURCE | — | RECORD VOICE BINARY DATA | |

| ID (1300) | INFORMATION TYPE (1302) | CONDITION AT GENERATION (1304) | PROCESSING AT GENERATION (1306) | PROCESSING AT REPRODUCTION (1308) |
|---|---|---|---|---|
| ... | ... | ... | ... | ... |
| 7 | MICROPHONE VOLUME | — | RECORD INTENSITY OF VOLUME ACCORDING TO ANGLE | LOCALIZE SOUND AT ANGLE WITH LARGEST VOLUME INTENSITY AND REPRODUCE SOUND SOURCE |
| 8 | UTTERANCE SOUND SOURCE | — | RECORD VOICE BINARY DATA | |

| ID | INFORMATION TYPE | CONDITION AT GENERATION | PROCESSING AT GENERATION | PROCESSING AT REPRODUCTION |
|---|---|---|---|---|
| ... | ... | ... | ... | ... |
| 7 | MICROPHONE VOLUME | — | RECORD ABSOLUTE INTENSITY OF VOLUME | FOCUS OBJECT ARRANGED AT POINT IN CASE WHERE VOLUME IS FIXED VALUE OR MORE |

1300　1302　1304　1306　1308

FIG. 51A
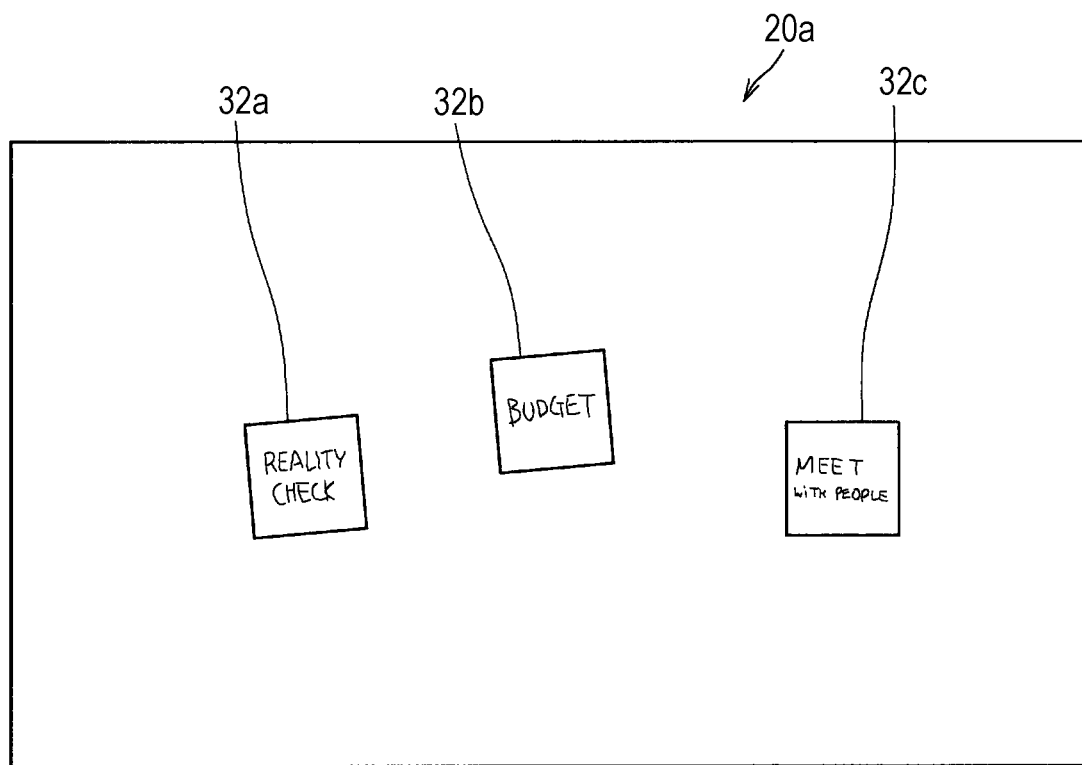
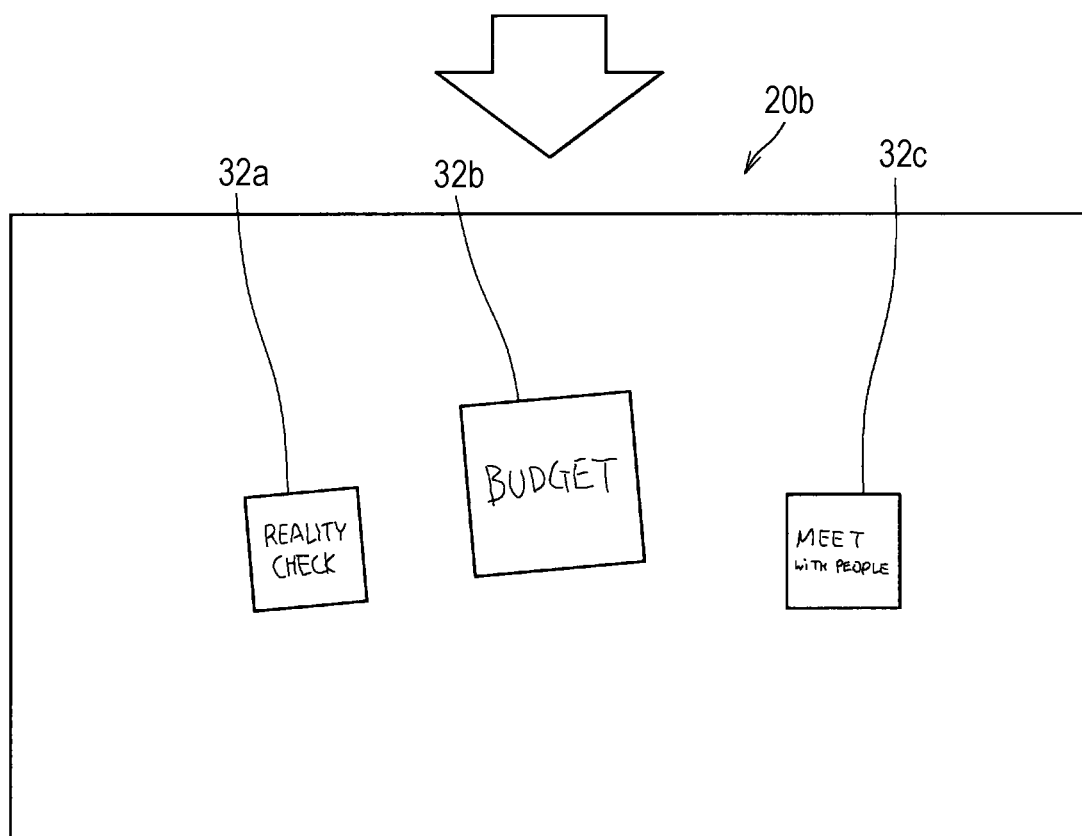

FIG. 51B
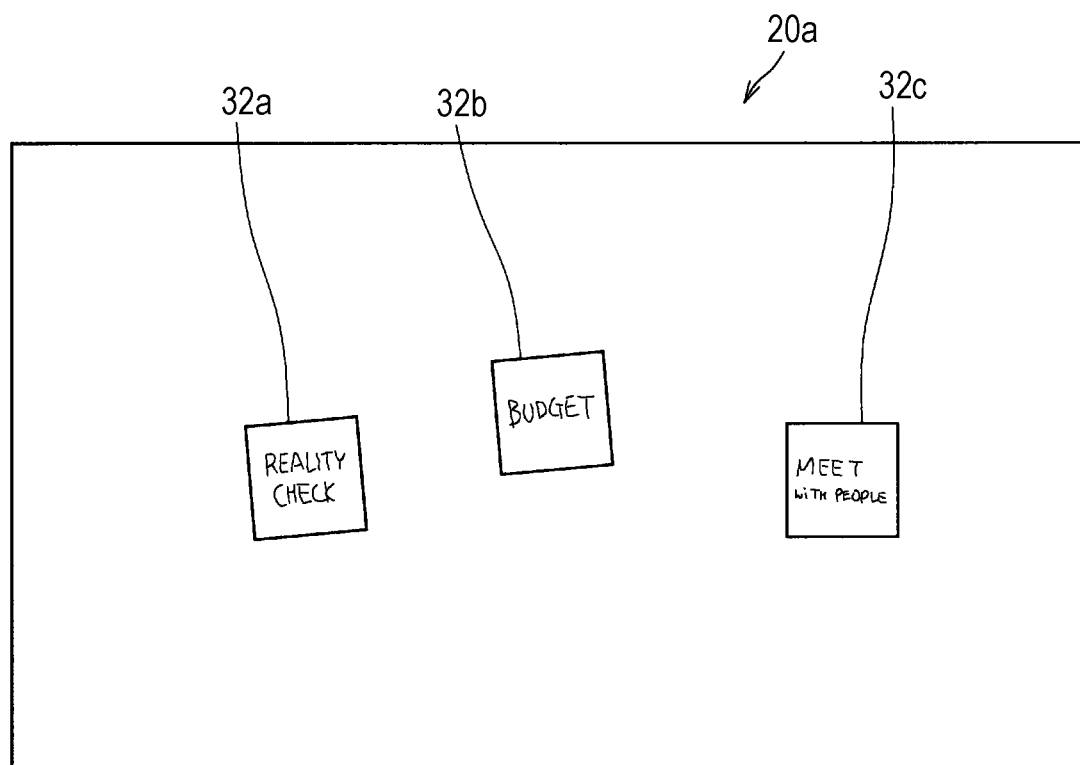
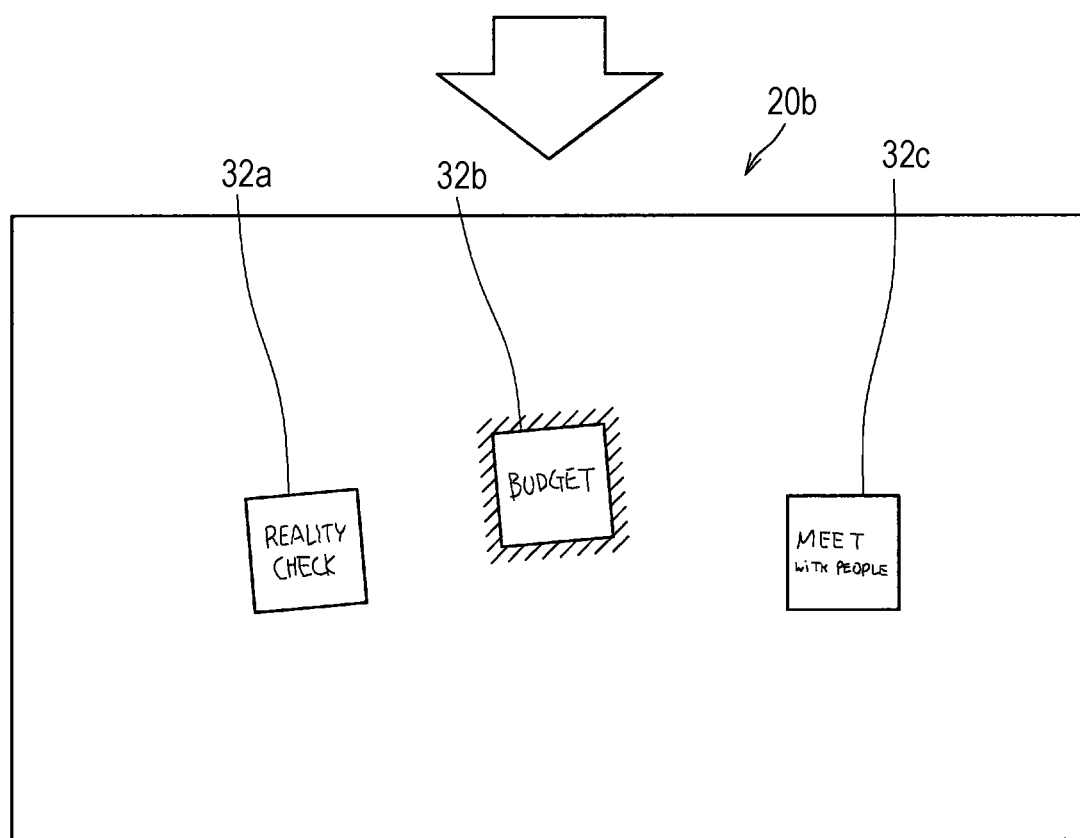

FIG. 51C
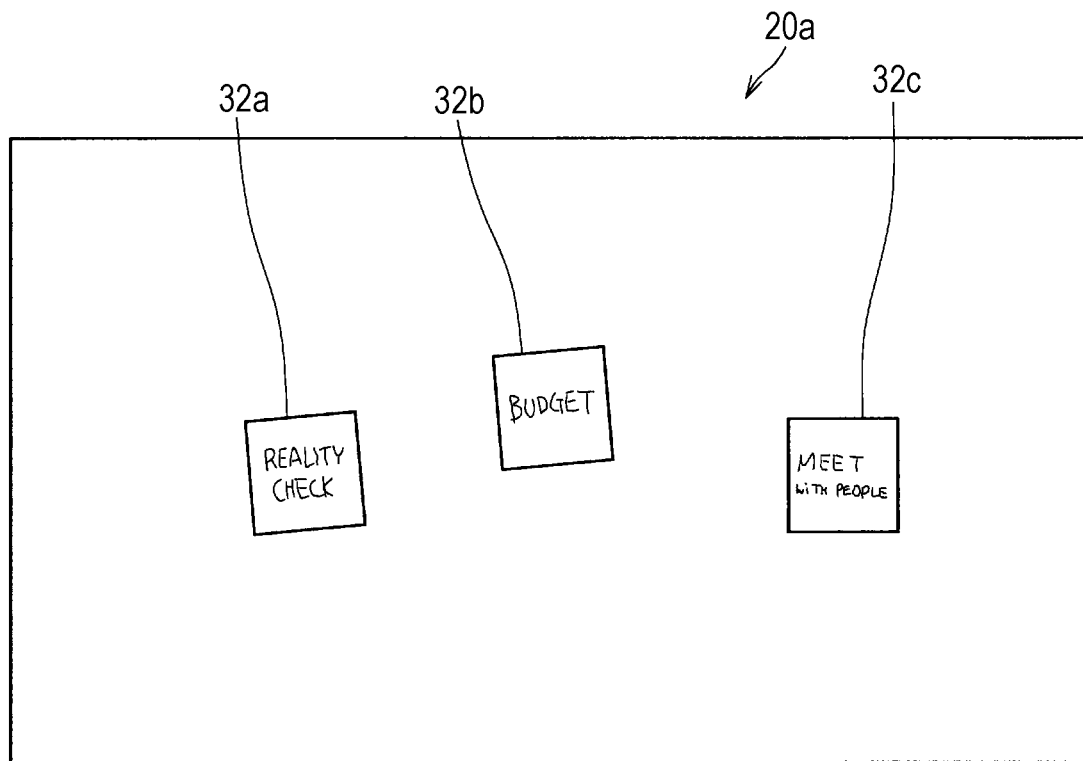
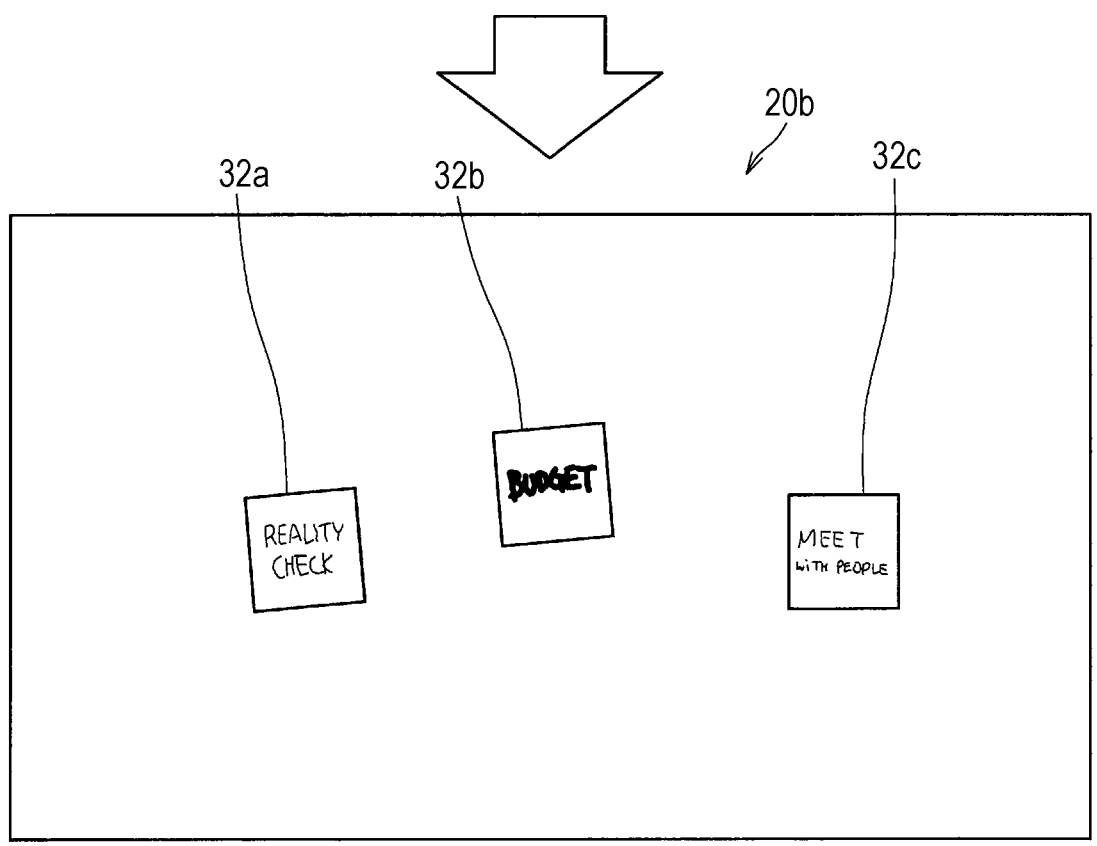

FIG. 55A
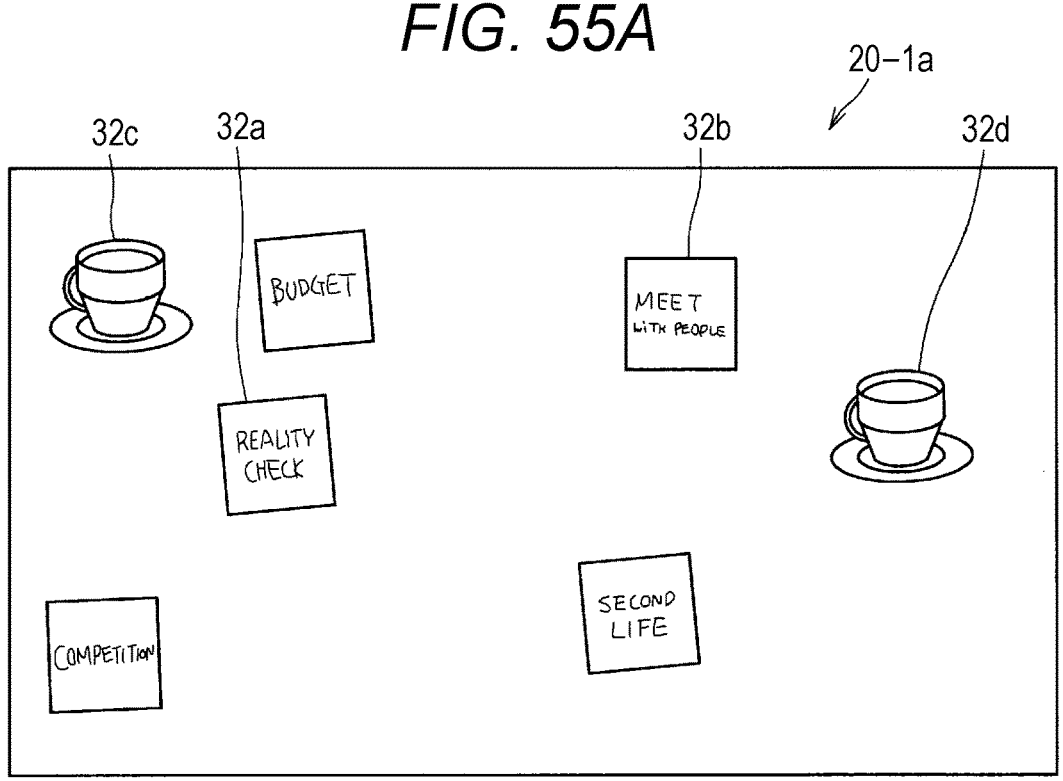
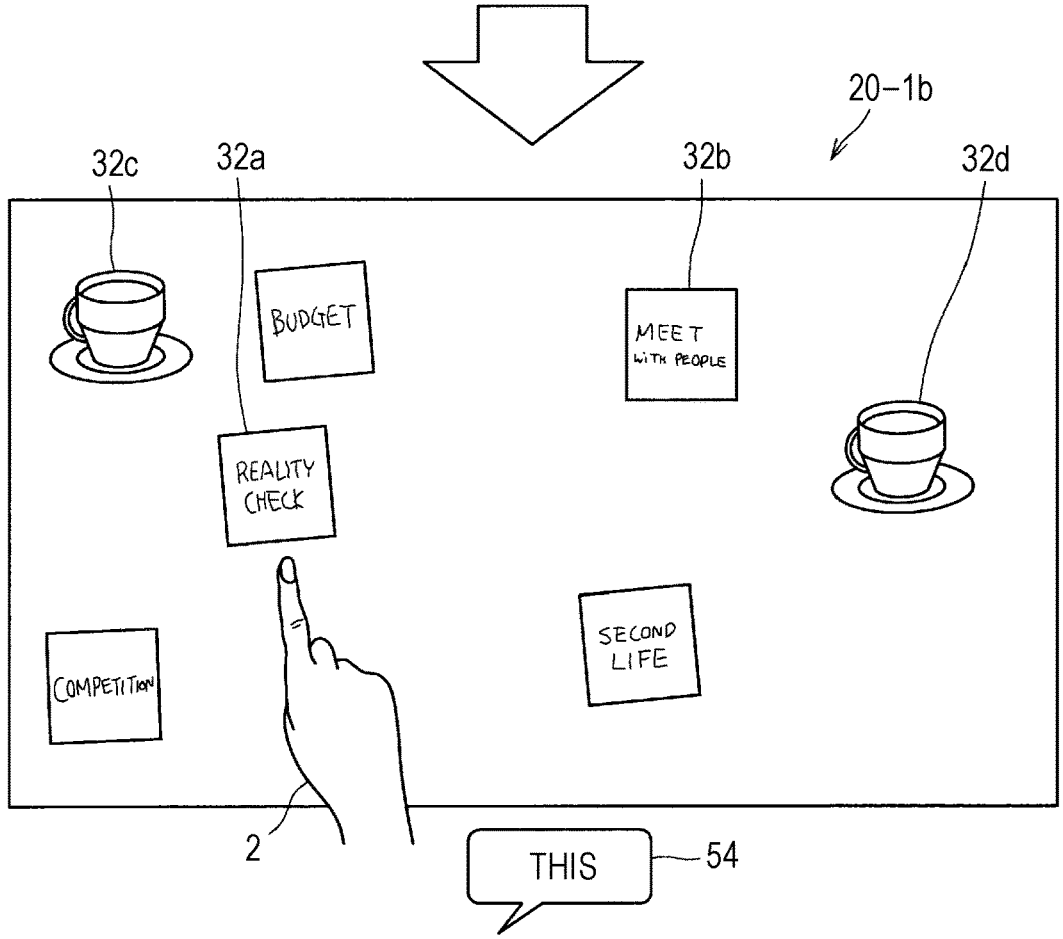

FIG. 55B
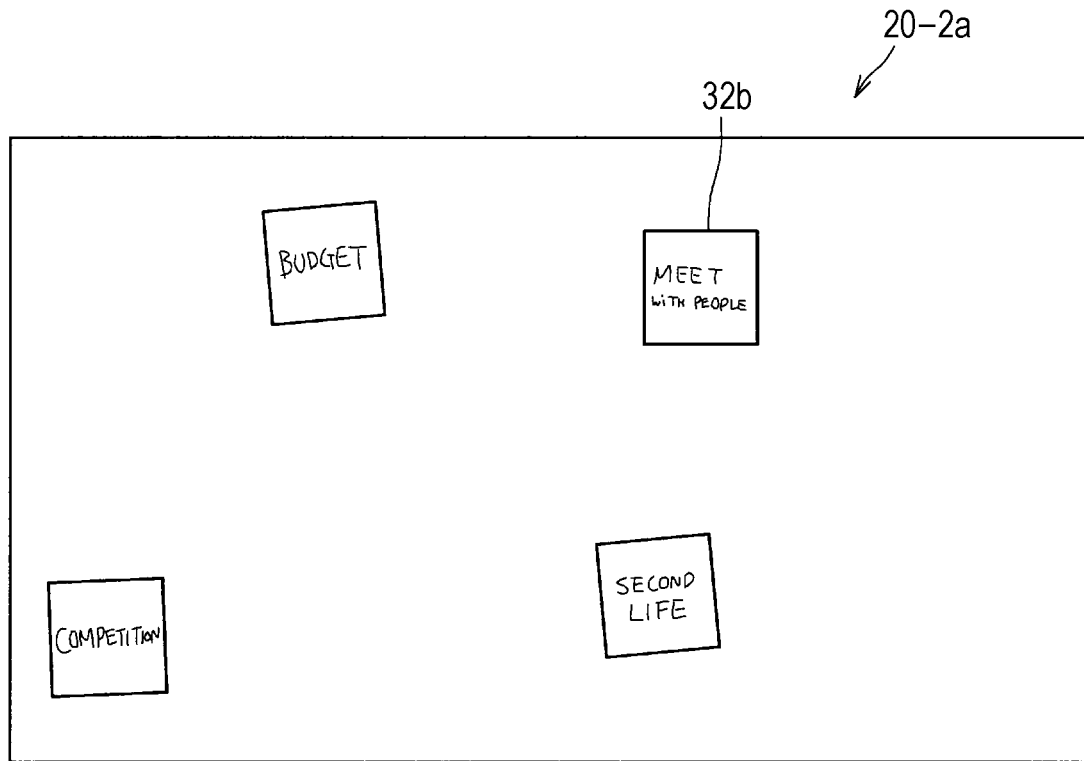
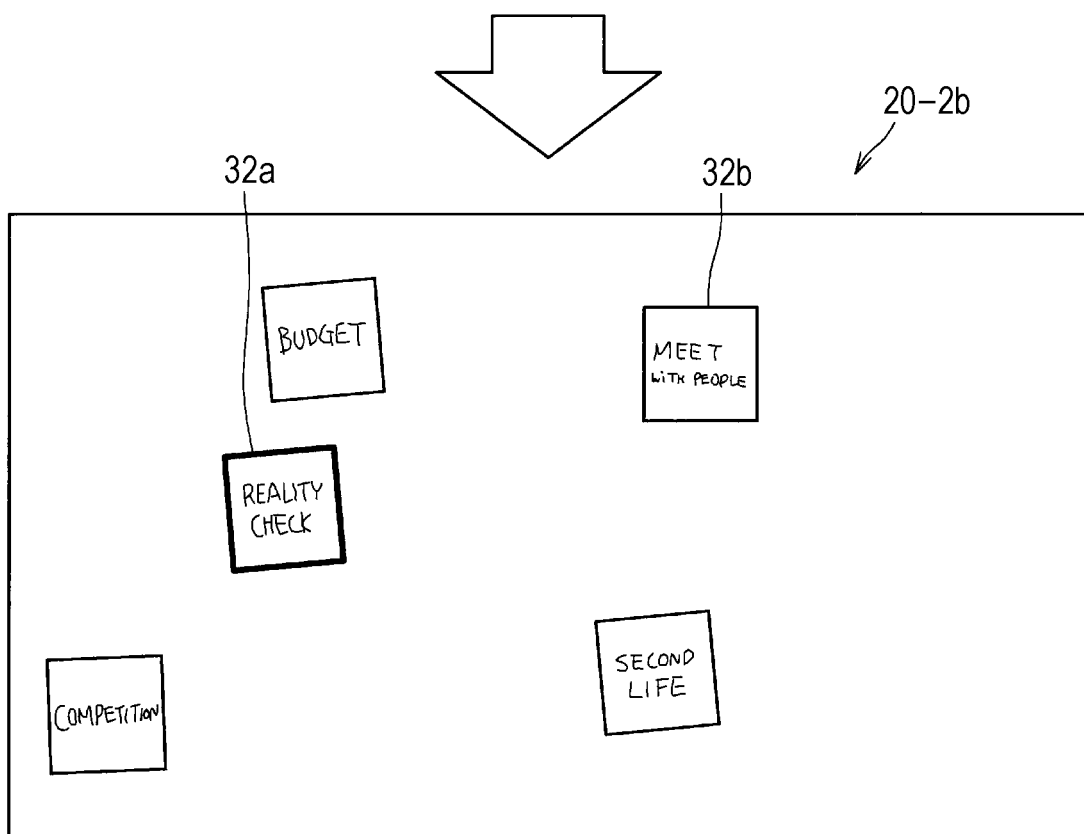

INFORMATION PROCESSING SYSTEM, INFORMATION PROCESSING METHOD, AND PROGRAM

CROSS REFERENCE TO PRIOR APPLICATION

This application is a continuation of U.S. patent application Ser. No. 16/616,683 (filed on Nov. 25, 2019), which is a National Stage Patent Application of PCT International Patent Application No. PCT/JP2018/016509 (filed on Apr. 24, 2018) under 35 U.S.C. § 371, which claims priority to Japanese Patent Application No. 2017-115265 (filed on Jun. 12, 2017), which are all hereby incorporated by reference in their entirety.

TECHNICAL FIELD

The present disclosure relates to an information processing system, an information processing method, and a program.

BACKGROUND ART

Conventionally, various technologies for realizing communication between remote places, such as a video conference system, have been developed.

For example, Patent Document 1 describes a technology for enabling a plurality of information processing apparatuses to share a common display screen, and presenting information of a real object present in one work space to the other work space as display information.

CITATION LIST

Patent Document

Patent Document 1: International Publication No. 2017/033544

SUMMARY OF THE INVENTION

Problems to be Solved by the Invention

However, in the technology described in Patent Document 1, generating an image corresponding to an operation body adaptively to an operation of the operation body in a certain place and displaying the image in another place has not been considered.

Therefore, in the present disclosure, proposed are new and improved information processing system, information processing method, and program capable of displaying an image corresponding to an operation body in a certain place adaptively generated for an operation of the operation body in another place.

Solutions to Problems

According to the present disclosure, provided is an information processing system including: an information acquisition unit configured to acquire first transmission information according to an operation of an operation body related to a first user located in a first place, the first transmission information being for communication with a second user located in a second place; and an output control unit configured to display, on a display surface in the second place, an image corresponding to the operation body generated on the basis of a pointing position of the operation body in the second place and a first virtual position of the first user in the second place, the pointing position and the first virtual position being specified on the basis of the first transmission information.

Furthermore, according to the present disclosure, provided is an information processing method including: acquiring first transmission information according to an operation of an operation body related to a first user located in a first place, the first transmission information being for communication with a second user located in a second place; and displaying, by a processor, on a display surface in the second place, an image corresponding to the operation body generated on the basis of a pointing position of the operation body in the second place and a first virtual position of the first user in the second place, the pointing position and the first virtual position being specified on the basis of the first transmission information.

Furthermore, according to the present disclosure, provided is a program for causing a computer to function as: an information acquisition unit configured to acquire first transmission information according to an operation of an operation body related to a first user located in a first place, the first transmission information being for communication with a second user located in a second place; and an output control unit configured to display, on a display surface in the second place, an image corresponding to the operation body generated on the basis of a pointing position of the operation body in the second place and a first virtual position of the first user in the second place, the pointing position and the first virtual position being specified on the basis of the first transmission information.

Effects of the Invention

As described above, according to the present disclosure, an image corresponding to an operating body adaptively generated for an operation of the operation body at a certain place can be displayed at another place. Note that effects described here are not necessarily limited, and any of effects described in the present disclosure may be exhibited.

BRIEF DESCRIPTION OF DRAWINGS

FIG. 7 is a diagram illustrating a state in which the user moves a pointing position of a finger on a screen 20.

FIG. 10 is a diagram illustrating a specific example of a finger position, a hand position, an arm position, and a hand shape of the user's hand on a screen 20.

FIG. 11 is a diagram illustrating a configuration example of an information generation and reproduction rule DB 130 according to the first embodiment.

FIG. 13 is a diagram illustrating display examples of the image corresponding to the hand of the user according to the first embodiment in the situation illustrated in FIG. 7.

FIG. 19 is a diagram illustrating a part of a configuration example of an information generation and reproduction rule DB 130 according to a second embodiment.

FIG. 20A is a diagram illustrating a change example of a display position of an image 32 of a sheet of sticky note based on a drag operation according to the second embodiment.

FIG. 20B is a diagram illustrating a change example of a display position of an image 34 of a group of sticky notes based on a drag operation according to the second embodiment.

FIG. 20C is a diagram illustrating a display example of an image of a locus based on a write operation of the user according to the second embodiment.

FIG. 21 is a diagram illustrating a configuration example of an information conformity rule DB 132 according to a third embodiment.

FIG. 23 is a diagram illustrating a configuration example of an information generation and reproduction rule DB 130 according to a fourth embodiment.

FIG. 25A is a view illustrating a display example of the hand image 30 according to the first embodiment when the user points the hand at a position near the torso of the user.

FIG. 25B is a view illustrating a display example of the hand image 30 according to the first embodiment when the user points the hand at a position distant from the torso of the user.

FIG. 26 is a diagram illustrating a configuration example of an information conformity rule DB 132 according to a fifth embodiment.

FIG. 27 is a diagram illustrating a display example of an image of the hand after correction of transmission information illustrated in FIG. 25B.

FIG. 29 is a diagram illustrating a part of a configuration example of an information generation and reproduction rule DB 130 according to a sixth embodiment.

FIG. 30 is a diagram illustrating a display example of an image of a hand in the situation illustrated in FIG. 28 according to the sixth embodiment.

FIG. 31A is a diagram illustrating an example in which the users are located near the screen 20 in the point A.

FIG. 31B is a diagram illustrating an example in which the users are located near the screen 20 in the point B.

FIG. 32 is a diagram illustrating a part of a configuration example of an information conformity rule DB 132 according to a seventh embodiment.

FIG. 34B is a diagram illustrating a display example of the image 30 of the hand according to the first embodiment at the point A in the situation illustrated in FIG. 34A.

FIG. 35 is a diagram illustrating a part of a configuration example of an information conformity rule DB 132 according to an eighth embodiment.

FIG. 36A is a diagram schematically illustrating a correction example of an arm position of a teacher according to the eighth embodiment.

FIG. 37 is a diagram illustrating a part of a configuration example of an information generation and reproduction rule DB 130 according to a ninth embodiment.

FIG. 38C is a diagram illustrating a movement example of the virtual arm position and the virtual hand position at the time of movement of a pointing position.

FIG. 39 is a diagram illustrating a configuration example of an information generation and reproduction rule DB 130 according to a tenth embodiment.

FIG. 41 is a diagram illustrating a part of a configuration example of an information generation and reproduction rule DB 130 according to an eleventh embodiment.

FIG. 43 is a diagram illustrating a part of a configuration example of an information generation and reproduction rule DB 130 according to a twelfth embodiment.

FIG. 45 is a diagram illustrating a part of a configuration example of an information generation and reproduction rule DB 130 according to a thirteenth embodiment.

FIG. 47 is a diagram illustrating a part of a configuration example of an information generation and reproduction rule DB 130 according to a fourteenth embodiment.

FIG. 49 is a diagram illustrating a part of a configuration example of an information generation and reproduction rule DB 130 according to a fifteenth embodiment.

FIG. 51A is a diagram illustrating a display example of images corresponding to individual sticky notes 32 in accordance with a cumulative number of times of pointing at the sticky notes 32 according to a sixteenth embodiment.

FIG. 51B is a diagram illustrating another display example of the images corresponding to individual sticky notes 32 in accordance with a cumulative number of times of pointing at the sticky notes 32 according to the sixteenth embodiment.

FIG. 51C is a diagram illustrating another display example of the images corresponding to individual sticky notes 32 in accordance with a cumulative number of times of pointing at the sticky notes 32 according to the sixteenth embodiment.

FIG. 55A is a diagram illustrating an example of an appearance of the screen 20 at the principal point. FIG. 55A is a diagram illustrating a selection example of objects shared at another point.

FIG. 55B is a diagram illustrating an example of the appearance of the screen 20 at another point at the timing illustrated in FIG. 55A.

MODE FOR CARRYING OUT THE INVENTION

Figure 1:
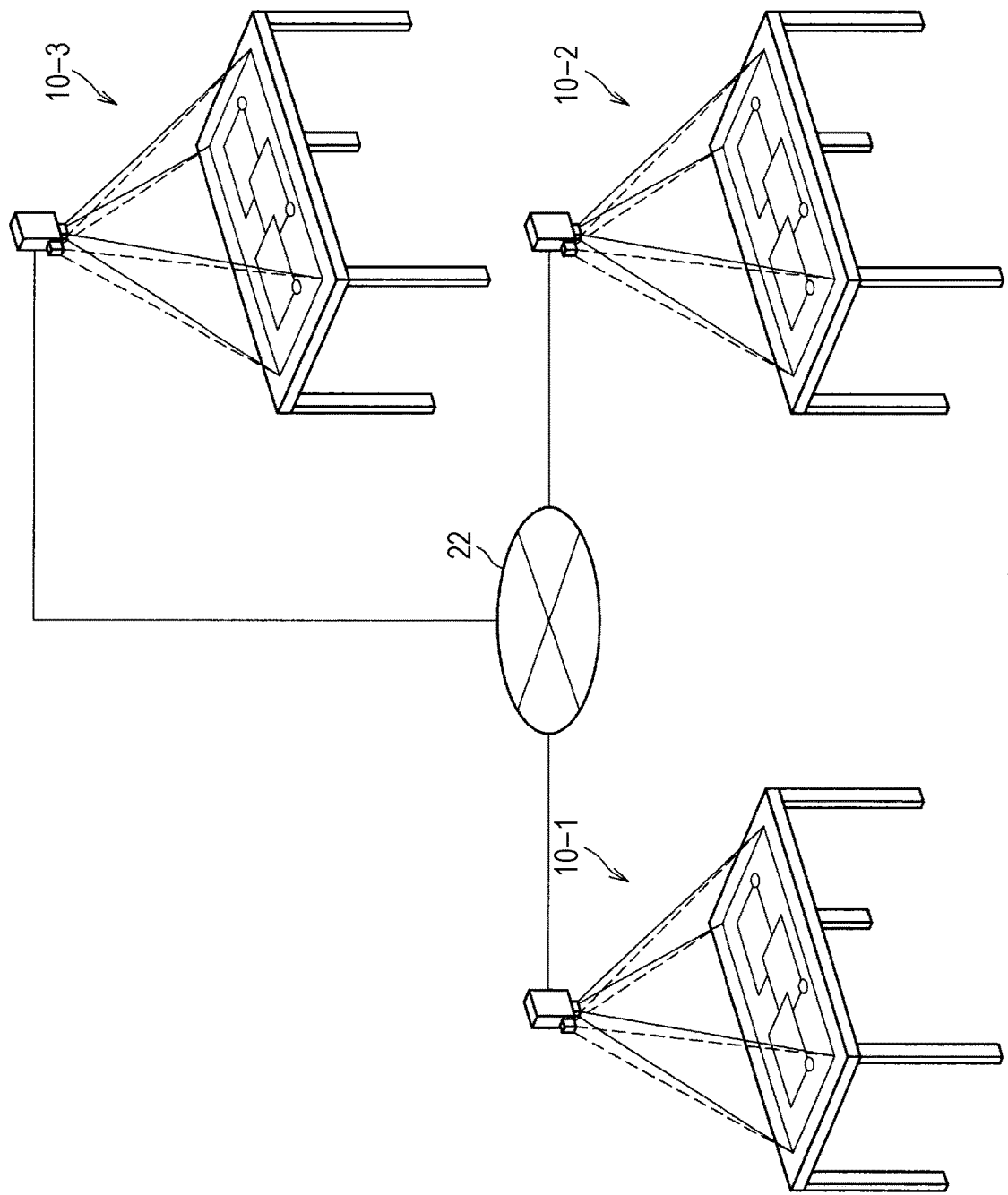
FIG. 1 is a diagram illustrating an example in which information processing systems 10 installed at a plurality of points is connected via a communication network 22.

Favorable embodiments of the present disclosure will be described in detail with reference to the appended drawings. Note that, in the present specification and drawings, redundant description of configuration elements having substantially the same functional configuration is omitted by providing the same sign.

Furthermore, in the present specification and the drawings, a plurality of configuration elements having substantially the same functional configuration may be distinguished by providing different alphabets to the same reference numeral. For example, a plurality of configuration elements having substantially the same functional configuration is distinguished such as a table 90a and a table 90b as needed. However, in a case where there is no need to distinguish the plurality of configuration elements having substantially the same functional configuration, only the same reference numeral will be provided. For example, in the case where there is no need to distinguish the table 90a and the table 90b, these tables are simply referred to as table(s) 90.

Furthermore, "modes for carrying out the invention" will be described according to the order of items illustrated below.

1. Configuration of Information Processing System
2. First Embodiment
3. Second Embodiment
4. Third Embodiment
5. Fourth Embodiment
6. Fifth Embodiment
7. Sixth Embodiment
8. Seventh Embodiment
9. Eighth Embodiment
10. Ninth Embodiment
11. Tenth Embodiment
12. Eleventh Embodiment
13. Twelfth Embodiment
14. Thirteenth Embodiment
15. Fourteenth Embodiment
16. Fifteenth Embodiment
17. Sixteenth Embodiment
18. Seventeenth Embodiment
19. Eighteenth Embodiment
20. Nineteenth Embodiment
21. Twentieth Embodiment
22. Hardware Configuration
23. Modification 1. Configuration of Information Processing System First, a configuration example of an information processing system common to embodiments of the present disclosure will be described with reference to FIG. 1. In each embodiment, a scene where an information processing system 10 is installed at every point is assumed. Here, the point is an example of a "place" according to the present disclosure. For example, as illustrated in FIG. 1, the information processing system 10 is installed at each of a plurality of points (for example, three or more points). Then, the information processing systems 10 at the respective points can be communicatively connected to one another via a communication network 22 to be described below.

In the present specification, a system may mean a configuration for executing predetermined processing. The system may include one device or may include a plurality of devices. Furthermore, the information processing system 10 according to each embodiment is only required to be able to execute the predetermined processing as the entire information processing system 10, and which configuration in the information processing system 10 being regarded as one device is arbitrary.

Note that, in the present specification and drawings, the information processing systems 10 at the respective points may be distinguished by adding different numbers to after the "information processing systems 10". For example, the information processing system 10 at a "point A" may be described as information processing system 10-1, and the information processing system 10 at a "point B" may be described as information processing system 10-2 or the like.

1-1. Communication Network 22

The communication network 22 is a wired or wireless transmission path of information transmitted from a device connected to the communication network 22. For example, the communication network 22 may include a public network such as a telephone network, the Internet, and a satellite network, various local area networks including Ethernet (registered trademark), a wide area network (WAN), and the like. Furthermore, the communication network 22 may include a leased line network such as an internet protocol-virtual private network (IP-VPN).

1-2. Information Processing System 10

Figure 2:
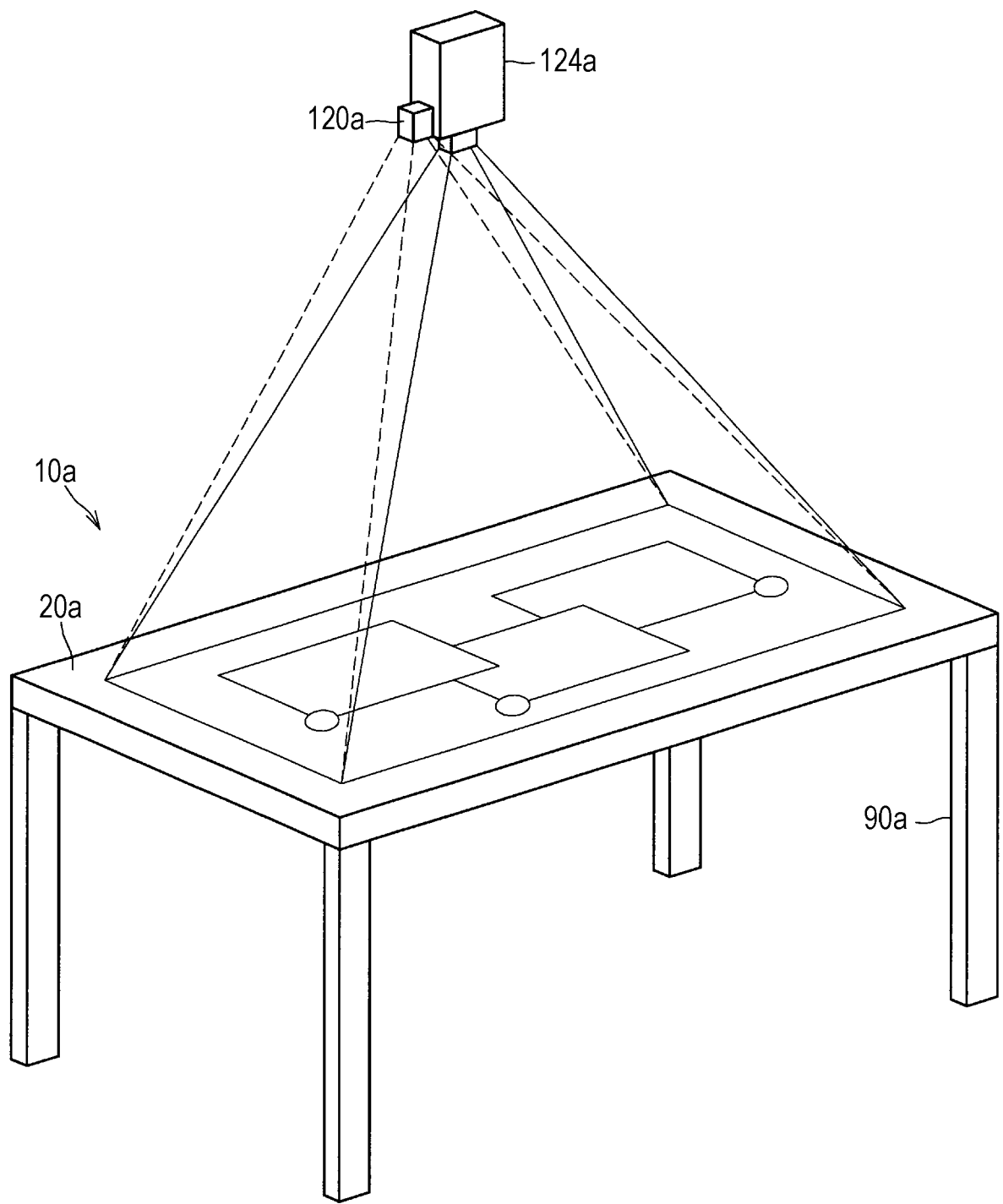
FIG. 2 is a diagram illustrating a configuration example of an information processing system 10 common to embodiments of the present disclosure.

FIG. 2 is a diagram illustrating a configuration example of the information processing system 10 according to each embodiment. Referring to FIG. 2, an information processing system 10a according to each embodiment includes an input unit 120a and an output unit 124a.

1-2-1. Output Unit 124

The output unit 124a displays various types of information on the table 90a. The output unit 124a can include a projection unit (projector). For example, as illustrated in FIG. 2, the output unit 124a can be arranged above the table 90a to be separated from the table 90a by a predetermined distance in a state of being suspended from a ceiling. In this case, the output unit 124a can project information on a top surface of the table 90a. For example, the output unit 124a may be a pendant light or a desk stand light. Such a method of displaying information on the top surface of the table 90*a* from above is also referred to as "projection type". Furthermore, hereinafter, the top surface of the table 90 may be referred to as a screen 20. The screen 20 includes a plane (display surface) to be projected by the output unit 124.

For example, the output unit 124*a* displays a virtual display object according to the control of a display processing unit 122 to be described below. The display object is, for example, a window, a UI object, or the like. The UI object is a predetermined image (a still image or a moving image) that receives various operations (such as selection and input) by a user. For example, the UI object is an image including a graphical user interface (GUI) component (for example, a button, a slider, a check box, a text box, a software keyboard, or the like). Furthermore, the UI object can be arranged in the window.

Moreover, the output unit 124*a* can include a sound output device such as a speaker, for example. For example, the output unit 124*a* outputs a sound according to the control of the display processing unit 122 and the like.

1-2-2. Input Unit 120

The input unit 120*a* includes, for example, a camera that images an image of the table 90*a* with one lens. Alternatively, the input unit 120*a* can include a stereo camera capable of recording information in a depth direction by imaging the table 90*a* with two lenses. As the stereo camera, for example, a visible light camera, an invisible light camera capable of detecting invisible light such as infrared light, or the like can be used. Furthermore, the input unit 120*a* can further include a sound input device such as a microphone that collects a voice uttered by the user and an environmental sound of a surrounding environment.

In the case where the above camera is used as the input unit 120*a*, the information processing system 10*a* analyzes the image (captured image) imaged by the camera to determine the position of an object (for example, a hand of the user, or the like) located on the screen 20. Furthermore, in the case where the stereo camera is used as the input unit 120*a*, the information processing system 10*a* analyzes the image imaged by the stereo camera to be able to acquire depth information of the object in addition to position information of the object located on the screen 20. The information processing system 10*a* can detect contact or proximity of the hand of the user to the screen 20, and detachment of the hand from the screen 20 on the basis of the depth information. Note that the input unit 120*a* may include a depth sensor (for example, a time of flight sensor, a structured light sensor, or the like) instead of the stereo camera. In this case, the depth sensor can obtain the depth information of the object located on the screen 20.

In each embodiment, the position of an operation body (various operation members and the like such as a hand of the user and a stylus, for example) on the screen 20 is detected on the basis of the image imaged by the input unit 120*a*, and various types of information can be input on the basis of the detected position of the operation body. That is, the user can perform various operation inputs by moving the operation body on the screen 20. For example, when a contact of the hand of the user with respect to the window or the UI object is detected, an operation input with respect to the window or the UI object is performed.

Furthermore, the camera included in the input unit 120*a* may capture not only the top surface of the table 90*a* but also the user present around the table 90*a*. In this case, the information processing system 10*a* can detect the position of the user around the table 90*a* on the basis of the captured image by the input unit 120*a*. Furthermore, the information processing system 10*a* may perform personal recognition of the user by extracting physical characteristics (such as the size of the face and the body) with which the individual user is specifiable on the basis of the captured image.

The present invention is not limited to the above-described example, and the operation input by the user may be executed by another method. For example, the input unit 120*a* may be installed as a touch panel on the top surface (screen 20*a*) of the table 90*a*. Then, the operation input of the user may be detected by a contact of a finger or the like of the user with respect to the touch panel. Furthermore, the operation input of the user may be detected by a gesture with respect to the camera included in the input unit 120*a*.

1-2-3. Modifications

Figure 4:
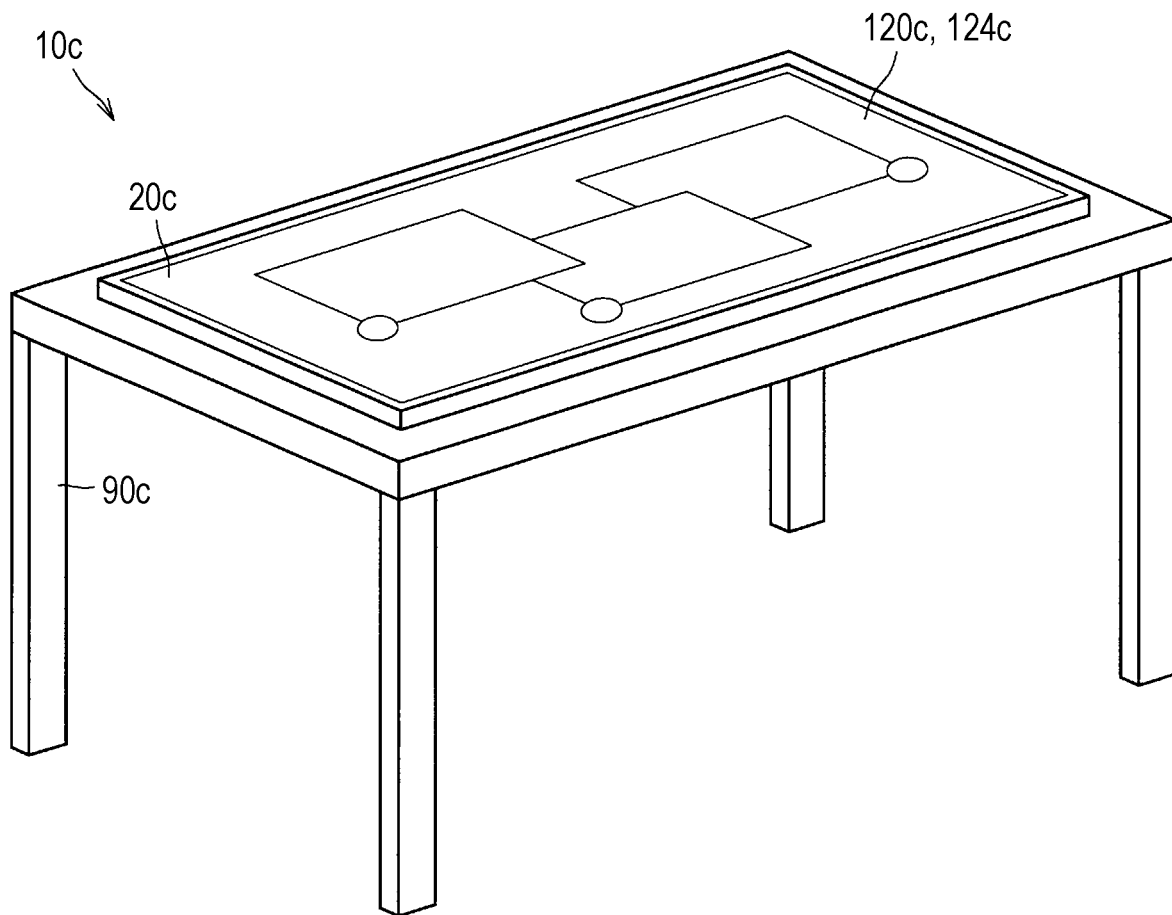
FIG. 4 is a diagram illustrating another configuration example of the information processing system 10 common to the embodiments.
Figure 5:
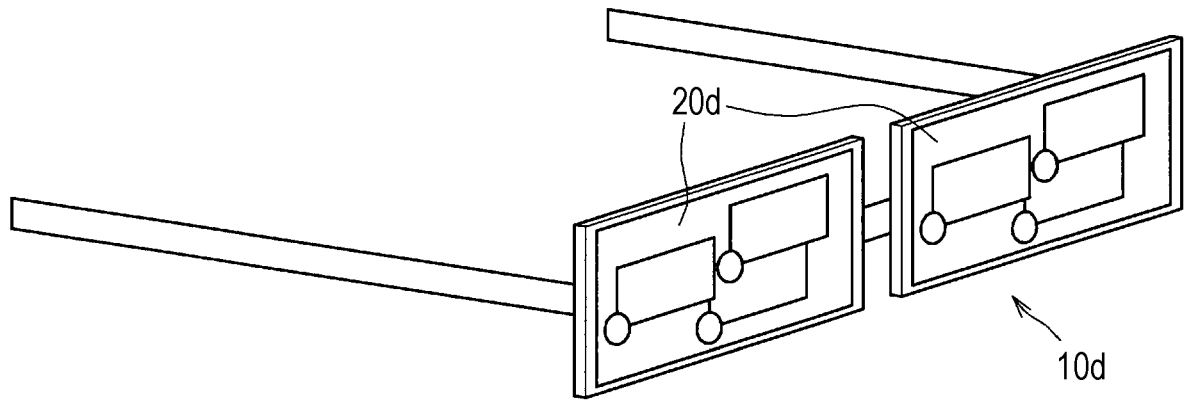
FIG. 5 is a diagram illustrating another configuration example of the information processing system 10 common to the embodiments.

The configuration of the information processing system 10*a* according to each embodiment has been described above. Note that the configuration of the information processing system 10 according to each embodiment is not limited to the example illustrated in FIG. 2 and may be configurations as illustrated in FIGS. 3 to 5, for example.

1-2-3-1. First Modification

Figure 3:
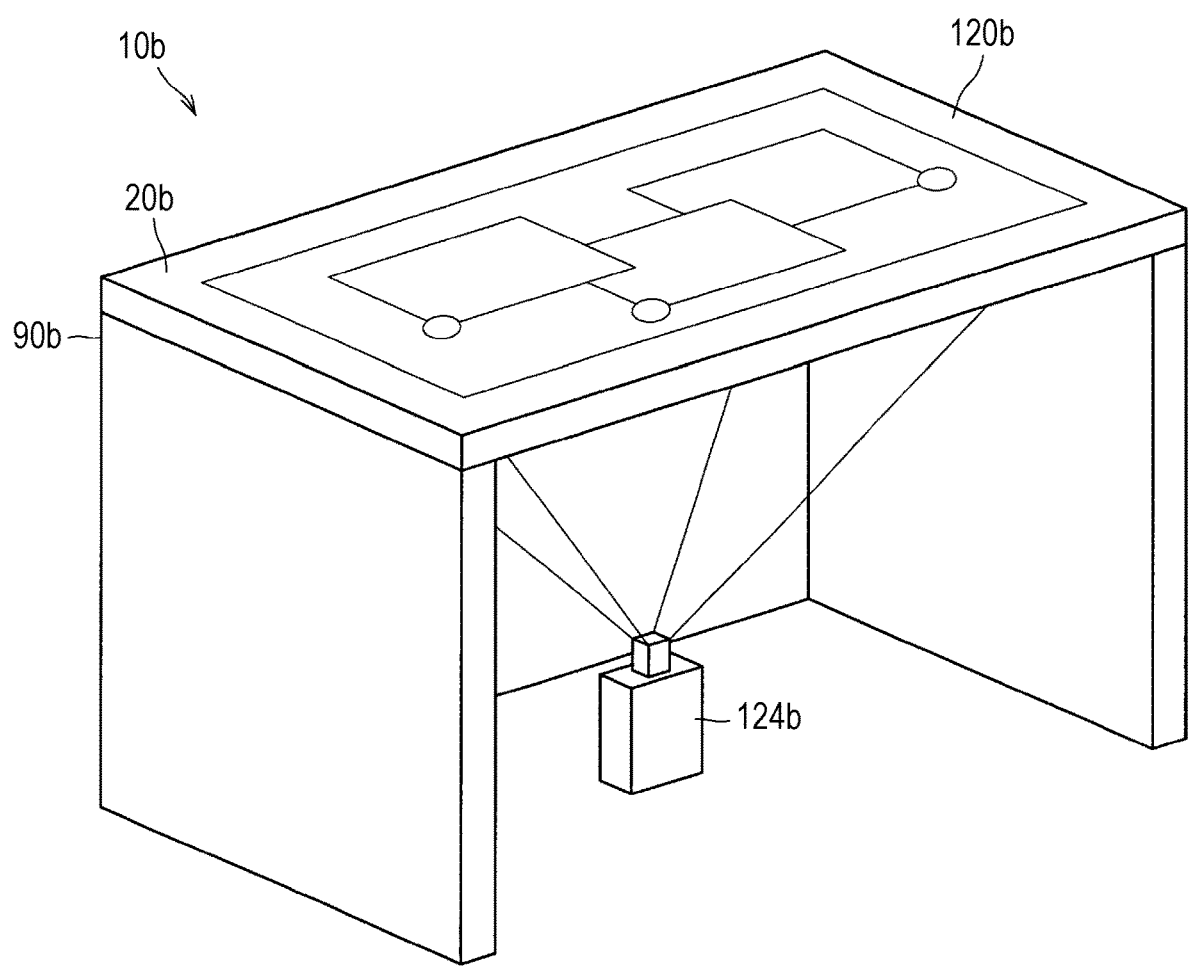
FIG. 3 is a diagram illustrating another configuration example of the information processing system 10 common to the embodiments.

FIG. 3 is a diagram illustrating another configuration example (information processing system 10*b*) of the information processing system 10 according to each embodiment. As illustrated in FIG. 3, in the information processing system 10*b*, an output unit 124*b* is arranged below the table 90*b*. The output unit 124*b* is, for example, a projector, and projects information toward a top plate of the table 90*b* from below. For example, the top plate of the table 90*b* includes a transparent material such as a glass plate or a transparent plastic plate. Then, the information projected by the output unit 124*b* is displayed on the top surface (screen 20*b*) of the table 90*b* (through the top plate). The method of displaying information on the screen 20*b* by causing the output unit 124*b* to project the information from below the table 90*b* in this manner is also referred to as "rear projection type".

Furthermore, in the example illustrated in FIG. 3, an input unit 120*b* is provided on the screen 20*b* (display surface). The input unit 120*b* is configured by, for example, a touch panel. In this case, when a contact of the operation body to the screen 20*b* is detected by the touch panel, the operation input by the user is performed. However, the present invention is not limited to such an example, and the input unit 120*b* may be installed below the table 90*b* separately from the table 90*b*, as in the information processing system 10*a* illustrated in FIG. 2. In this case, the input unit 120*b* includes a camera, and then the camera can capture the operation body located on the screen 20*b* through the top plate of the table 90*b*. Then, the position of the operation body can be detected on the basis of the captured image.

1-2-3-2. Second Modification

FIG. 4 is a diagram illustrating still another configuration example (information processing system 10*c*) of the information processing system 10 according to each embodiment. As illustrated in FIG. 4, in the information processing system 10*c*, a touch panel display is installed on a table 90*c* with its display surface facing upward. In the information processing system 10*c*, an input unit 120*c* and an output unit 124*c* can be integrally configured as the touch panel display.

That is, various types of information is displayed on a display screen (screen 20c) of the display, and when a contact of the operation body with respect to the display screen of the display is detected by the touch panel, the operation input by the user is performed. Note that, in the information processing system 10c, a camera (an example of the input unit 120c) may be installed above the output unit 124c, as in the information processing system 10a illustrated in FIG. 2. In this case, the positions and the like of individual users located around the table 90c can be detected on the basis of a captured image by the camera.

1-2-3-3. Third Modification

FIG. 5 is a diagram illustrating still another configuration example (information processing system 10d) of the information processing system 10 according to each embodiment. As illustrated in FIG. 5, the information processing system 10d can be configured as a head mounted device (for example, a glasses-type device or the like) such as a head mounted display (HMD), for example. The head mounted device can include an input unit 120d (not illustrated) and an output unit 124d (not illustrated). The output unit 124d may be configured as a transmissive display device. In this case, the output unit 124d projects a video on at least a partial region of each of a right-eye lens and a left-eye lens (or a goggle type lens) included in the head mounted device as projection surfaces (screens 20d).

Alternatively, the output unit 124d may be configured as a non-transmissive display device. For example, the output unit 124d can include a liquid crystal display (LCD), an organic light emitting diode (OLED), and the like. In this case, the camera included in the input unit 120d may capture a video in front of the user wearing the head mounted device, and the output unit 124d may sequentially display the captured video. Thereby, the user can view the scenery in front of the user through the video displayed on the output unit 124d.

1-2-4. Summary of Issues

The configuration of the information processing system 10 according to each embodiment has been described above. By the way, communication is desired between users located at different points on the basis of information acquired by the input units 120 at the respective points.

In this case, if the video itself acquired by the input unit 120 at each point is shared, performing image processing is required in real time. Therefore, a calculation load may be large and a transmission cost may be large.

Figure 6:
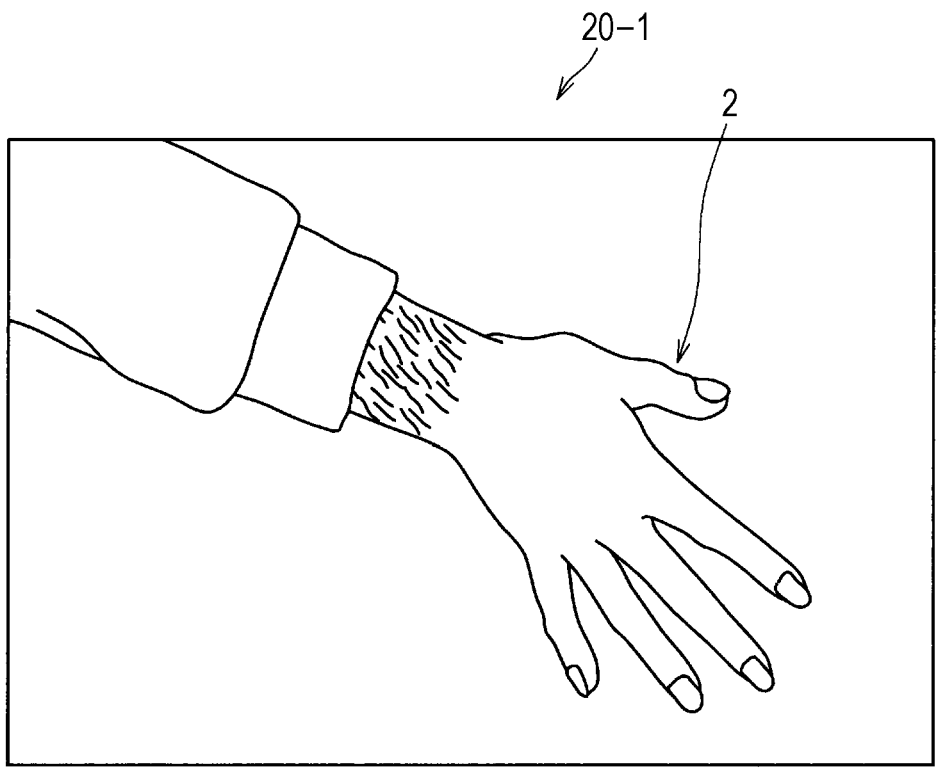
FIG. 6 is a diagram illustrating a state in which a user wears at-home clothes.

Furthermore, in the case where the video itself is transmitted, information unnecessary for the communication (for a discussion or the like, for example) may be transmitted. Therefore, such transmission of information may adversely affect the communication. For example, when a certain point is a home of the user and the user is wearing at-home clothes as illustrated in FIG. 6, a video of the at-home clothes of the user and body information of the user (for example, arm hair or the like) may be transmitted to another user located at a different point. However, it is assumed that some user does not want another user at a different point to see the video of the clothes and skin of the user. In this case, the user may have a difficulty in concentrating on the discussion with the remote user. The user may feel inconvenient, for example, feeling that the user needs to change the clothes in order to communicate with the remote user.

Figure 8:
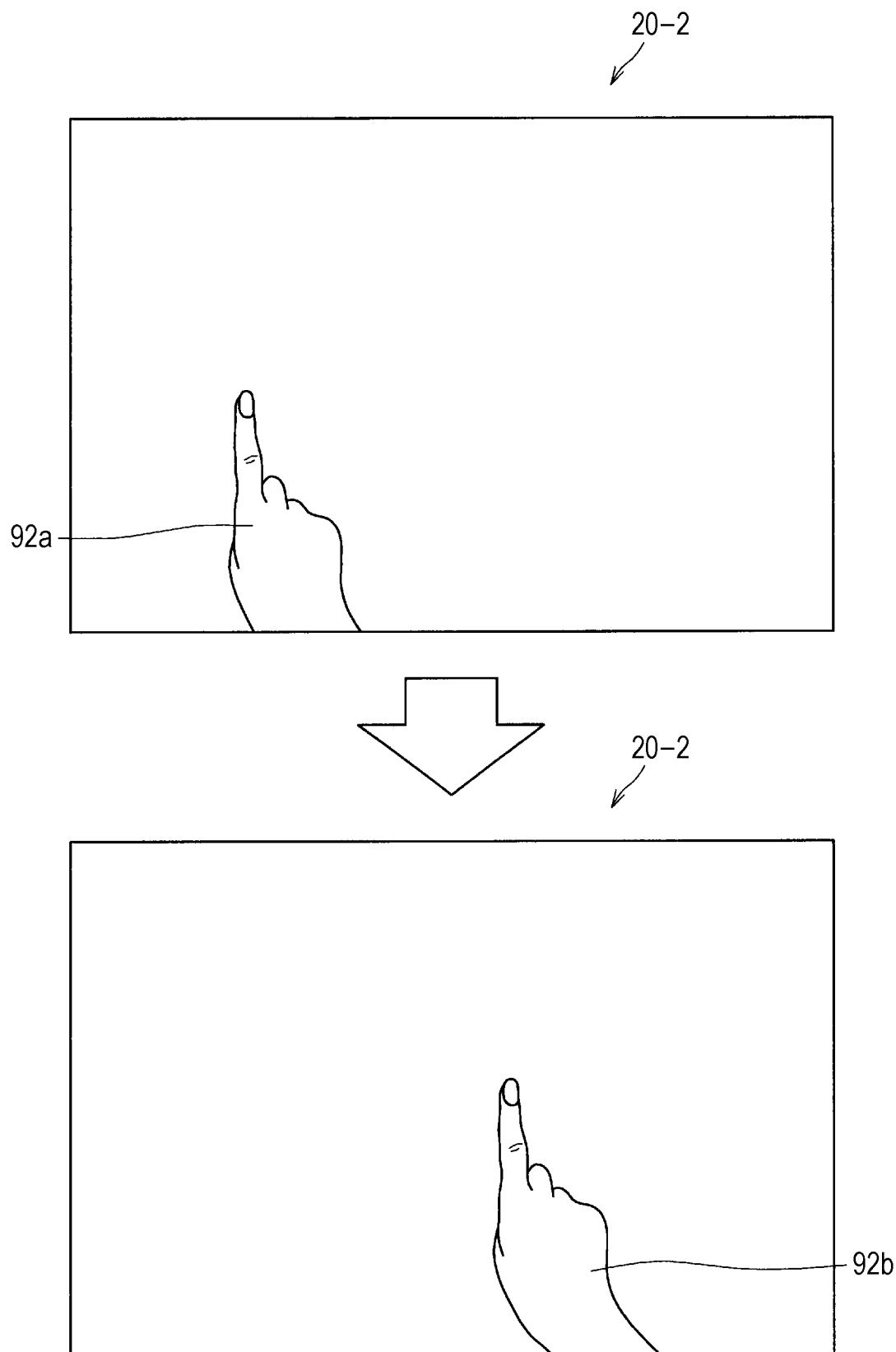
FIG. 8 is a diagram illustrating an example of reproducing movement of a hand by transmitting only information of a pointing position of the hand to another point in the situation illustrated in FIG. 7.

Note that a method of transmitting only a pointing position of the user among the information acquired by the input unit 120 at each point to another point is conceivable. For example, as illustrated in FIG. 7, in a scene where the hand of the user is used as the operation body, a method of transmitting only information of the pointing position of the hand to another point is conceivable. However, by this method, as illustrated in FIG. 8, for example, a video 92 in which the wrist, the arm, and the like moving with the same change amount (in other words, in the same direction by the same distance) as change in the pointing position (the position of the index finger in the example illustrated in FIG. 8) may be displayed on a screen 20-2 at the another point. Therefore, the user located at the another point may feel lack of realistic feeling when looking at the video 92.

Therefore, the information processing system 10 according to each embodiment has been made in consideration of the above circumstances. The information processing system 10 according to each embodiment can acquire first transmission information according to an operation of an operation body related to a first user located at a first point, the first transmission information being for communication with a second user located at a second point, and then display an image corresponding to the operation body generated on the basis of a pointing position of the operation body at the second point and a first virtual position of the first user at the second point, the pointing position and the first virtual position being specified on the basis of the first transmission information, on a display surface in the second point. Thereby, the amount of information transmitted between different points can be reduced while realizing smooth communication between the different points.

Here, the operation body related to the user may be a hand of the user or may be an operation device (for example, a stylus, a mouse, a keyboard, a touch panel, or the like) being used by the user.

For example, in a case where the operation body is the hand of the user, the first transmission information can include information of the pointing position of the hand, position information of the hand, and position information of the arm (on the same side as the hand). Moreover, the first transmission information may include the shape of the hand (for example, whether or not the appropriate hand is open, or the like). Here, the position of the hand (hereinafter sometimes referred to as hand position) is an example of a "second virtual position" according to the present disclosure. Furthermore, the position of the arm (hereinafter sometimes referred to as arm position) is an example of the "first virtual position" according to the present disclosure. Alternatively, in a case where the operation body is the operation device, the first transmission information can include information of the pointing position corresponding to the operation device. Hereinafter, an example in which the operation body is the hand of the user will be mainly described.

Note that, in the present specification and drawings, the description "hand" is mainly used as an expression meaning the hand itself. However, the present invention is not limited to such an example, and the description "hand" may be used as an expression meaning the finger, hand, arm, or two or more of the aforementioned parts (for example, upper limb or the like). Hereinafter, the content of each embodiment will be sequentially described in detail.

2. First Embodiment 2-1. Functional Configuration

Figure 9:
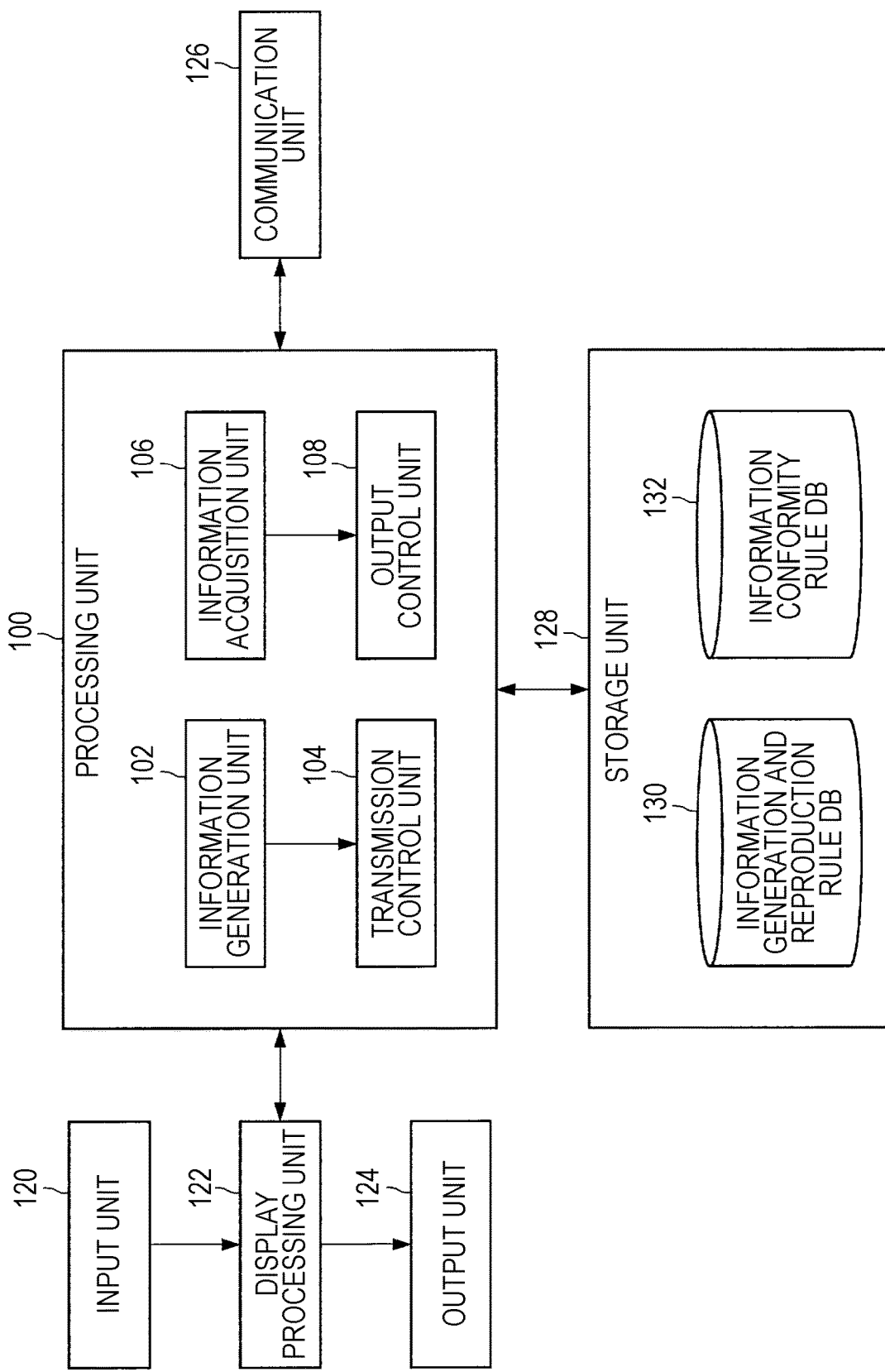
FIG. 9 is a block diagram illustrating a functional configuration of the information processing system 10 according to a first embodiment.

First, a functional configuration according to a first embodiment will be described in detail. FIG. 9 is a block diagram illustrating a functional configuration of an information processing system 10 according to the first embodiment. As illustrated in FIG. 9, the information processing system 10 includes a processing unit 100, an input unit 120, a display processing unit 122, an output unit 124, a communication unit 126, and a storage unit 128. Note that, hereinafter, description of the same content as the above description will be omitted.

2-1-1. Display Processing Unit 122

The display processing unit 122 may to include one or a plurality of processing circuits (for example, a central processing unit (CPU), a graphics processing unit (GPU), and the like). The display processing unit 122 performs processing regarding graphics to be displayed by the output unit 124 on the basis of input information acquired by the input unit 120. For example, the display processing unit 122 performs drawing control of a display object such as a window or performs drawing processing for the individual display object according to an operation of the user.

Moreover, the display processing unit 122 can output the input information (for example, a captured image or the like) acquired by the input unit 120 to the processing unit 100 to be described below. Furthermore, the display processing unit 122 receives information processed by the processing unit 100 from the processing unit 100, and performs the drawing processing on the basis of the information.

2-1-2. Processing Unit 100

The processing unit 100 can include one or a plurality of processing circuits (for example, a CPU 150 to be described below and the like). The processing unit 100 performs various types of processing on the basis of the input information acquired by the input unit 120.

Furthermore, as illustrated in FIG. 9, the processing unit 100 includes an information generation unit 102, a transmission control unit 104, an information acquisition unit 106, and an output control unit 108.

2-1-3. Information Generation Unit 102

The information generation unit 102 generates transmission information for communication with the other user located at another point on the basis of the various types of information acquired by the input unit 120.

For example, the information generation unit 102 first acquires information regarding the operation body (for example, the hand of the user or the like) being used by an individual user at a principal point on the basis of the various types of information acquired by the input unit 120. Then, the information generation unit 102 generates the transmission information according to the acquired information. For example, the transmission information has a smaller amount of information than the information regarding the operation body. As an example, the transmission information is abstracted information of the information regarding the operation body. Here, the principal point is an example of a second point according to the present disclosure. The principal point can be a point (current point) where the appropriate information processing system 10 is located.

2-1-3-1. Generation Example 1

For example, in the case where the operation body is the hand of the user, the information generation unit 102 generates the transmission information on the basis of the input information (the captured image and the like) acquired by the input unit 120 and an information generation and reproduction rule DB 130 to be described below. Here, the information generation and reproduction rule DB 130 is a database in which a rule at the time of generation of the transmission information and a rule at the time of reproduction of the transmission information when the transmission information is received from another point (for example, display of a video according to the transmission information) are registered. FIG. 11 is a diagram illustrating a configuration example of the information generation and reproduction rule DB 130. As illustrated in FIG. 11, in the information generation and reproduction rule DB 130, for example, an ID 1300, an information type 1302, a condition at generation 1304, processing at generation 1306, and processing at reproduction 1308 are associated. The ID 1300 records identification information of an individual information type that can be included in the transmission information. The information type 1302 records a type of information corresponding to the appropriate ID. The condition at generation 1304 records a condition under which the information generation unit 102 generates information of the appropriate information type. The processing at generation 1306 records content of processing performed by the information generation unit 102 at the time of generating the information of the appropriate information type. The processing at reproduction 1308 records processing content of when reproducing the information of the appropriate information type included in the transmission information when the transmission information is received at another point.

In the example illustrated in FIG. 11, the information generation unit 102 first specifies position information of the finger, hand, and arm with respect to the screen 20, and the shape of the hand, regarding the individual hand located on the screen 20 on the basis of the input information acquired by the input unit 120. For example, in the example illustrated in FIG. 10, the information generation unit 102 specifies finger position information Pf0 as (500, 600) and hand position information Ph0 as (640, 800), and arm position information Pa0 as (700, 1080) for a hand 2a on the basis of the captured image acquired by the input unit 120. Moreover, the information generation unit 102 specifies the shape of the hand 2a as a "shape in which the palm is closed".

Moreover, the information generation unit 102 may specify information (for example, the position, shape, texture, and the like) regarding individual object arranged on the screen 20-1 on the basis of the input information. Moreover, the information generation unit 102 may specify sound information (for example, a voice uttered by the appropriate user, an environmental sound, and the like) at the principal point on the basis of the input information. Then, the information generation unit 102 can generate transmission information to include all the pieces of information.

2-1-3-2. Generation Example 2

Alternatively, in the case where the operation body is the operation device, the information generation unit 102 generates the transmission information on the basis of operation information acquired from the operation device and the information generation and reproduction rule DB 130. For example, the information generation unit 102 generates the transmission information to include at least the pointing position of the operation device.

2-1-4. Transmission Control Unit 104

The transmission control unit 104 controls transmission of the transmission information generated by the information generation unit 102 to another point. For example, the transmission control unit 104 causes the communication unit 126 to be described below to transmit the generated transmission information to the information processing systems 10 at individual other points currently in communication.

2-1-5. Information Acquisition Unit 106

The information acquisition unit 106 performs reception or read processing to acquire the transmission information from the communication unit 126, which has been received from another point by the communication unit 126.

2-1-6. Output Control Unit 108

The output control unit 108 controls the output of various types of information to the output unit 124 on the basis of the transmission information acquired by the information acquisition unit 106. For example, the output control unit 108 displays an image corresponding to the operation body generated on the basis of the pointing position of the operation body corresponding to the transmission information (for example, the hand of the user or the like (in the point) of a transmission source of the transmission information) at the principal point (in other words, the point where the appropriate information processing system 10 is located), and the arm position of the user of the transmission source of the transmission information at the principal point, the pointing position and the arm position being specified on the basis of the acquired transmission information, on the screen 20 (display surface) in the principal point.

Figure 12:
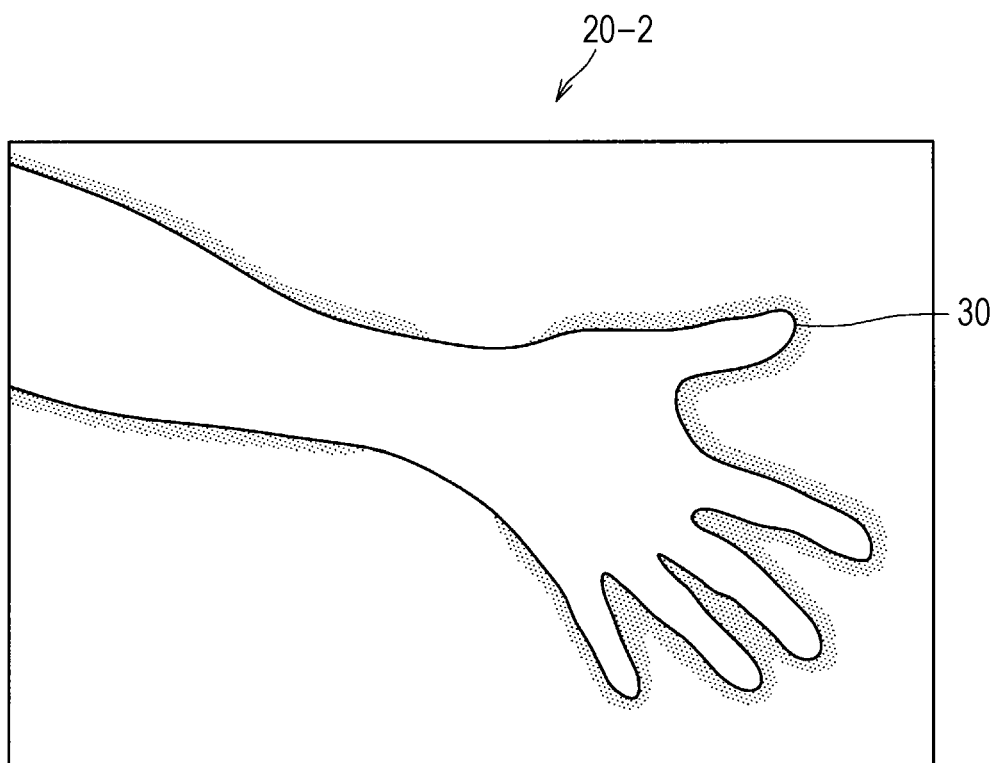
FIG. 12 is a diagram illustrating a generation example of an image corresponding to the hand of the user according to the first embodiment.

As an example, the output control unit 108 first specifies the pointing position of the hand of the user of the transmission source, a virtual hand position of the user of the transmission source, and a virtual arm position of the user of the transmission source at the principal point on the basis of the position information of the finger, hand, and arm of the user at the point of the transmission source included in the acquired transmission information. Next, the output control unit 108 generates (reconstructs) an image corresponding to the hand of the user of the transmission source in full size, as illustrated in FIG. 12, for example, on the basis of the specified pointing position at the principal point of the hand of the user of the transmission source, the specified virtual hand position of the user of the transmission source, the specified virtual arm position of the user of the transmission source, and the information of the shape of the hand included in the transmission information at the principal position. For example, the output control unit 108 generates an image corresponding to the hand of the user on the basis of the pointing position of the hand of the user of the transmission source, the virtual hand position of the user of the transmission source, the virtual arm position of the user of the transmission source, the information of the shape of the hand, and modeling data of a predetermined hand. Then, the output control unit 108 displays the generated image on the screen 20 in the principal point, as illustrated in FIG. 13, for example.

According to this display example, in the scene where the hand of the user is used as the operation body at the point of the transmission source, and the pointing position is moved by the user moving the hand, as illustrated in FIG. 7, for example, the output control unit 108 can reproduce natural movement of the hand reflecting movement of the wrist and joints regarding the hand of the user at the point of the transmission source. For example, when the transmission information corresponding to the hand 2a illustrated in FIG. 7 is received, the output control unit 108 displays an image 30a illustrated in FIG. 13 on the screen 20-2 at the principal point. Similarly, when the transmission information corresponding to a hand 2b illustrated in FIG. 7 is received, the output control unit 108 displays an image 30b illustrated in FIG. 13 on the screen 20-2 at the principal point. In this way, more natural hand movement can be reproduced in comparison with the known technique illustrated in FIG. 8, for example. For example, in a scene where a meeting with a remote place is performed, a video without discomfort can be presented to the remote place without changing pointing information.

2-1-7. Communication Unit 126

The communication unit 126 transmits and receives various types of information to and from the information processing system at another point according to the control of the transmission control unit 104. For example, the communication unit 126 transmits the transmission information generated by the information generation unit 102 to the information processing systems 10 at other points currently in communication according to the control of the transmission control unit 104. Furthermore, the communication unit 126 receives the transmission information generated by the information processing system 10 at another point from the another point.

For example, in a case of communication with the information processing system 10 within the same point, the communication unit 126 performs general inter-process communication. Furthermore, in a case of communication between different points, the communication unit 126 performs communication via the communication network 22.

2-1-8. Storage Unit 128

The storage unit 128 stores various data and various types of software. For example, the storage unit 128 stores an information generation and reproduction rule DB 130 and an information conformity rule DB 132. The information conformity rule DB 132 is a database in which a rule for determining appropriateness of presenting transmission information received from another point to the user are registered. The information conformity rule DB 132 can be realized, for example, in the form of a relational database or a look-up table.

FIG. 21 is a diagram illustrating a configuration example of the information conformity rule DB 132. As illustrated in FIG. 21, in the information conformity rule DB 132, for example, an ID 1320, an information type 1322, a check target 1324, a conformity condition 1326, and processing at condition unestablished 1328 are associated. Here, the ID 1320 records an identification number of an individual conformity rule. The information type 1322 records a type of information that can be included in the conformity rule corresponding to the appropriate ID. The check target 1324 records a type of target to be checked in the appropriate conformity rule. The conformity condition 1326 records a condition in which the appropriate check target being conformable is determined. The processing at condition unestablished 1328 records content of processing executed when the appropriate check target being not conformable is determined.

2-2. Flow of Processing

The functional configuration according to the first embodiment has been described above. Next, a flow of processing according to the first embodiment will be described in "2-2-1. Flow of Processing at the Time of Generating Transmission Information" and "2-2-2. Flow of Processing At the Time of Reproducing Transmission Information". Note that the information processing system 10 at each point can basically execute the "flow of processing at the time of generating transmission information" and the "flow of processing at the time of reproducing transmission information" in parallel.

2-2-1. Flow of Processing at the Time of Generating Transmission Information

2-2-1-1. Overall Flow

Figure 14:
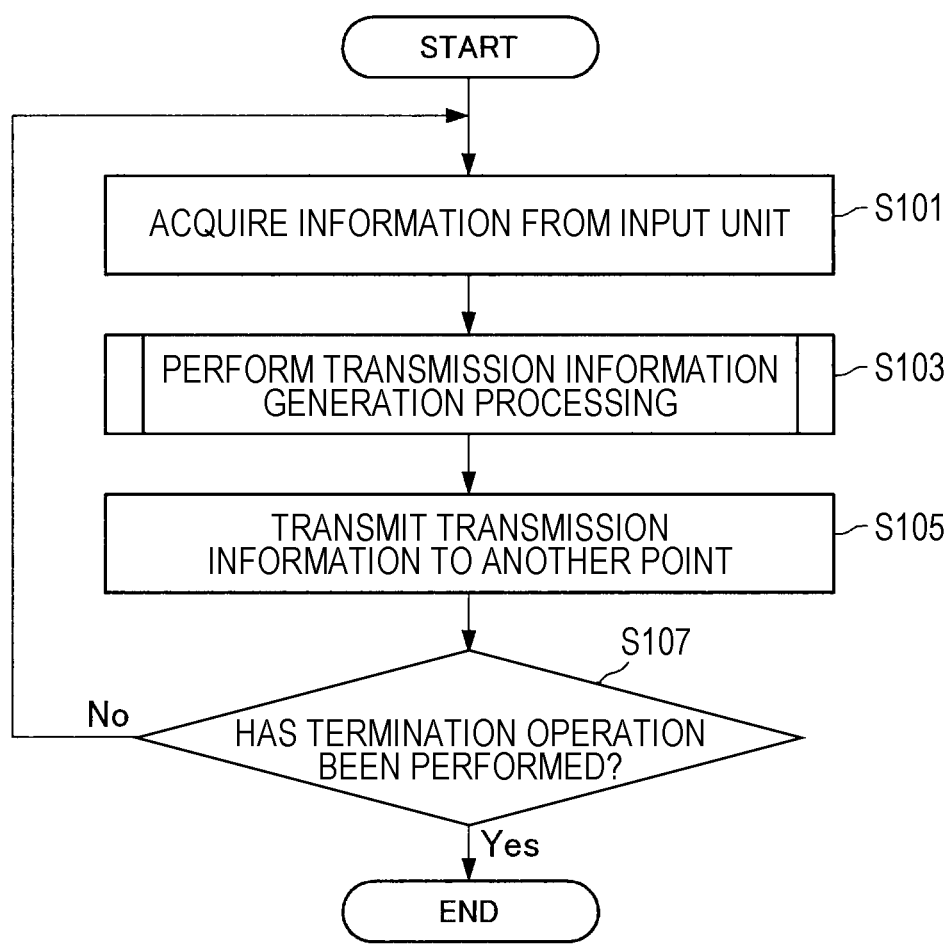
FIG. 14 is a flowchart illustrating a "flow of processing at the time of generating transmission information" according to the first embodiment.
Figure 15:
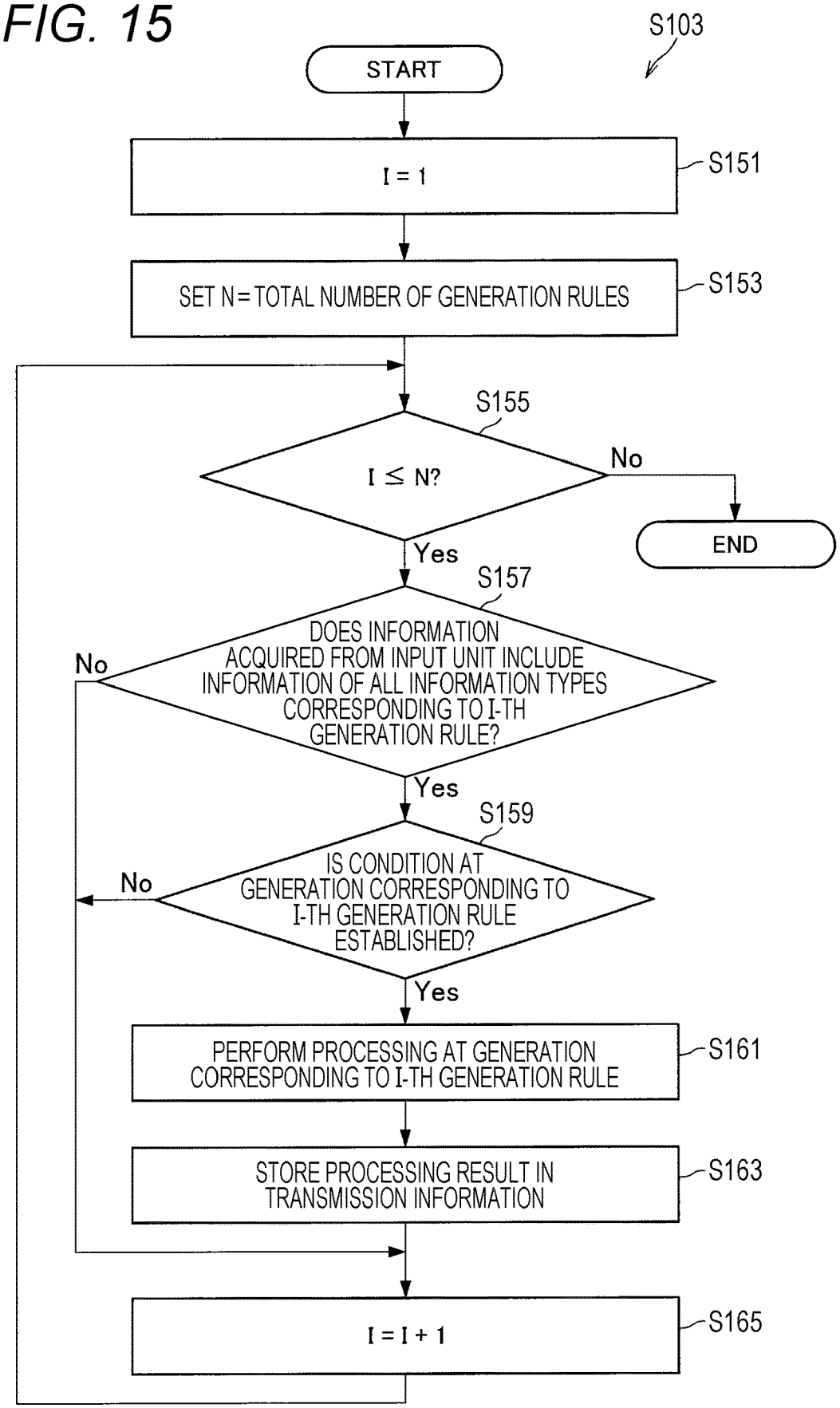
FIG. 15 is a flowchart illustrating a flow of "transmission information generation processing" according to the first embodiment.

First, the "flow of processing at the time of generating transmission information" will be described with reference to FIGS. 14 and 15. FIG. 14 is a flowchart illustrating an overall flow of "processing at the time of generating transmission information" according to the first embodiment.

As illustrated in FIG. 14, first, the information generation unit 102 performs reception or read processing to acquire the input information from the display processing unit 122, which has been acquired in real time by the input unit 120, for example. For example, the information generation unit 102 acquires an image of the hand of the user (as part of the input information) from the display processing unit 122, the image having been captured in real time by the input unit 120 (S101).

Next, the information generation unit 102 performs "transmission information generation processing" to be described below (S103).

Next, the communication unit 126 transmits the transmission information generated in S103 to each information processing system 10 at another point being in communication, for example, according to the control of the transmission control unit 104 (S105).

Next, the processing unit 100 determines whether or not a termination operation has been performed by the user (S107). In a case where the termination operation has not been performed (S107: No), the processing unit 100 repeats the processing of S101 and the subsequent steps again. On the other hand, in a case where the termination operation has been performed (S107: Yes), the flow of the processing is terminated.

2-2-1-2. Transmission Information Generation Processing

Here, content of S103 ("transmission information generation processing") will be described in detail with reference to FIG. 15. As illustrated in FIG. 15, first, the information generation unit 102 sets "1" to a variable I indicating a number of a generation rule to be processed (S151). Then, the information generation unit 102 sets the total number of generation rules stored in the information generation and reproduction rule DB 130 to N (S153).

Then, the information generation unit 102 performs the following processing of S157 to S165 as long as I is equal to or less than N (S155: Yes). Note that in a case where I becomes larger than N (S155: No), the "transmission information generation processing" is terminated.

Specifically, first, the information generation unit 102 determines whether or not information of all the information types defined in the I-th generation rule stored in the information generation and reproduction rule DB 130 is included in the input information acquired in S101. For example, in a case where the finger position information is defined as the information type in the I-th generation rule, the information generation unit 102 determines whether or not the finger position information is included in the input information acquired in S101. Furthermore, in a case where a sound is defined as the information type in the I-th generation rule, the information generation unit 102 determines whether or not a sound collection result with a volume of a predetermined threshold or larger is included in the input information acquired in S101 (S157). In a case where the information of at least one information type is not included in the input information (S157: No), the information generation unit 102 performs processing of S165 to be described below.

On the other hand, in a case where the information of all the information types is included in the input information (S157: Yes), the information generation unit 102 next determines whether or not the condition at generation associated with the I-th generation rule is established in the information generation and reproduction rule DB 130 (S159). In a case where the information generation unit 102 determines that the condition at generation is not established (S159: No), the information generation unit 102 performs processing of S165 to be described below.

On the other hand, in a case where the information generation unit 102 determines that the condition at generation is established (S159: Yes), the information generation unit 102 performs the processing at generation associated with the I-th generation rule in the information generation and reproduction rule DB 130 (S161).

Then, the information generation unit 102 stores the processing result of S161 in the transmission information to be generated. For example, the information generation unit 102 stores the position information of the finger, hand, and arm of the user in the transmission information to be generated (S163).

Next, the information generation unit 102 adds "1" to I (S165). Thereafter, the information generation unit 102 repeats the processing of S155 and the subsequent steps again.

2-2-2. Flow of Processing at the Time of Reproducing Transmission Information

2-2-2-1. Overall Flow

Figure 16:
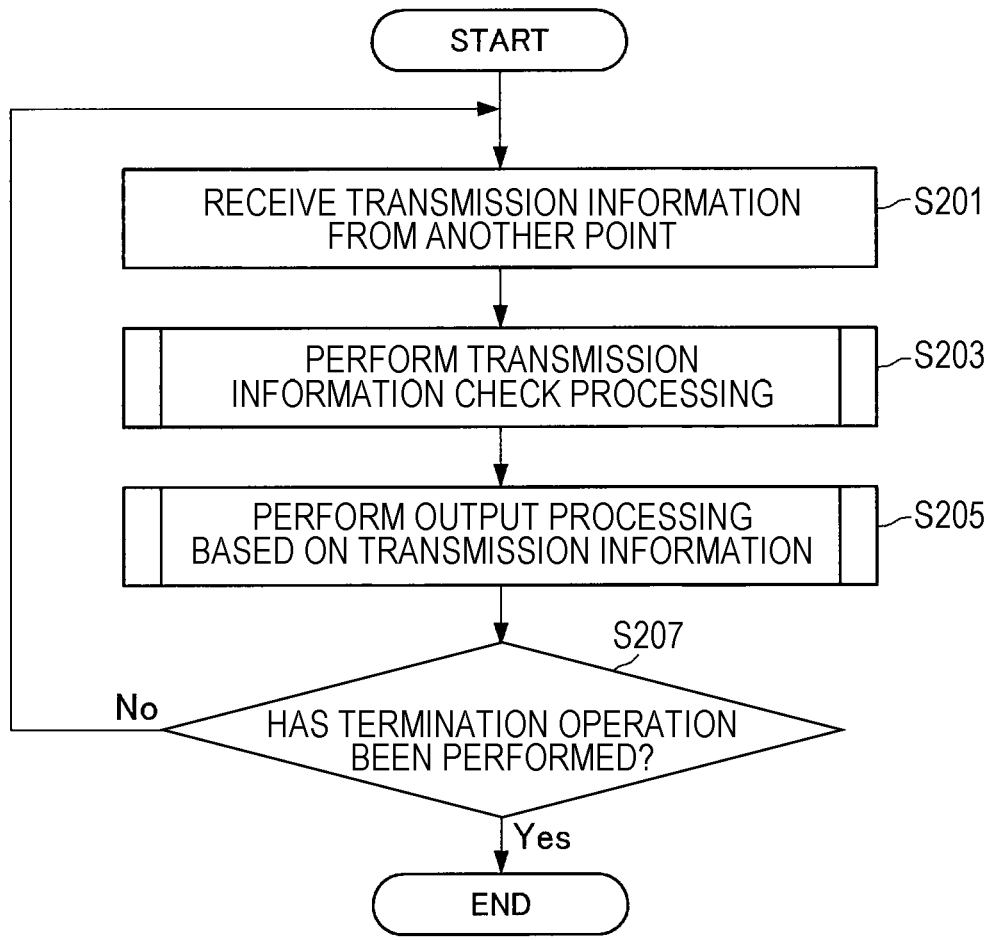
FIG. 16 is a flowchart illustrating a "flow of processing at the time of reproducing transmission information" according to the first embodiment.
Figure 17:
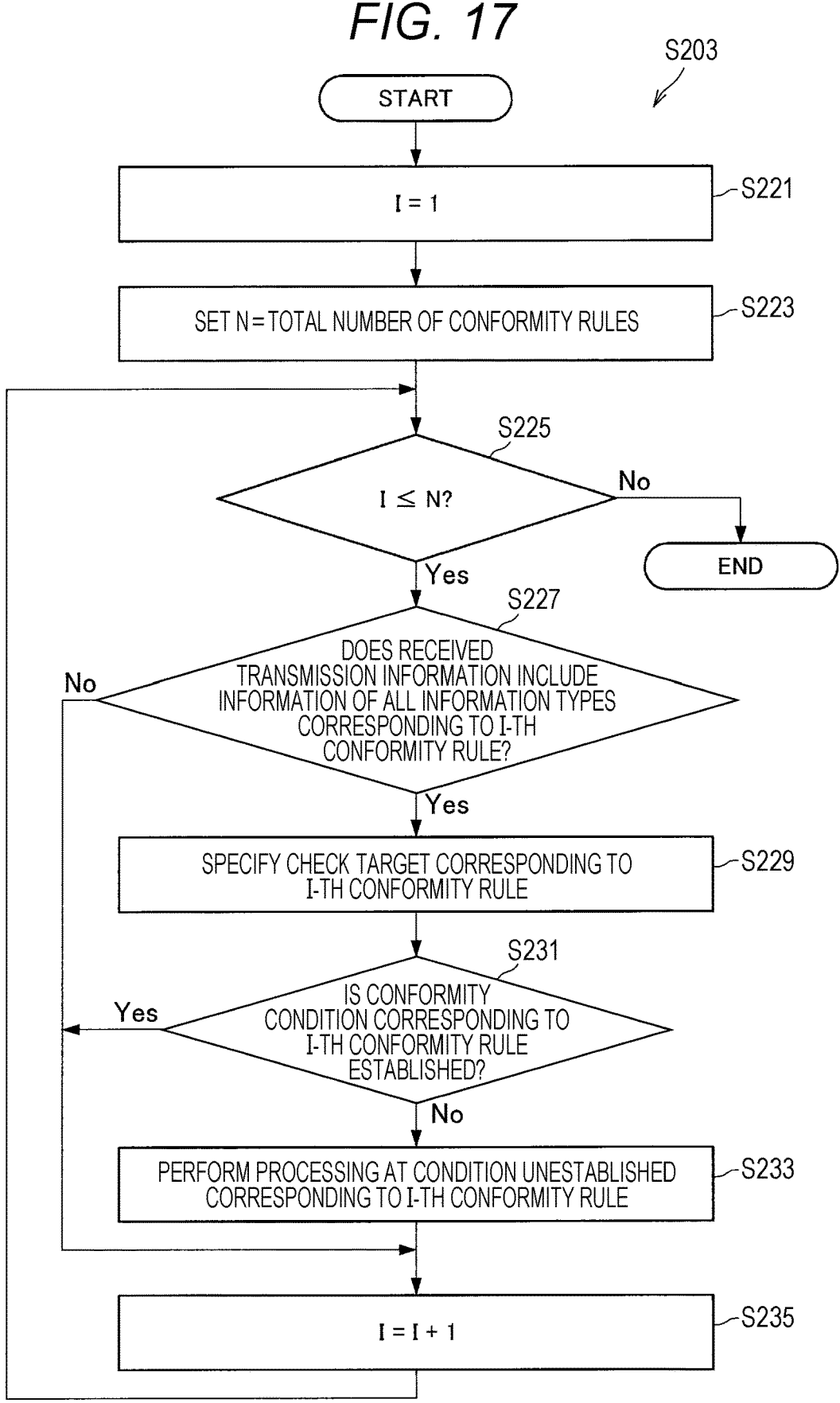
FIG. 17 is a flowchart illustrating a flow of "transmission information check processing" according to the first embodiment.
Figure 18:
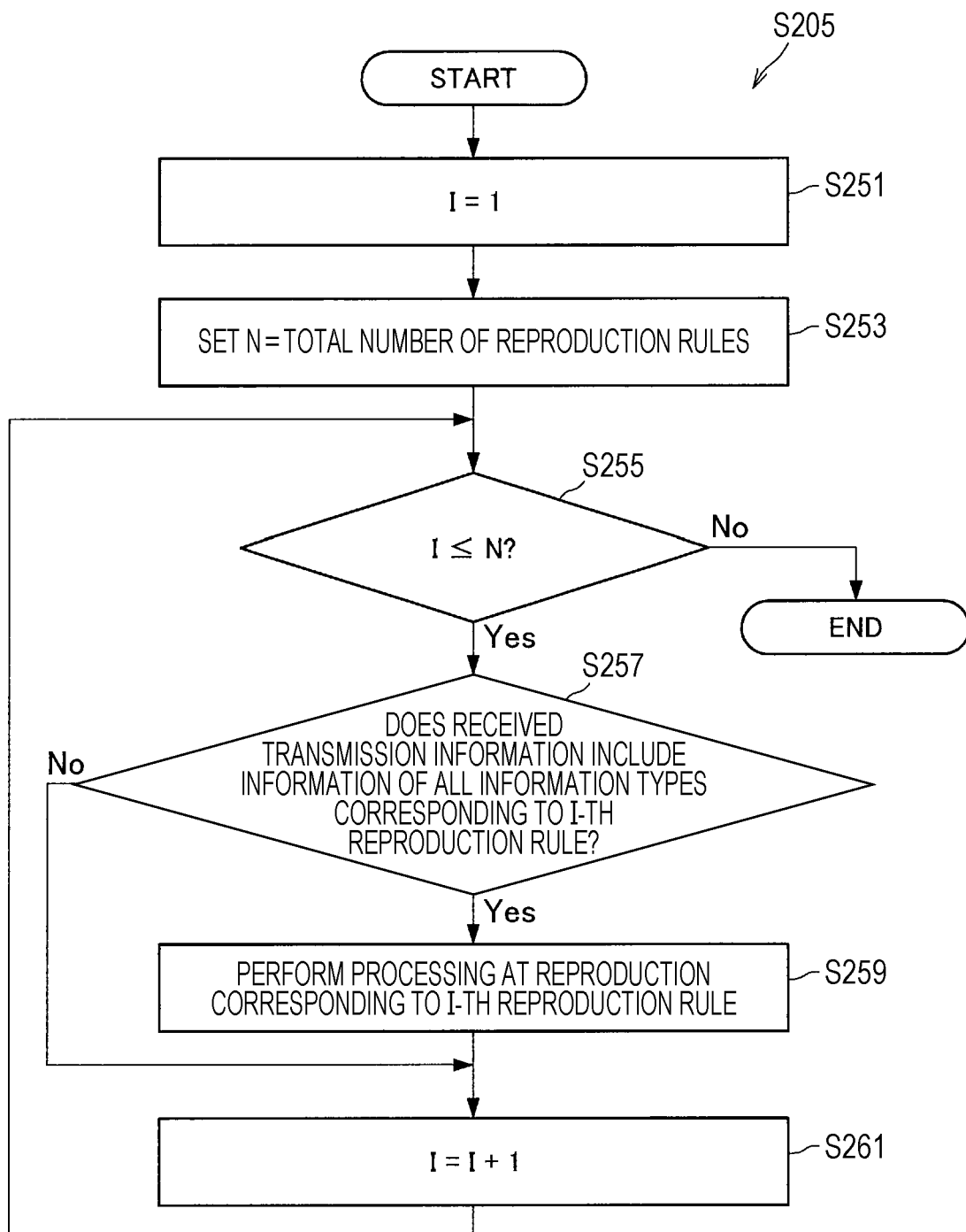
FIG. 18 is a flowchart illustrating a flow of "output processing based on transmission information" according to the first embodiment.

Next, the "flow of processing at the time of reproducing transmission information" will be described with reference to FIGS. 16 to 18. FIG. 16 is a flowchart illustrating an overall flow of "processing at the time of reproducing transmission information" according to the first embodiment.

As illustrated in FIG. 16, first, the communication unit 126 receives the transmission information generated by the information processing system 10 at another point from the information processing system 10 at the another point. Then, the information acquisition unit 106 performs reception or read processing to acquire the received transmission information from the communication unit 126 (S201).

Next, the output control unit 108 performs "transmission information check processing" to be described below (S203).

Next, the output control unit 108 performs "output processing based on transmission information" to be described below (S205).

Next, the processing unit 100 determines whether or not the termination operation has been performed by the user (S207). In the case where the termination operation has not been performed (S207: No), the processing unit 100 repeats the processing of S201 and the subsequent steps again. On the other hand, in the case where the termination operation has been performed (S207: Yes), the flow of the processing is terminated.

2-2-2-2. Transmission Information Check Processing

Here, content of S203 ("transmission information check processing") will be described in detail with reference to FIG. 17. As illustrated in FIG. 17, first, the output control unit 108 sets "1" to a variable I indicating a number of a conformity rule to be processed (S221). Then, the output control unit 108 sets the total number of conformity rules stored in the information conformity rule DB 132 to N (S223).

Then, the output control unit 108 performs the following processing of S227 to S235 as long as I is equal to or less than N (S225: Yes). Note that in a case where I becomes larger than N (S225: No), the "transmission information check processing" is terminated.

Specifically, first, the output control unit 108 determines whether or not information of all the information types defined in the I-th conformity rule stored in the information conformity rule DB 132 is included in the transmission information acquired in S201 (S227). In a case where the information of at least one information type is not included in the transmission information (S227: No), the output control unit 108 performs processing of S235 to be described below.

On the other hand, in a case where the information of all the information types is included in the transmission information (S227: Yes), the output control unit 108 specifies a check target associated with the I-th conformity rule in the information generation and reproduction rule DB 130. Then, the output control unit 108 specifies a value of the check target on the basis of the transmission information and the like, for example (S229).

Next, the output control unit 108 determines whether or not the value specified in S229 satisfies the conformity condition associated with the I-th conformity rule in the information generation and reproduction rule DB 130 (S231). In a case where the value specified in S229 satisfies the conformity condition (S231: Yes), the output control unit 108 performs processing of S235 to be described below.

On the other hand, in a case where the value specified in S229 does not satisfy the conformity condition (S231: No), the output control unit 108 performs processing at condition unestablished associated with the I-th conformity rule in the information generation and reproduction rule DB 130 (S233).

Next, the output control unit 108 adds "1" to I (S235). Thereafter, the output control unit 108 repeats the processing of S225 and the subsequent steps again.

2-2-2-3. Output Processing Based on Transmission Information

Here, content of S205 ("output processing based on transmission information") will be described in detail with reference to FIG. 18. As illustrated in FIG. 18, first, the output control unit 108 sets "1" to a variable I indicating a number of a reproduction rule to be processed (S251). Then, the output control unit 108 sets the total number of reproduction rules stored in the information generation and reproduction rule DB 130 to N (S253).

Then, the output control unit 108 performs the following processing of S257 to S261 as long as I is equal to or less than N (S255: Yes). Note that in a case where I becomes larger than N (S255: No), the "output processing based on transmission information" is terminated.

Specifically, first, the output control unit 108 determines whether or not information of all the information types defined in the I-th reproduction rule stored in the information generation and reproduction rule DB 130 is included in the transmission information acquired in S201 (S257). In a case where the information of at least one information type is not included in the transmission information (S257: No), the output control unit 108 performs processing of S261 to be described below.

On the other hand, in a case where the information of all the information types is included in the transmission information (S257: Yes), the output control unit 108 performs the processing at reproduction associated with the I-th reproduction rule in the information generation and reproduction rule DB 130 (S259).

Next, the output control unit 108 adds "1" to I (S261). Thereafter, the output control unit 108 repeats the processing of S255 and the subsequent steps again.

2-3. Effect

2-3-1. Effect 1

As described above, the information processing system 10 according to the first embodiment acquires the first transmission information according to the operation of the operation body related to the first user located at another point, the first transmission information being for communication with the second user located at the principal point, and then displays the image corresponding to the operation body generated on the basis of the pointing position of the operation body at the principal point and the arm position of the first user at the principal point, the pointing position and the arm position being specified on the basis of the first transmission information, on the display surface in the principal point. For this reason, the amount of information transmitted between different points can be reduced while realizing smooth communication between the different points.

For example, the information processing system 10 shares only the information necessary for communication generated on the basis of the input information with another point as the transmission information, instead of sharing the input information (the video and the like) itself acquired by the input unit 120. Therefore, components that inhibit concentration on the communication can be cut, and thus the users at different points are expected to be more able to concentrate on the communication. For example, the users at different points can participate in the discussion without hesitation regardless of his/her skin, clothes, and the like. Furthermore, for similar reasons, the users at different points are expected to be able to discuss more smoothly and to be able to easily understand the intention of the other party.

2-3-2. Effect 2

Furthermore, the information processing system 10 can specify the position information at the principal point of the finger, hand, and arm of the user at another point on the basis of the position information of the finger, hand, and arm of the user at the another point, generate the image indicating the hand of the user at the another point on the basis of the specified position information, and then display the image on the display surface in the principal point. Therefore, the movement of the hand of the user at another point can be naturally reproduced at the principal point. As a result, for example, the user at the principal point can understand the process in which the user at another point operates the information.

3. Second Embodiment

The first embodiment has been described above. Next, a second embodiment according to the present disclosure will be described. In the second embodiment, a scene where brainstorming is performed between users located at different points is assumed. As will be described below, according to the second embodiment, when the users operate objects and discuss at different points, the users can clearly understand who is operating which object.

3-1. Configuration

Configuration elements included in the information processing system 10 according to the second embodiment may be the same as those in the first embodiment (illustrated in FIG. 9). Note that second to nineteenth embodiments to be described below can be similarly configured. Hereinafter, only configuration elements having functions different from the first embodiment will be described.

3-1-1. Information Generation and Reproduction Rule DB 130

In an information generation and reproduction rule DB 130 according to the second embodiment, registered content illustrated in FIG. 19 can be further added in addition to the registered content illustrated in FIG. 11.

3-1-2. Information Generation Unit 102

In a case where an operation to slide a hand in a region on a screen 20 where no object is arranged, for example (hereinafter, the operation may be referred to as a write operation) having been performed is detected, an information generation unit 102 according to the second embodiment further stores a sequence of pointing positions of the hand of the user corresponding to the write operation in transmission information to be transmitted as a point group.

3-1-3. Output Control Unit 108

In a case where an operation to move at least one object is specified at another point on the basis of the transmission information received from another point, an output control unit 108 according to the second embodiment moves a display position on the screen 20, of an image corresponding to the at least one object, according to the specified operation. For example, in a case where the hand of the user at another point having been slid while being in contact with at least one object at another point is specified, the output control unit 108 moves the display position of the image corresponding to the at least one object according to the specified slide. Here, the object may be a real object or, for example, a virtual object displayed on the screen 20.

Alternatively, in a case where the write operation having been performed on the display surface at another point is specified on the basis of the transmission information, the output control unit 108 can further display a locus of pointing positions of the hand of the user at another point corresponding to the write operation on a display surface at a principal point.

Here, the function of the output control unit 108 will be described in more detail with reference to FIGS. 20A to 20D. Here, an example in which a plurality of sticky notes is arranged on a screen 20-1 at another point will be described. The plurality of sticky notes may be real objects or virtual objects (for example, videos projected on a screen 20-2, or the like). In this case, the output control unit 108 at the principal point can display (for example, project) images 32 of the plurality of sticky notes on the screen 20-2 at the principal point.

3-1-3-1. Specific Example 1

Then, it is assumed that an operation to drag one of the plurality of sticky notes with one finger of the user at another point has been detected at the another point. In this case, the output control unit 108 can first specify the drag operation of the finger on the basis of the transmission information acquired from the another point. Then, as illustrated in FIG. 20A, the output control unit 108 can move the display position of the image 32 of the sticky note to be dragged in accordance with the specified drag operation.

3-1-3-2. Specific Example 2

Alternatively, it is assumed that an operation to drag a group of a plurality of sticky notes, of the plurality of sticky notes, with the palm of the hand of the user at another point has been detected at the another point. In this case, the output control unit 108 can first specify the drag operation of the palm of the hand on the basis of the transmission information acquired from the another point. Then, as illustrated in FIG. 20B, the output control unit 108 can move the display position of the image 34 of the group of the sticky notes to be dragged in accordance with the specified drag operation.

3-1-3-3. Specific Example 3

Figure 20D:
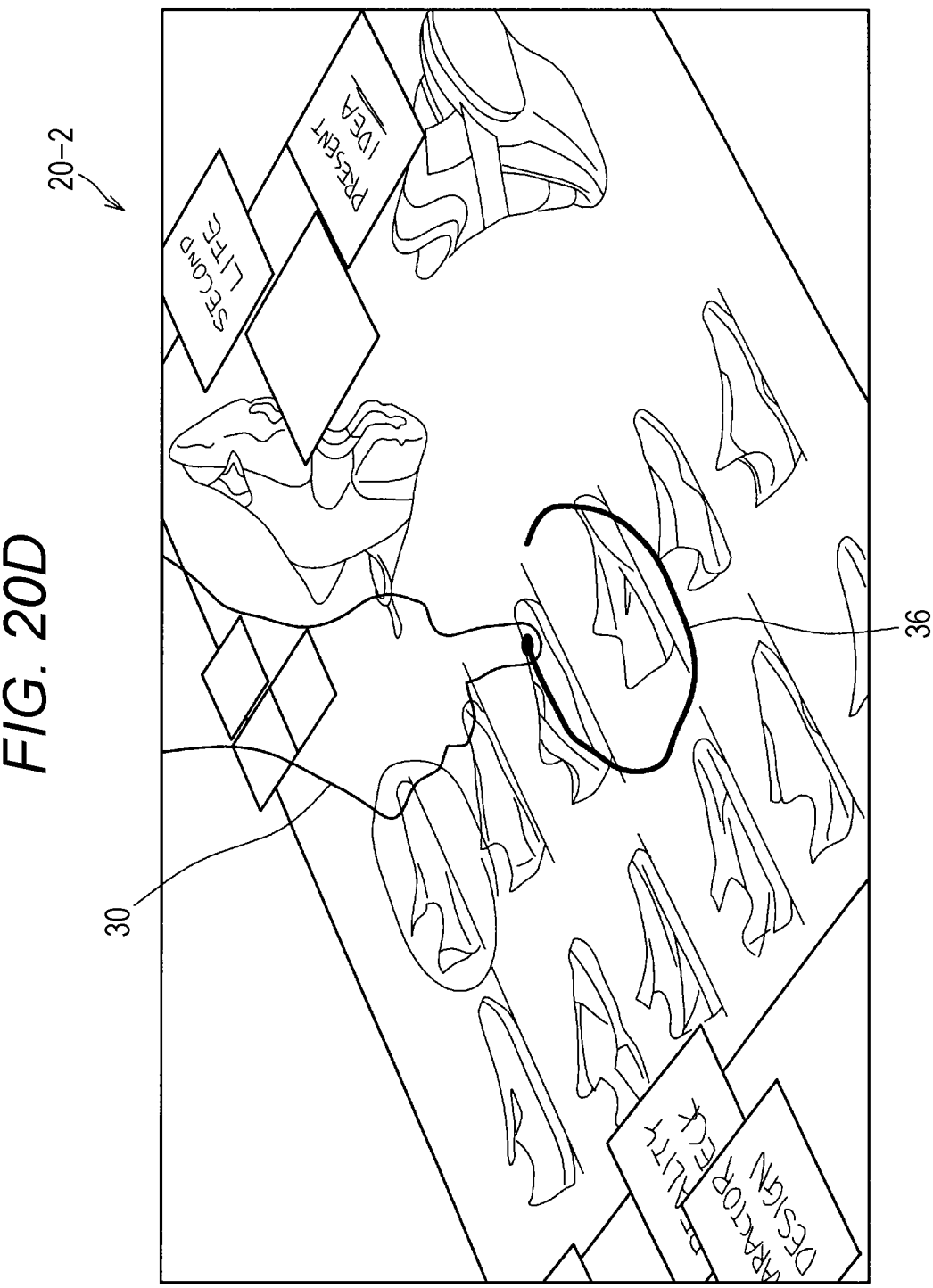
FIG. 20D is a diagram illustrating another display example of the image of a locus based on a write operation of the user according to the second embodiment.

Alternatively, it is assumed that a drag operation (write operation) by the user at another point in a region where no sticky note exists has been detected on the screen 20 at the another point. In this case, the output control unit 108 can first specify information (point group) written up to the present at the another point on the basis of the transmission information acquired from the another point. Then, as illustrated in FIG. 20C or 20D, the output control unit 108 can display (for example, project) a line segments 36 sequentially connecting the specified point group on the screen 20-2 at the principal point. For example, the output control unit 108 updates the line segment 36 configured by the written point group in real time, following the write operation at the another point, and then displays the updated line segment 36 on the screen 20-2 at the principal point.

3-2. Effect

As described below, according to the second embodiment, when the users operate the sticky notes and discuss at different points, the users can clearly understand who is operating which sticky note.

Moreover, according to the second embodiment, the users at different points can naturally communicate, similarly to a case where the users are facing each other, on the basis of the image of the hand of the user at another point displayed on the screen 20 at the principal point and a sound of the user at the another point output at the principal point. For example, even if the user at another point utters a word whose meaning is ambiguous, such as a pronoun ("this", "it", or the like), the user at the principal point can easily grasp what the user at the another point is discussing.

4. Third Embodiment

Figure 22A:
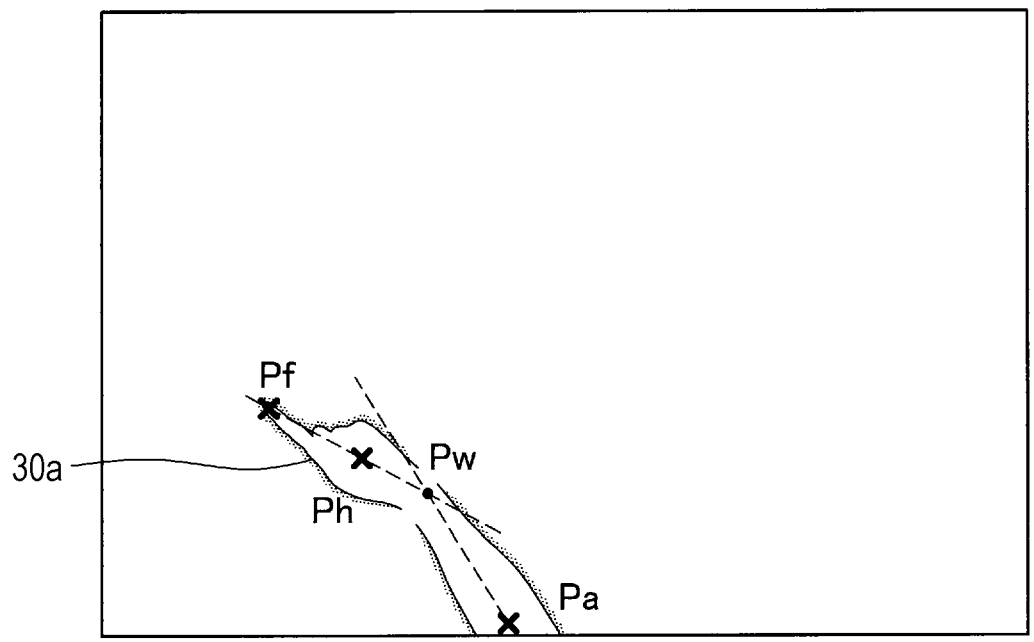
FIG. 22A is a diagram illustrating a display example of an image 30 of the hand according to the first embodiment.
Figure 22B:
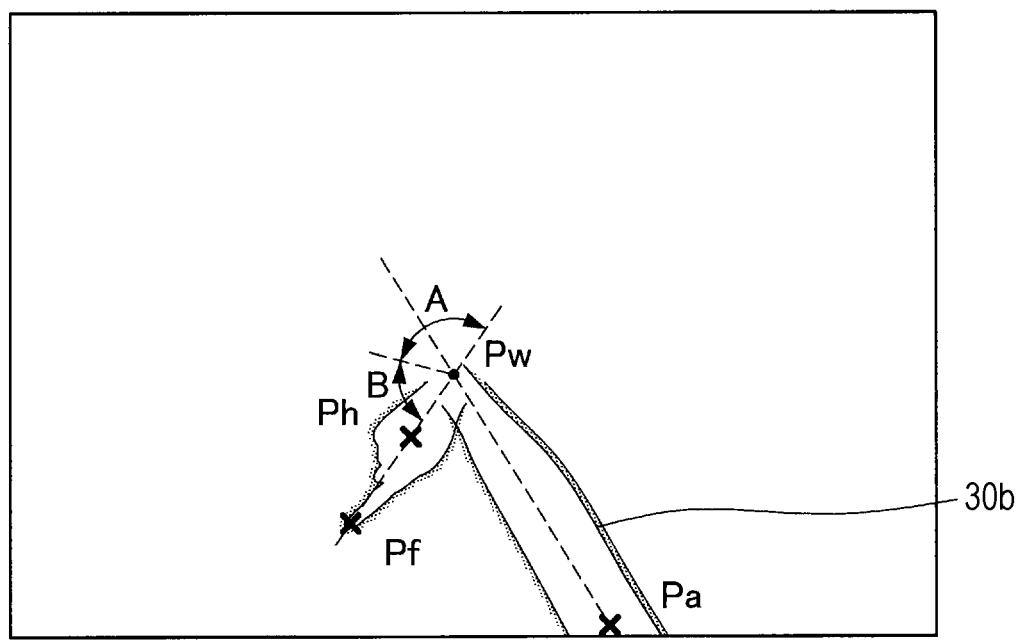
FIG. 22B is a diagram illustrating another display example of the image 30 of the hand according to the first embodiment.

The second embodiment has been described above. Next, a third embodiment according to the present disclosure will be described. FIGS. 22A and 22B are diagrams illustrating an example of an image 30 of a hand displayed by the output control unit 108 according to the first embodiment. FIG. 22B illustrates an example in which an incorrect value is stored as hand position information Ph in received transmission information due to occurrence of an erroneous detection, a communication error, or the like at a point of a transmission source, and then an image of the hand is generated on the basis of the transmission information.

Although a user at a principal point can understand a pointing position Pf of a user at another point even with an image 30b illustrated in FIG. 22B, it is desirable to display an image of the hand with a more natural shape (for example, a bending angle of the wrist is within a standard human movable range).

As will be described below, according to the third embodiment, an image of the hand with a more natural shape can be displayed on the basis of the transmission information received from another point.

4-1. Configuration

4-1-1. Information Conformity Rule DB 132

FIG. 21 is a diagram illustrating a configuration example of an information conformity rule DB 132 according to the third embodiment. In the example illustrated in FIG. 21, only one conformity rule is defined, and then in the conformity rule, an angle between a straight line made by a finger position and a hand position of the user at another point, and a straight line made by a hand position and an arm position of the user, which are specified on the basis of the transmission information received from the another point, is defined as a check target. Moreover, in the conformity rule, a case where the angle is "from −30 degrees to 30 degrees, both inclusive" being conformable is defined.

4-1-2. Output Control Unit 108

4-1-2-1. Correction of Transmission Information

In a case where a relationship among a pointing position of the hand of the user at another point, a hand position at the principal point, of the user at the another point, and an arm position at the principal point, of the user at the another point, which are specified on the basis of the transmission information obtained from the another point, becomes a predetermined relationship, an output control unit 108 according to the third embodiment can correct the arm position and/or the hand position of the user at the another point on the basis of the pointing position of the hand of the user at the another point.

For example, in FIG. 22B, a conformity range of the angle between the straight line made by the finger position and the hand position and the straight line made by the hand position and the arm position is illustrated as "A". However, in the example illustrated in FIG. 22B, the angle between the straight line made by the finger position and the hand position and the straight line made by the hand position and the arm position, which is specified on the basis of the transmission information received from another point, deviates from the conformity range by "B". In this case, the output control unit 108 determines that the angle is not conformable. Then, the output control unit 108 corrects the arm position and/or the hand position of the user at the another point on the basis of the pointing position of the hand of the user at the another point.

Figure 22C:
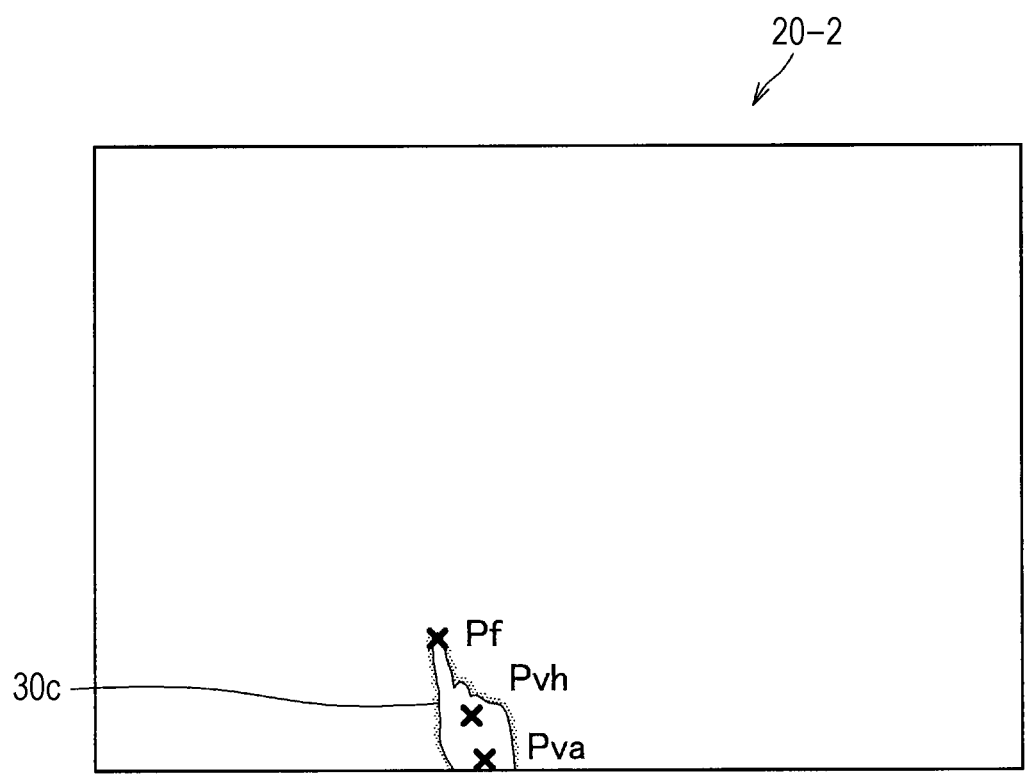
FIG. 22C is a diagram illustrating a display example of an image 30 of a hand corresponding to transmission information illustrated in FIG. 22B according to the third embodiment.

Here, the above correction example will be described in more detail with reference to FIG. 22C. As illustrated in FIG. 22C, the output control unit 108 first sets an intersection of a side closest to an arm position Pa of the user at the another point on the screen 20 and a straight line drawn from a finger position (pointing position of the hand) Pf of the user perpendicularly to the closest side, as a new arm position Pva. Next, the output control unit 108 sets a position of a point shifted from the finger position Pf by the size of the hand in a line segment connecting the finger position Pf of the user at the another point and the new arm position Pva, as a new hand position Pvh. Then, the output control unit 108 corrects the arm position Pa of the user to the new arm position Pva, and corrects the hand position Ph of the user to the new hand position Pvh.

4-1-2-2. Display of Hand Image after Correction

Moreover, after the above correction, the output control unit 108 generates an image corresponding to the hand of the user at the another point on the basis of the pointing position of the hand of the user at the appropriate another point, the hand position of the user after correction, and the arm position of the user after correction. Then, the output control unit 108 displays the generated image on the screen 20 in the principal point, as illustrated in FIG. 22C.

4-2. Effect

As described above, according to the third embodiment, the image of the hand with a more natural shape can be displayed on the basis of the transmission information received from another point. For example, the hand position and the arm position of the user can be corrected such that the shape of the hand (the wrist or the like) of the user becomes more natural without changing the pointing position of the user corresponding to the transmission information received from another point.

5. Fourth Embodiment

The third embodiment has been described above. Next, a fourth embodiment according to the present disclosure will be described. As will be described below, according to the fourth embodiment, a further simplified or anonymized image of a hand can be displayed on the basis of transmission information received from another point.

5-1. Configuration

5-1-1. Information Generation and Reproduction Rule DB 130

In an information generation and reproduction rule DB 130 according to the fourth embodiment, registered content illustrated in FIG. 23 can be further added in addition to the registered content illustrated in FIG. 11. FIG. 23 illustrates an example in which drawing an image of a hand corresponding to an individual user in a color corresponding to a type of job of the individual user is defined as processing at reproduction.

5-1-2. Information Generation Unit 102

An information generation unit 102 according to the fourth embodiment further stores, regarding an individual user at a principal point, attribute information (for example, a type of job, a gender, and the like) of the user in transmission information corresponding to the user.

5-1-3. Output Control Unit 108

An output control unit 108 according to the fourth embodiment changes a value of a display parameter of the image of the hand of the user corresponding to the transmission information, the value being generated on the basis of the transmission information obtained from another point, according to the attribute information of the user included in the transmission information. The display parameter may be, for example, a display color, a thickness of a line to be drawn, a line type to be drawn, or the like.

Figure 24A:
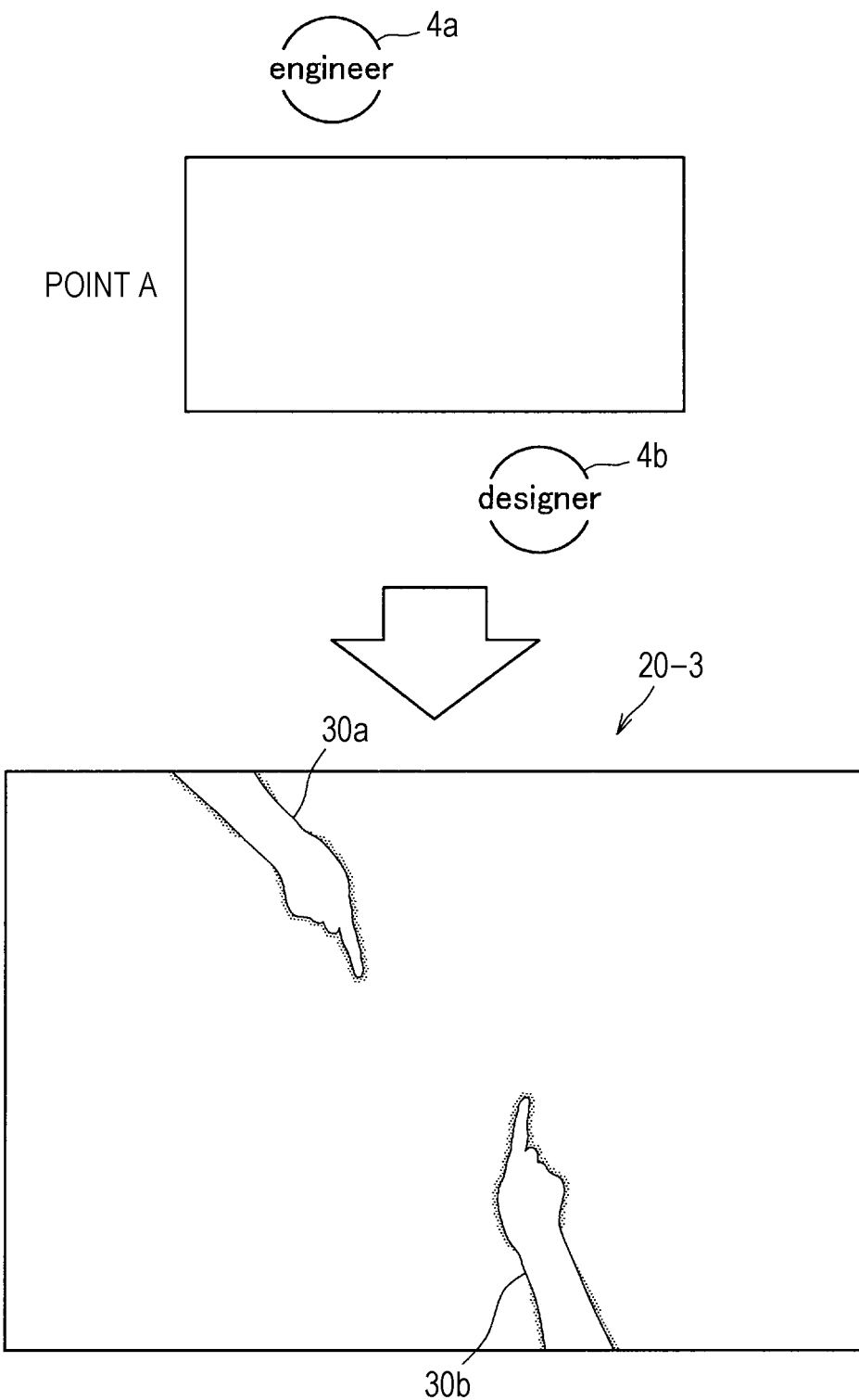
FIG. 24A is a diagram illustrating an example in which two users surround a screen 20 at a "point A".
Figure 24B:
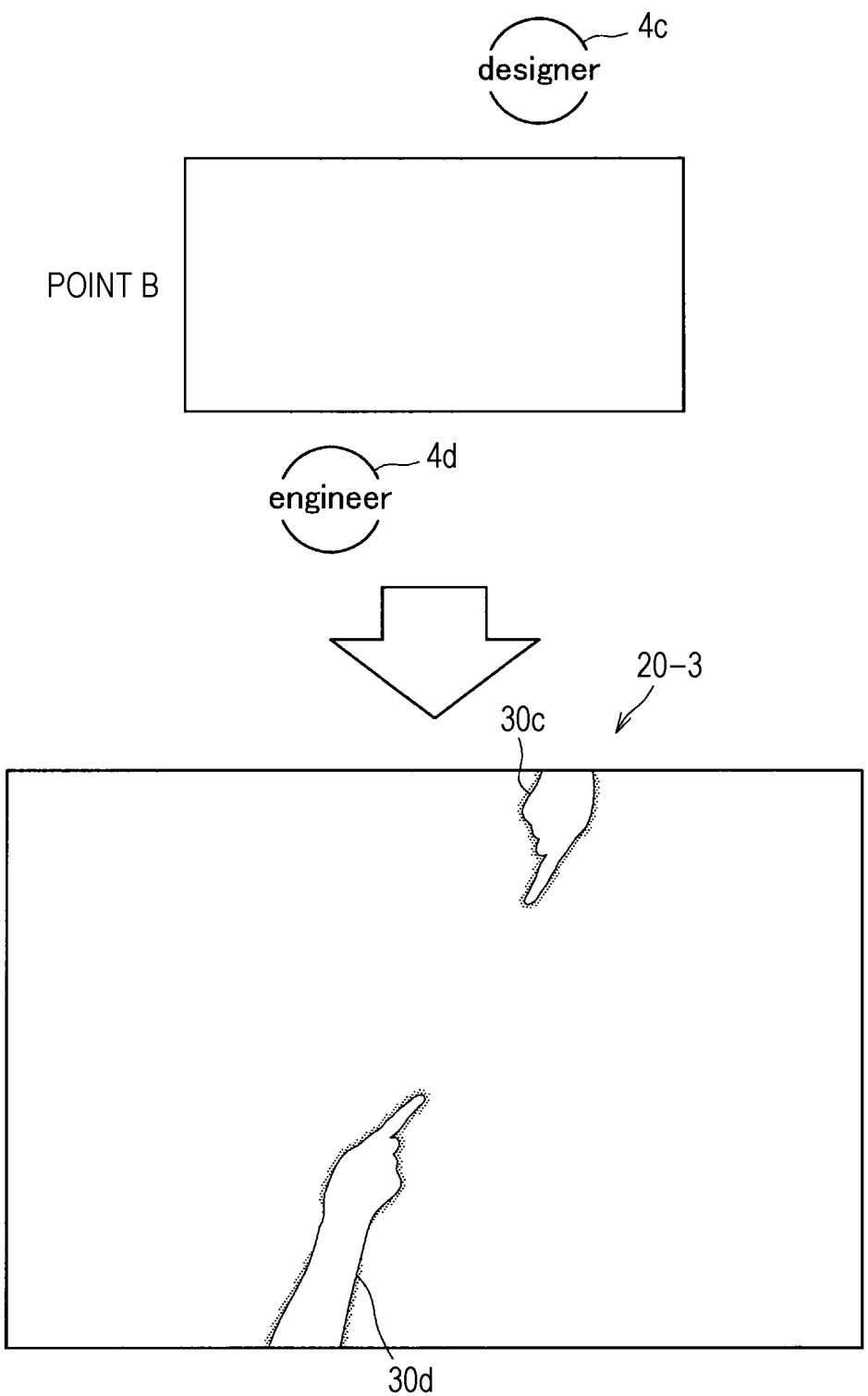
FIG. 24B is a diagram illustrating an example in which two users surround the screen 20 at a "point B".
Figure 24C:
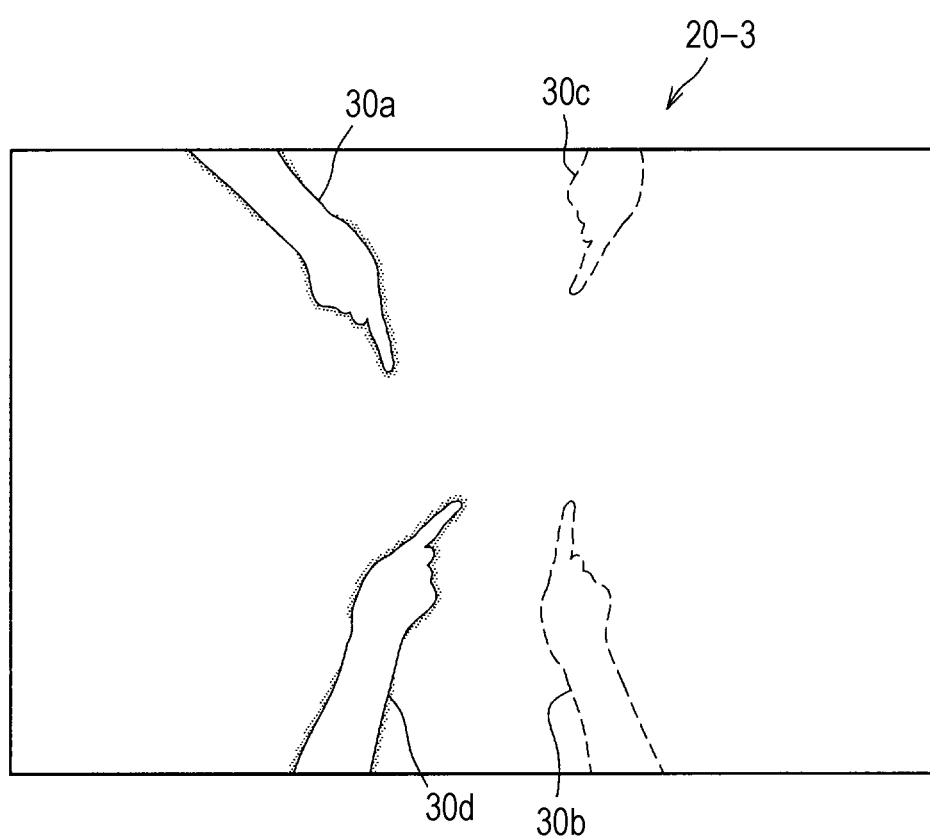
FIG. 24C is a diagram illustrating a display example of an image of hands of the users located at the point A and the point B according to the fourth embodiment.

Here, the above function will be described in more detail with reference to FIGS. 24A to 24C. As illustrated in FIG. 24A, at a "point A", a scene in which a user 4a who is an engineer and a user 4b who is a designer surround a screen 20-3 is assumed. Similarly, as illustrated in FIG. 24B, at a "point B", a scene in which a user 4c who is a designer and a user 4d who is an engineer surround a screen 20-3 is assumed. In this case, for example, as illustrated in FIG. 24C, the output control unit 108 at a "point C" can display, regarding each user 4 at the points A and B, an image of a hand of the user in red (solid line in the example illustrated in FIG. 24C) on a display surface in the case where the type of the user is an engineer. Moreover, the output control unit 108 can display, regarding each user 4 at the points A and B, the image of the hand of the user in blue (broken line in the example illustrated in FIG. 24C) on the display surface in the case where the type of the user is a designer.

5-2. Effect

As described above, according to the fourth embodiment, the display color of the image of the hand of the user corresponding to the transmission information acquired from another point is changed according to the type of job of the user included in the transmission information. For this reason, the image of the hand of the user can be more simply or more anonymously displayed. For example, the displayed image can be simplified and anonymized as compared to a case where an image is color-coded for each user or for each point. As a result, the users at different points are expected to be able to discuss more smoothly and to be able to easily understand mutual intentions.

6. Fifth Embodiment

The fourth embodiment has been described above. Next, a fifth embodiment according to the present disclosure will be described. First, the background on which the fifth embodiment has been made will be described with reference to FIGS. 25A and 25B. The left diagram in FIG. 25A is a diagram illustrating an example in which a user points at, by hand, a position relatively close to the torso of the user on a screen 20. The left diagram in FIG. 25B is a diagram illustrating an example in which the user points at, by hand, a position relatively distant from the torso of the user on the screen 20.

In the examples illustrated in FIGS. 25A and 25B, it is assumed that information of an arm thickness of the user is not stored in transmission information transmitted between points. In this case, for example, in the first embodiment, an image 30b in which the length of the forearm is unnaturally long may be displayed, as illustrated in the right diagram in FIG. 25B, because the position of an elbow joint cannot be specified.

Note that, to improve this phenomenon, a method of storing the information of the thickness of the arm of the user in the transmission information is conceivable. However, by this method, the area of a hand image (for example, the area of an arm region) becomes larger. As a result, the user may feel obstructive during communication (such as discussion).

As will be described below, according to the fifth embodiment, an image of a hand with a more natural shape can be displayed on the basis of the transmission information at the time of pointing even in a case where the user points at a position distant from the torso of the user at another point.

6-1. Configuration

6-1-1. Information Conformity Rule DB 132

In an information conformity rule DB 132 according to the fifth embodiment, a conformity rule illustrated in FIG. 26 can be registered in addition to (or in place of) the conformity rule illustrated in FIG. 21. In the conformity rule illustrated in FIG. 26, a distance between a hand position and an arm position of the user at another point specified on the basis of the transmission information received from the another point is defined as a check target. Moreover, in the conformity rule, a case where the distance is "equal to or smaller than "300 pixels" being conformable is defined.

6-1-2. Output Control Unit 108

6-1-2-1. Correction of Transmission Information

In a case where the distance between the hand position of the user and the arm position of the user at another point, which are specified on the basis of the transmission information obtained from the another point, is larger than a predetermined distance, an output control unit 108 according to the fifth embodiment can correct a finger position of the user and the hand position of the user on the basis of the arm position of the user at a principal point.

In the example illustrated in FIG. 26, in a case where the distance between the hand position of the user and the arm position of the user at the another point, which are specified on the basis of the transmission information acquired from the transmission information received from the another point, is larger than "300 pixels", the output control unit 108 first determines that the distance is not conformable. Then, the output control unit 108 corrects the finger position of the user and the hand position of the user on the basis of the arm position of the user at the principal point.

Here, the above correction example will be described in more detail with reference to FIG. 27. As illustrated in FIG. 27, for example, the output control unit 108 first sets a position at the principal point separated by "300 pixels"

from an arm position Pa of the user at the another point, as a new finger position Pvf. Next, the output control unit 108 sets a position of a point on a straight line connecting a pointing position Pf of the user and the new finger position Pvf, and shifted by a predetermined distance from the new finger position Pvf toward the arm position Pa, as a new hand position Pvh. Then, the output control unit 108 corrects a position Ph of the hand of the user to the new hand position Pvh.

6-1-2-2. Display of Hand Image after Correction

Moreover, after the above correction, the output control unit 108 generates an image corresponding to the hand of the user on the basis of the newly set finger position Pvf, the hand position Pvh of the user after correction, and the arm position Pa of the user, as illustrated in the right diagram in FIG. 27. Then, the output control unit 108 displays the generated hand image on the screen 20 in the principal point. At the same time, the output control unit 108 displays an image 38 indicating the pointing position Pf of the hand of the user (for example, an image of a point, or the like) on the screen 20 in association with the image of the hand. For example, as illustrated in the right diagram in FIG. 27, the output control unit 108 further displays a line segment connecting the finger position Pvf and the pointing position Pf, of an image 30 of the hand, on the screen 20.

6-2. Effect

As described above, according to the fifth embodiment, the image of the hand with a more natural shape can be displayed on the basis of the transmission information at the time of pointing even in a case where the user points at a position distant from the torso of the user at another point. Moreover, since the size of the image of the hand can be suppressed, it is possible to prevent interference with communication.

7. Sixth Embodiment

Figure 28:
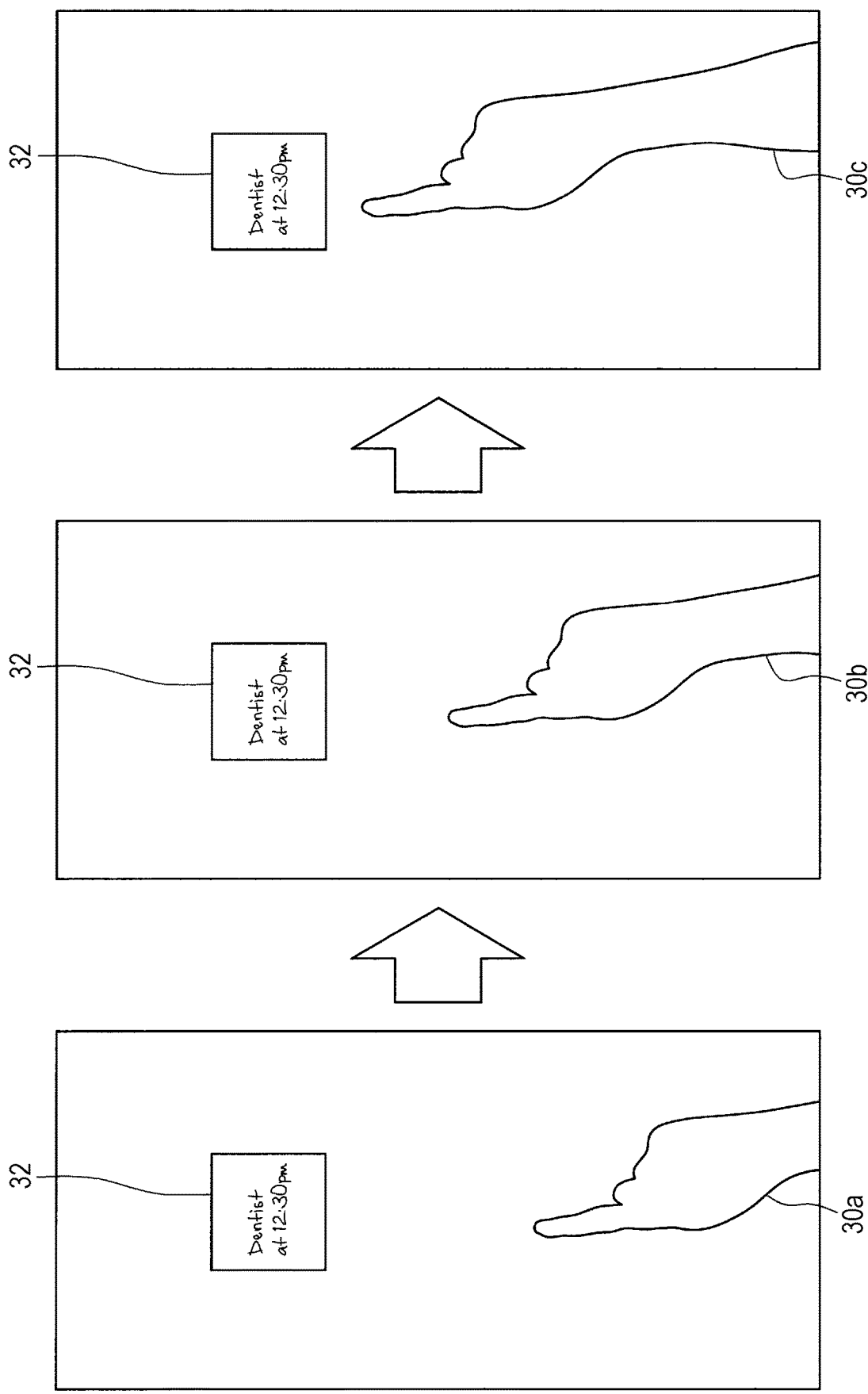
FIG. 28 is a diagram illustrating a display example of the image 30 of the hand according to the first embodiment in a situation where the hand is extended to a sticky note 32.

The fifth embodiment has been described above. Next, a sixth embodiment according to the present disclosure will be described. First, the background on which the sixth embodiment has been made will be described with reference to FIG. 28. FIG. 28 is a diagram illustrating a display example of the image 30 of the hand by the output control unit 108 according to the first embodiment in a situation where a user at another point extends a hand to a sticky note 32. In the first embodiment, the image of the hand of the user is displayed on the screen 20 basically without considering height information (hereinafter referred to as "z coordinate") of the finger of the user. For this reason, as illustrated in FIG. 28, the user who is viewing the image 30 has a difficulty in distinguishing whether the user is in the middle of extending the hand to point at the sticky note 32 or the user has already pointed at the sticky note 32 at the time of displaying the image 30a or at the time of displaying the image 30b, for example.

Note that a method of displaying the image 30 of the hand only when the z coordinate included in transmission information acquired from another point is a fixed value or larger is conceivable. However, by this method, the image 30 may be suddenly displayed at the pointing position of the user, and thus the user who is viewing the image may feel unnatural.

As will be described below, according to the sixth embodiment, an image of the hand of the user can be displayed such that whether or not the user is pointing at some object is distinguishable, in the middle of the user at another point extending the hand.

7-1. Configuration

7-1-1. Information Generation and Reproduction Rule DB 130

In an information generation and reproduction rule DB 130 according to the sixth embodiment, registered content illustrated in FIG. 29 can be further added in addition to the registered content illustrated in FIG. 11. FIG. 29 illustrates an example in which changing the transparency of the image of the hand corresponding to the transmission information according to the z coordinate included in the transmission information acquired from another point is defined as processing at reproduction.

7-1-2. Information Generation Unit 102

An information generation unit 102 according to the sixth embodiment further stores a sensing result of the height of the hand of the user with reference to a screen 20 at a principal point, which is specified from input information by an input unit 120, in the transmission information corresponding to the user.

7-1-3. Output Control Unit 108

An output control unit 108 according to the sixth embodiment changes a value of a display parameter of the image of the hand of the user corresponding to the transmission information, the value being generated on the basis of the transmission information obtained from another point, according to height information of the user included in the transmission information. The display parameter may be, for example, the transparency, a display color, the degree of blurring of an outline of the hand image, or the like.

For example, as illustrated in FIG. 30, the output control unit 108 makes the transparency of the image of the hand of the user higher as a value indicated by the height information of the hand of the user included in the transmission information is larger. According to the display example, in a case where the user is hovering on the screen 20 (for example, the user is in the middle of extending the hand to an object to be pointed at), the image of the hand is displayed light. Furthermore, in a case where the user is pointing at some object, the image of the hand is displayed dark. Therefore, the intention of the operator can be clearly presented.

Alternatively, the output control unit 108 may change the transparency of the image of the hand of the user on the basis of a first threshold, a second threshold larger than the first threshold, and the value indicated by the height information of the hand. For example, in a case where the value indicated by the height information of the hand is less than the first threshold, the output control unit 108 sets the transparency of the image of the hand of the user to be low (for example, "0%" or the like). Furthermore, in a case where the value indicated by the height information of the hand is the first threshold or larger, and less than the second threshold, the output control unit 108 sets the transparency of the image of the hand of the user to be high (for example, "50V" or the like). Furthermore, in a case where the value indicated by the height information of the hand is the second threshold or larger, the output control unit 108 may hide the image of the hand of the user.

7-2. Effect

As described above, according to the sixth embodiment, the image of the hand of the user can be displayed such that whether or not the user is pointing at some object is distinguishable, in the middle of the user at another point extending the hand. Therefore, the intention of the user at another point can be more easily understood.

8. Seventh Embodiment

The sixth embodiment has been described above. Next, a seventh embodiment according to the present disclosure will be described. First, the background on which the seventh embodiment has been made will be described with reference to FIGS. 31A to 31D.

Figure 31C:
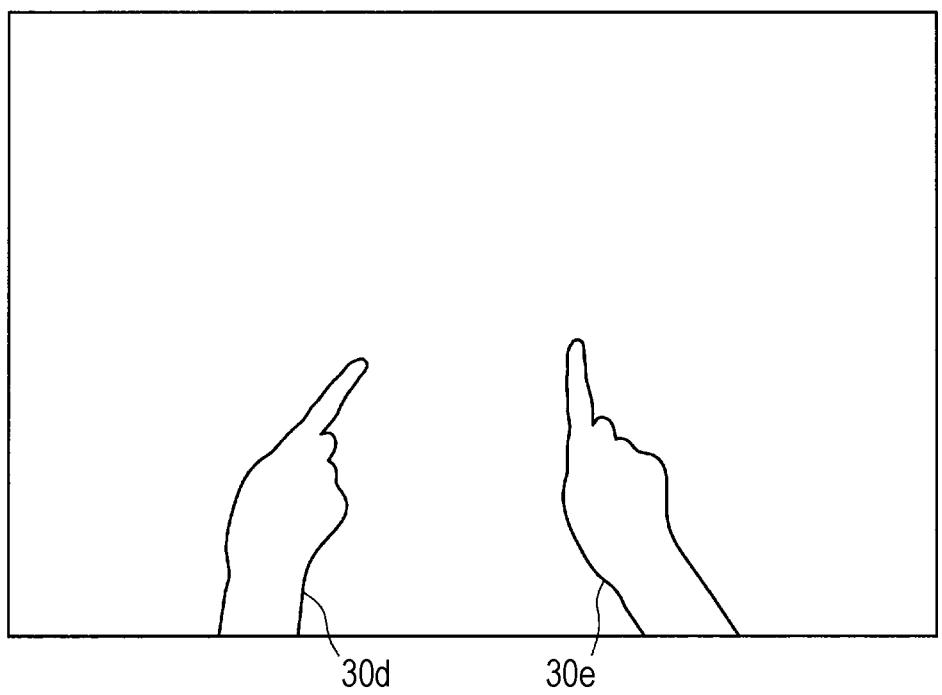
FIG. 31C is a diagram illustrating an example in which the users are located near the screen 20 in the point C.

In the seventh embodiment, a scene in which a meeting is performed connecting a plurality of points is assumed. FIGS. 31A to 31C illustrate examples in which users are located on the same side with respect to a screen 20 at each point ("point A", "point B", and "point C") (the lower side in the examples illustrated in FIGS. 31A to 31C).

Figure 31D:
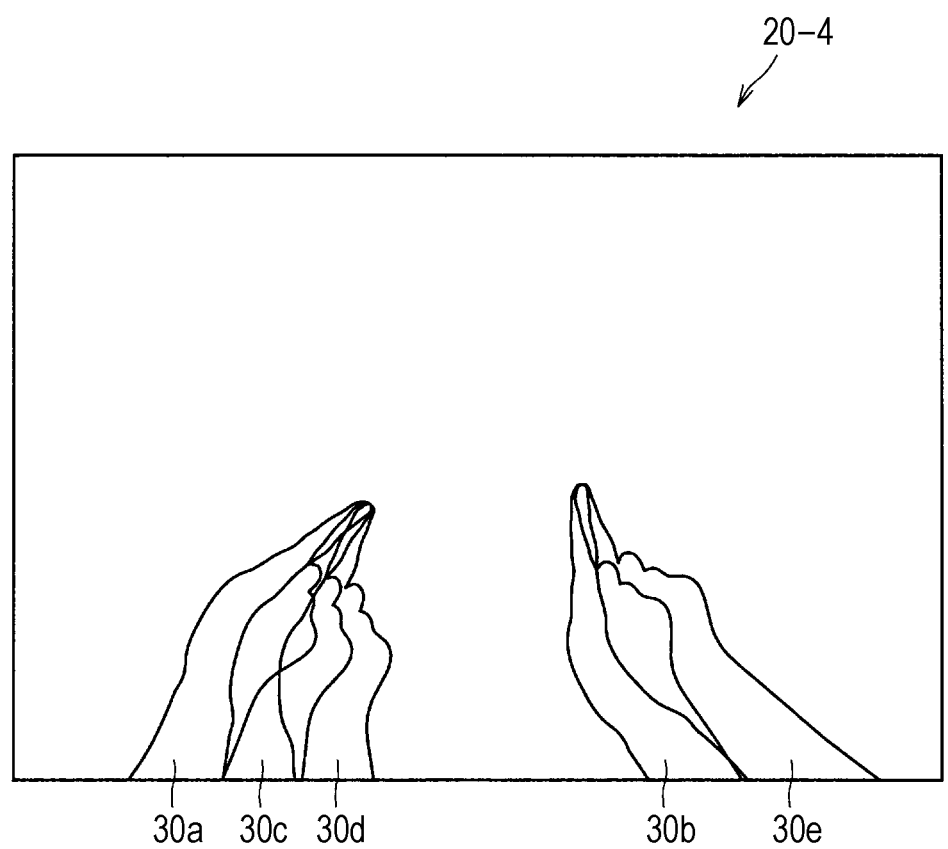
FIG. 31D is a diagram illustrating a display example of the image 30 of the hand according to the first embodiment in the situations illustrated in FIGS. 31A to 31C.

As described above, basically, the output control unit 108 according to the first embodiment can display the image of the hand of the user on a screen 20-4 at the principal point while maintaining the positional relationship between the screen 20 at another point and the arm position of the user at the another point. Therefore, in the situations illustrated in FIGS. 31A to 31C, an image 30 of the hand of each user is displayed such that the hand of each user extends from the same side of the screen 20-4, as illustrated in FIG. 31D. Therefore, the visibility may deteriorate because the plurality of images 30 may overlap. Moreover, since the hand of the user at another point is displayed as extending from the user, the user at a principal point may feel unnatural (or uncomfortable) at the time of operation.

As will be described below, according to the seventh embodiment, the image of the hand of each user can be displayed with high visibility while maintaining a pointing position of each user at each point.

8-1. Configuration

8-1-1. Information Conformity Rule DB 132

In an information conformity rule DB 132 according to the seventh embodiment, a conformity rule illustrated in FIG. 32 can be registered in addition to (or in place of) the conformity rule illustrated in FIG. 21. In the conformity rule illustrated in FIG. 32, the number of arm positions (of the users at other points) present at one side of the screen at the principal point is defined as a check target. Moreover, in the conformity rule, a case where the number of arm positions is "equal to or smaller than "two" being conformable is defined.

8-1-2. Output Control Unit 108

8-1-2-1. Change of Display Position

An output control unit 108 according to the seventh embodiment specifies the pointing position of the hand at the principal point of the user corresponding to transmission information, a hand position of the user, and an arm position of the user on the basis of the individual transmission information acquired from each of a plurality of other points. Moreover, in a case where a relationship of the specified arm positions of the individual users becomes a predetermined relationship, the output control unit 108 changes display positions of the images corresponding to the hands of the individual users according to the points where the users are located.

Here, the above function will be described in more detail with reference to FIG. 32. For example, in a case where the number of arm positions present at one side of the screen 20 at the principal point, of the arm positions at the principal point of the individual users at the plurality of other points, becomes "three" or more, the output control unit 108 determines that the number of arm positions is not conformable. Then, the output control unit 108 corrects the arm positions of the individual users such that the number of arm positions present at one side of the screen 20 at the principal point becomes "two" or less while maintaining the pointing positions of the individual users at the plurality of other points. For example, the output control unit 108 may divide the arm positions of the individual users to be located at different sides of the screen 20, for each of points where the individual users are located.

Moreover, the output control unit 108 corrects, regarding each user of which the arm position has been moved, the hand position of the user on the basis of the arm position of the user after movement and the pointing position of the user.

8-1-2-2. Change of Display Color

Figure 33:
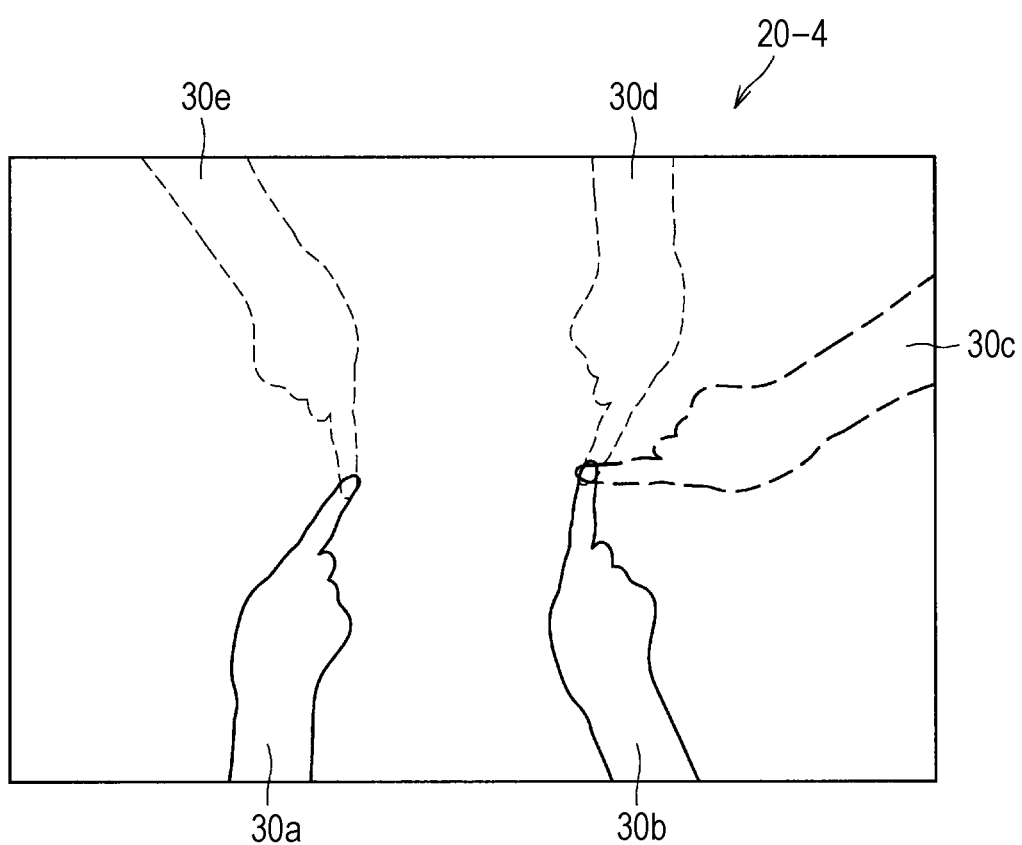
FIG. 33 is a diagram illustrating a display example of an image 30 of a hand according to the seventh embodiment in the situations illustrated in FIGS. 31A to 31C.

Moreover, as illustrated in FIG. 33, for example, the output control unit 108 may make a display color of an image 30 of the hand of the individual user different for each point where the individual user is located. Note that, in FIG. 33, an image 30*a* and an image 30*b* respectively illustrate images of the hands corresponding to the users 4 at the "point A" (illustrated in FIG. 31A) Furthermore, an image 30*c* illustrate an image of the hand corresponding to the user 4*c* at the "point B" (illustrated in FIG. 31B). Furthermore, an image 30*d* and an image 30*e* respectively illustrate images of the hands corresponding to the users 4 at the "point C" (illustrated in FIG. 31C).

8-2. Effect

As described above, according to the seventh embodiment, the image of the hand of each user can be displayed with high visibility while maintaining the pointing position of each user at each point. Then, the usability can be improved.

9. Eighth Embodiment

The seventh embodiment has been described above. Next, an eighth embodiment according to the present disclosure will be described. First, the background on which the eighth embodiment was made will be described with reference to FIGS. 34A and 34B.

Figure 34A:
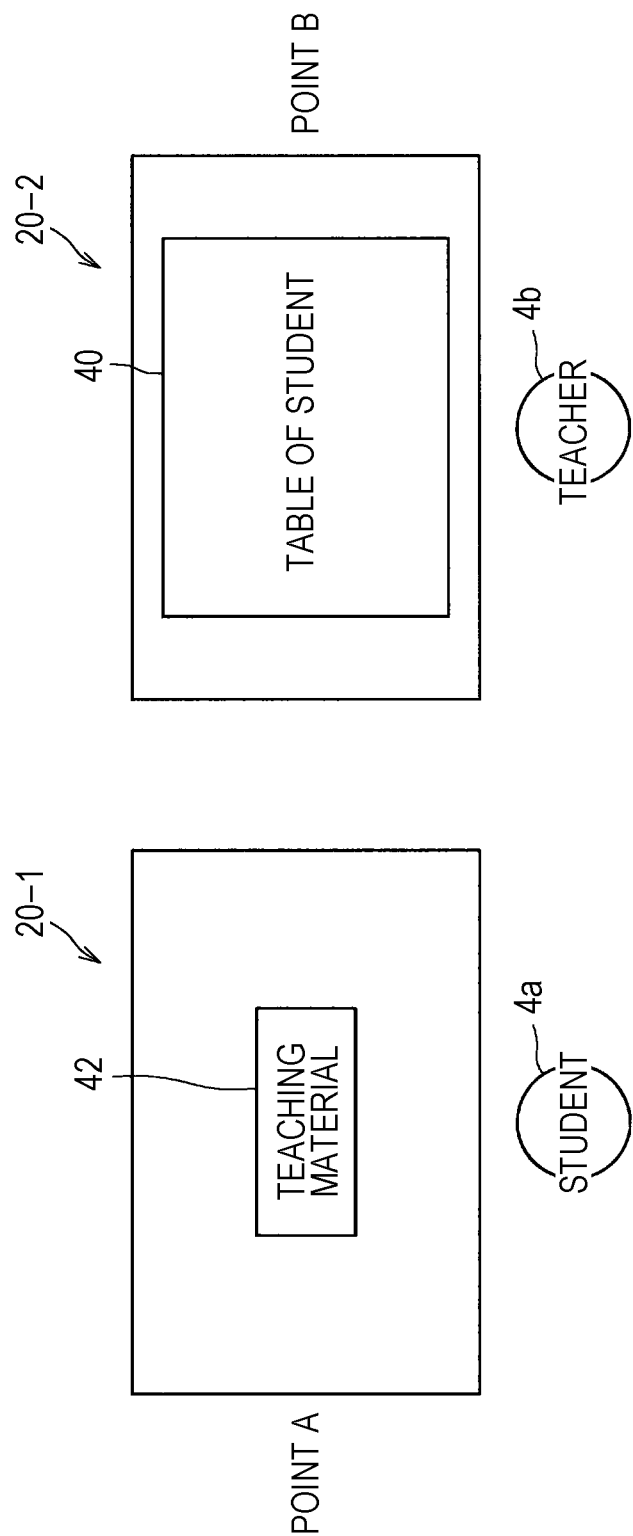
FIG. 34A is a diagram illustrating an example in which a teaching material is arranged on a screen 20-1 at the point A, and a captured image of a table at the point A is displayed on the screen 20 at the point B.

In the eighth embodiment, a scene in which a teacher gives an instruction to a student from a remote place is assumed. For example, as illustrated in FIG. 34A, a teaching material is placed on a table at a point A, and a video capturing the table at point A is transmitted to a point B and is displayed on a screen 20 at the point B. Then, the direction of the teaching material (included in the video) displayed on the screen 20 at the point B is assumed to be the same as the direction of the teaching material at the point A.

As described above, basically, the output control unit 108 according to the first embodiment can display the image of the hand of the user on the screen 20-4 at the principal point while maintaining the positional relationship between the screen 20 at another point and the arm position of the user. Therefore, in the situation illustrated in FIG. 34A, an image 30a of the hand of the teacher (located at the point B) is displayed at the hand of the student located at the point A, as illustrated in FIG. 34B. As a result, the student has a difficulty in viewing the teaching material, which may hinder learning.

As will be described below, according to the eighth embodiment, the image of the hand of the teacher can be displayed with high visibility while maintaining a pointing position of the teacher at the remote place.

9-1. Configuration

{9-1-1. Information Conformity Rule DB 132}

In an information conformity rule DB 132 according to the eighth embodiment, a conformity rule illustrated in FIG. 35 can be registered in addition to (or in place of) the conformity rule illustrated in FIG. 21. In the conformity rule illustrated in FIG. 35, the number of arm positions (of the users at other points) present at one side of the screen at the principal point is defined as a check target. Moreover, in the conformity rule, a case where the number of arm positions is "equal to or smaller than "one" being conformable is defined.

9-1-2. Output Control Unit 108

9-1-2-1. Correction of Transmission Information

In a case where a relationship between an arm position at the principal point, of the user at another point, and an arm position of the user at the principal point, which are specified on the basis of transmission information obtained from the another point, becomes a predetermined relationship, an output control unit 108 according to the eighth embodiment corrects the arm position of the user at the another point on the basis of the arm position of the user at the principal point and the pointing position of the hand of the user at the another point.

Here, the above function will be described in more detail with reference to FIG. 35. For example, as illustrated in FIG. 35, in a case where the number of arm positions present at one side of the screen 20 at the principal point becomes "two" or more, the output control unit 108 determines that the number of arm positions is not conformable. Then, the output control unit 108 moves the arm position of the user at the another point such that the number of arm positions present at one side of the screen 20 at the principal point becomes "one" or less while maintaining the pointing positions of the user at the another point. In the example illustrated in FIG. 34A, the output control unit 108 may move the arm position of the teacher such that the (virtual) arm position of the teacher (located at the point B) at the point A is located at a side opposite to the student, as illustrated in FIG. 36A.

Moreover, the output control unit 108 corrects the hand position of the user of which the arm position has been moved on the basis of the arm position of the user after movement and the pointing position of the user.

9-1-2-2. Display of Hand Image after Correction

Figure 36B:
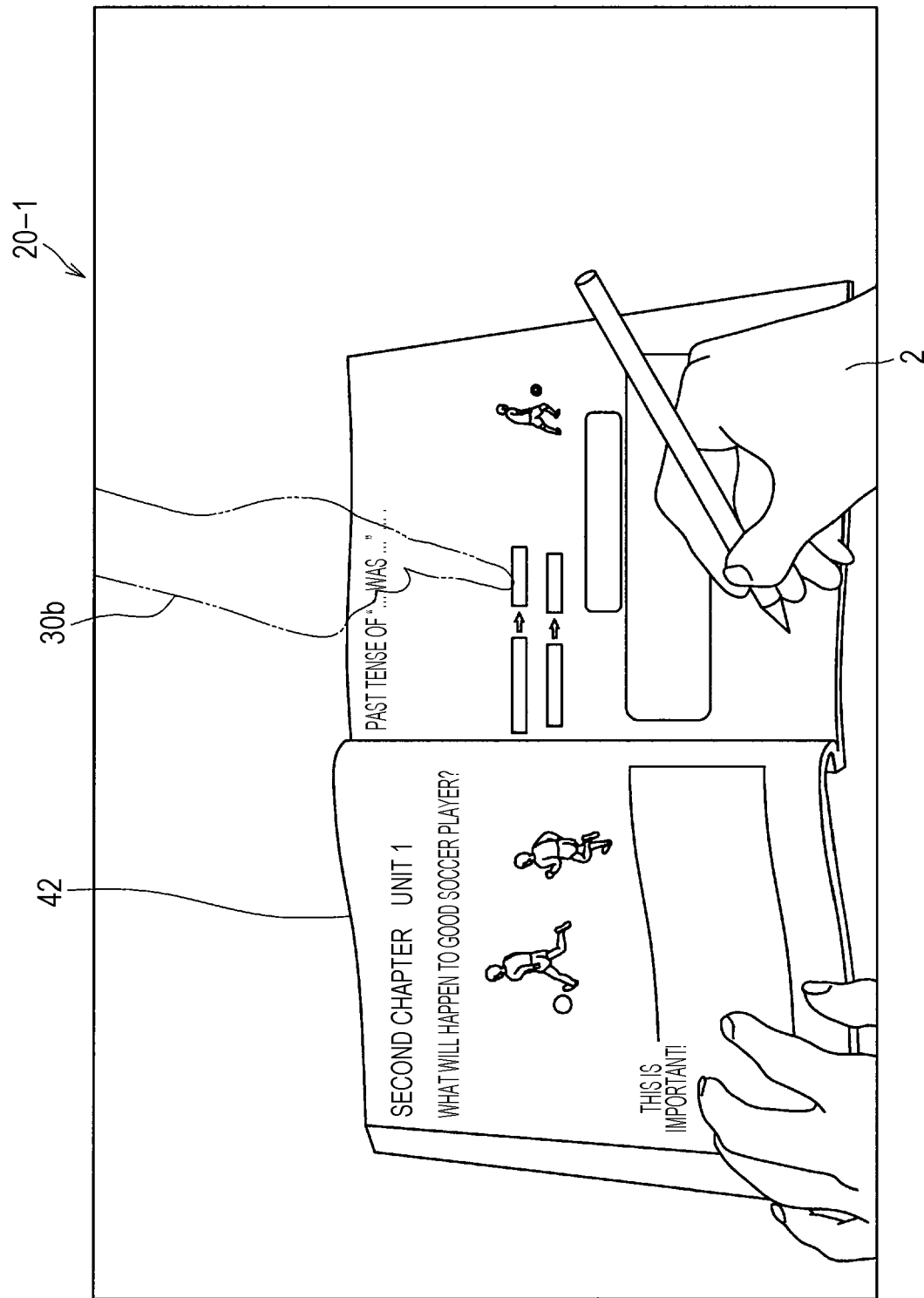
FIG. 36B is a diagram illustrating a display example of an image 30 of a hand according to the eighth embodiment at the point A in the situation illustrated in FIG. 34A.

Moreover, after the above correction, the output control unit 108 generates an image corresponding to the hand of the user on the basis of the pointing position of the hand of the user (the "teacher" in the example illustrated in FIG. 36B) at the appropriate another point, the hand position of the user after correction, and the arm position of the user after correction, as illustrated in FIG. 36B. Then, the output control unit 108 displays the generated image on the screen 20 in the principal point.

9-2. Effect

As described above, according to the eighth embodiment, the image of the hand of the teacher can be displayed with high visibility while maintaining the pointing position of the teacher at the remote place. For example, a video as if the teacher is facing and teaching the student while both the student and the teacher are actually looking at the teaching material from the same direction.

10. Ninth Embodiment

The eighth embodiment has been described above. Next, a ninth embodiment according to the present disclosure will be described. In the ninth embodiment, a scene in which a user at at least one point communicates with a user at another point by using an operation device such as a mouse. In such a case, a hand position and an arm position of the user are acquirable at a point where a hand is used as an operation body, whereas at a point where a mouse is used the an operation body, only information of a cursor position of the mouse can be usually obtained.

As will be described below, according to the ninth embodiment, an image in which a hand corresponding to a user at another point naturally moves can be displayed on a screen 20 according to transmission information acquired from the another point even in a case where the user at the another point uses an operation device.

10-1. Configuration 10-1-1. Information Generation and Reproduction Rule DB 130

In an information generation and reproduction rule DB 130 according to the ninth embodiment, registered content illustrated in FIG. 37 can be further added in addition to the registered content illustrated in FIG. 11. FIG. 37 illustrates an example in which generating the image of the hand on the basis of the information of the cursor position included in the transmission information acquired from another point is defined as processing at reproduction.

10-1-2. Information Generation Unit 102

In a case where the user uses the operation device, an information generation unit 102 according to the ninth embodiment further stores information (for example, an x coordinate, a y coordinate, and the like) of a pointing position of the operation device, which is specified from input information acquired by an input unit 120, in the transmission information corresponding to the user. Note that the input unit 120 may include the operation device. Furthermore, the input unit 120 and the operation device may be configured in a communicative manner by wired or wireless communication.

10-1-3. Output Control Unit 108

10-1-3-1. Hand Image Generation

In a case where information of the pointing position of the operation device is included in the transmission information acquired from another point, the output control unit 108 according to the ninth embodiment determines a virtual hand position at a principal position, of the user at the another point, and a virtual arm position at the principal point, of the user at the another point, on the basis of a positional relationship between a pointing position at the principal point specified from the information of the pointing position and each side of a screen at the principal point. Then, the output control unit 108 generates an image of a hand of the user at the another point on the basis of the pointing position at the principal point, the determined virtual hand position, and the determined virtual arm position.

Figure 38A:
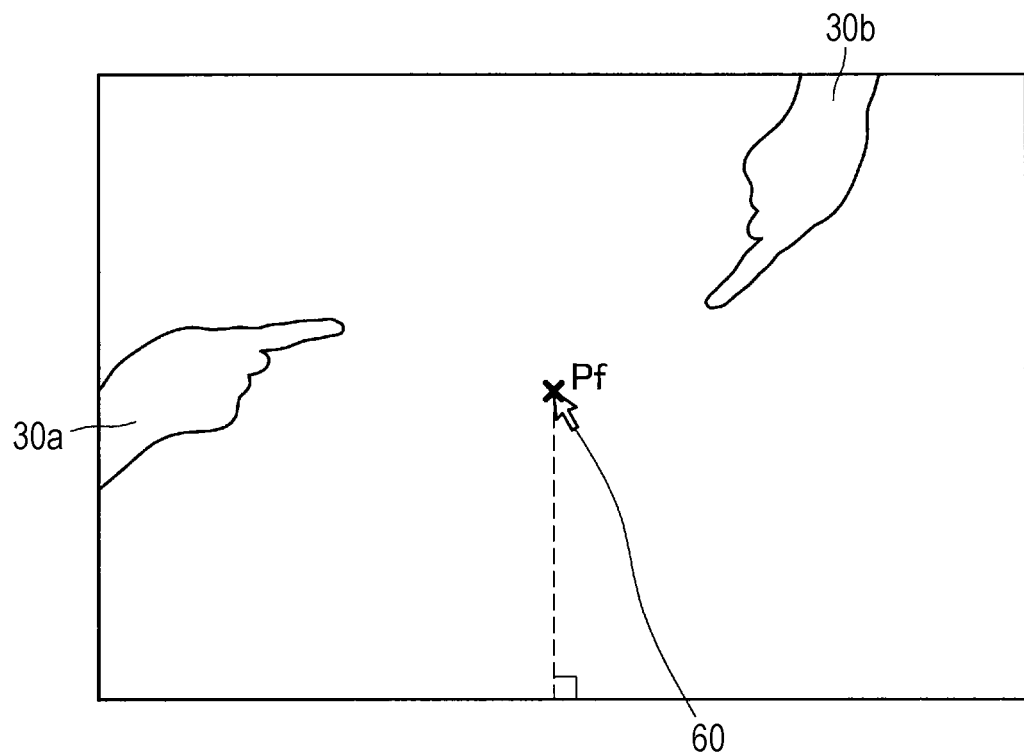
FIG. 38A is a diagram illustrating a determination example of a virtual arm position of a user according to the ninth embodiment.
Figure 38B:
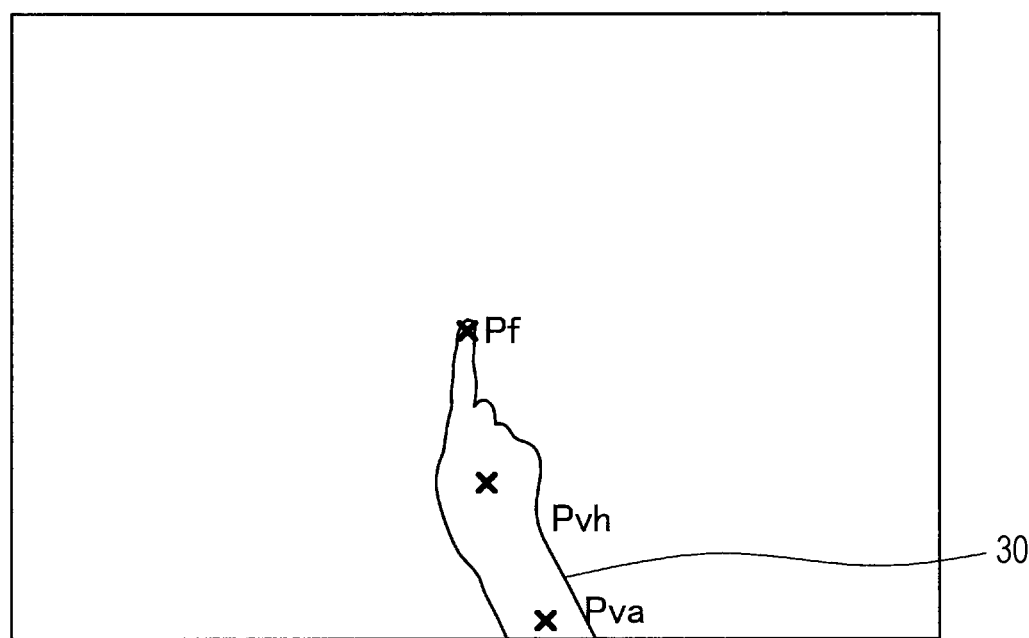
FIG. 38B is a diagram illustrating a determination example of the virtual arm position and a virtual hand position according to the ninth embodiment.

Here, the above function will be described in more detail with reference to FIGS. 38A and 38B. For example, the output control unit 108 first determines a position on the screen 20 at the principal point corresponding to the pointing position of the operation device included in the acquired transmission information, as a finger position of the user at the another point. Next, as illustrated in FIGS. 38A and 38B, the output control unit 108 determines an intersection position of a side closest to the determined finger position (Pf) on the screen 20, and a vertical line with respect to the side from the finger position, as the virtual arm position of the user. Then, as illustrated in FIG. 38B, the output control unit 108 determines the virtual hand position (Pvh) of the user on the basis of the finger position (Pf) of the user, the virtual arm position (Pva) of the user, and a predetermined hand model.

10-1-3-2. Display of Hand Image

Moreover, the output control unit 108 displays the generated image of the hand on the screen 20.

Note that, when the virtual hand position and the virtual arm position of the user are simply moved in parallel in accordance with the movement of the cursor position when the pointing position of the operation device is changed (for example, when the mouse cursor is moved), a viewer may feel that the movement is unnatural movement. For example, the viewer notices that a user at a remote location is operating the mouse or the like.

Therefore, when the pointing position of the operation device is changed at another point, the output control unit 108 can change the virtual hand position and the virtual arm position of the user at the another point, following the change of the pointing position, by an amount smaller than a change amount of the pointing position of the operation device. For example, as illustrated in FIG. 38C, when the pointing position is moved from Pf0 to Pf1, the output control unit 108 moves the virtual hand position (Pvh) of the user by a distance smaller than the distance between Pf0 and Pf1 in the same direction as a moving direction of the pointing position. Furthermore, the output control unit 108 moves the virtual arm position (Pva) of the user by a distance smaller than the moving amount of the virtual hand position of the user in the same direction as the moving direction of the pointing position.

Thereby, when movement of the cursor position (that is, the pointing position) of the house has been detected at another point, for example, natural movement of the hand according to the change of the pointing position can be presented at the principal point.

10-2. Effect

As described above, according to the ninth embodiment, the image in which the hand corresponding to the user at another point naturally moves can be displayed on the screen 20 according to the transmission information acquired from the another point even in the case where the user at the another point uses an operation device. As a result, a video as if all the users are performing operation by hand can be presented at each point, which leads to smooth communication.

11. Tenth Embodiment

The ninth embodiment has been described above. Next, a tenth embodiment according to the present disclosure will be described. In general, in a scene where users at different points conduct a meeting for the first time, individual users located at the different points may feel reluctant to disclose all of information of their own to other users.

As will be described below, according to the tenth embodiment, an amount of information (type of information or the like) to be disclosed to a user at another point can be increased or decreased according to familiarity with the user at the another point.

11-1. Configuration

11-1-1. Information Generation and Reproduction Rule DB 130

FIG. 39 is a diagram illustrating a configuration example of an information generation and reproduction rule DB 130 according to the tenth embodiment. FIG. 39 illustrates an example in which gender information of a user, the size of a hand, and the thickness of an arm are further defined as information types, as compared to the information generation and reproduction rule DB 130a illustrated in FIG. 11.

11-1-2. Information Generation Unit 102

An information generation unit 102 according to the tenth embodiment further stores the gender information of the user, the size of the hand, the thickness of the arm, and the like, which are specified from input information by an input unit 120, in transmission information corresponding to the user.

Note that the gender information of the user may be stored in advance in a storage unit 128 or may be input by the user at the time of using an information processing system 10. Furthermore, the size of the hand and the thickness of the arm can be specified on the basis of, for example, recognition of an image captured by the input unit 120.

11-1-3. Information Acquisition Unit 106

An information acquisition unit 106 according to the tenth embodiment can further acquire information indicating the familiarity between an individual user at another point and the user at the principal point. Here, the information indicating the familiarity may be specified according to a predetermined action performed between users at different points, for example. For example, in a case where self-introduction, a simple game aiming at ice breaking, or the like, having been performed among the users is detected, the familiarity between the users having reached a predetermined threshold ("a familiarity level of 2" in the example illustrated in FIG. 39) or larger may be specified. Alternatively, as illustrated in FIG. 40C, in a case where an operation such as handshake being performed between an image of the hand of the user at another point displayed on the screen 20 at the principal point and the hand of the user at the principal point is detected, the familiarity between the users having reached the predetermined threshold may be specified.

Figure 40A:
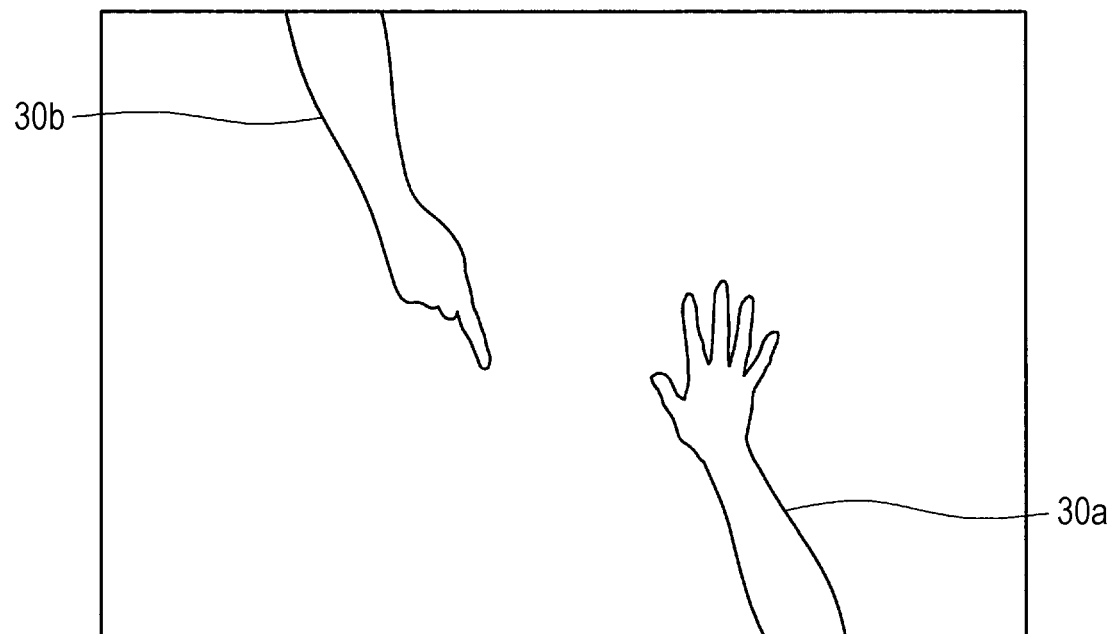
FIG. 40A is a diagram illustrating a display example of an image of a hand of a user at another point in a case where familiarity between the user at another point and the user at a principal point is low.
Figure 40B:
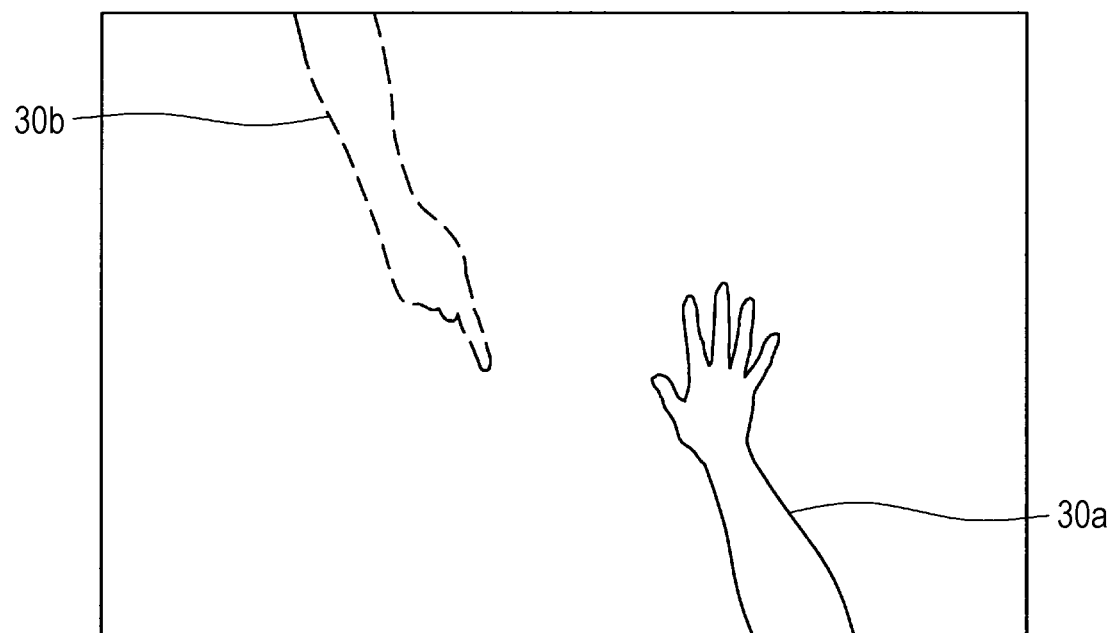
FIG. 40B is a diagram illustrating a display example of an image of the hand of the user at another point in a case where the familiarity between the user at another point and the user at the principal point is high.
Figure 40C:
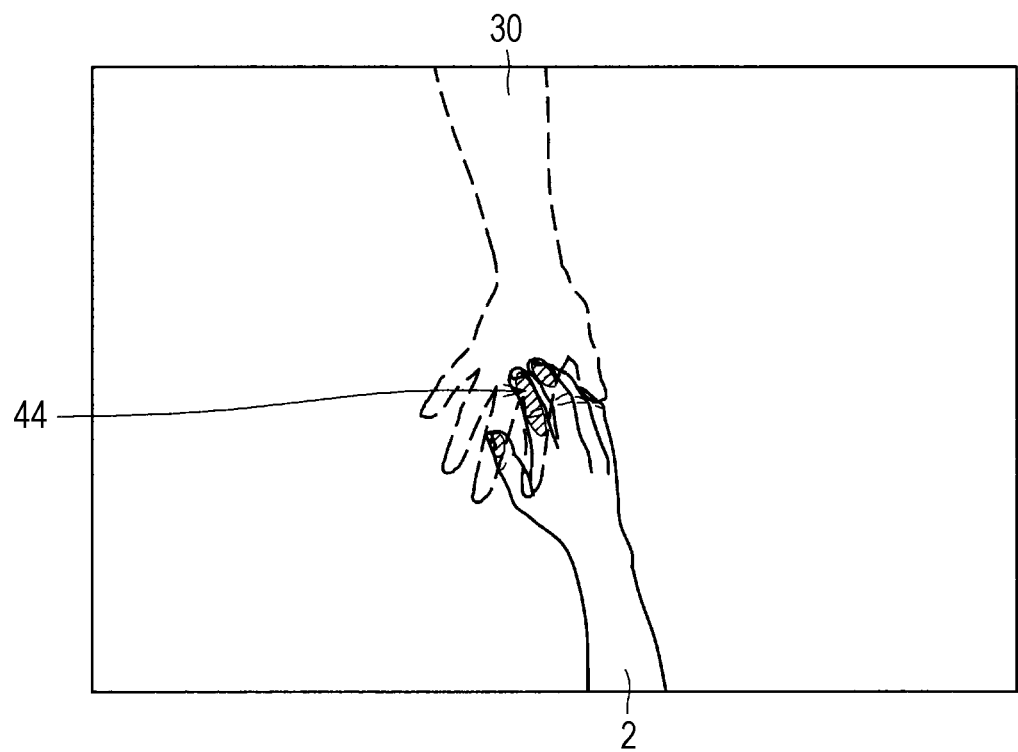
FIG. 40C is a diagram illustrating an example in which a predetermined effect is superimposed and displayed on a region where an image 30 of the user at another point overlaps with a hand 2 of the user at the principal point.

Note that, when the operation of handshake is detected, an output control unit 108 may further superimpose and display a predetermined effect 44 (such as filling a region with a predetermined color) on only a region where an image 30 of the hand of the user at the another point and a hand 2 of the user at the principal point overlap, as illustrated in FIG. 40C. According to this display example, an effect of giving each user an illusion of tactile information based on handshake, which cannot actually be transmitted, can be expected.

Alternatively, the information indicating the familiarity may be specified on the basis of, for example, registration information or the like of the individual user at another predetermined and the user at the principal point in a predetermined social networking service (SNS).

11-1-4. Output Control Unit 108

The output control unit 108 according to the tenth embodiment changes a display mode of the image of the hand of each user at another point according to the familiarity between the each user and the user at the principal point. For example, while the familiarity between the user at another point and the user at the principal point is less than the predetermined threshold, the output control unit 108 displays the image of the hand of the user at the another point without reflecting physical characteristics and gender of the user at the another point. In this case, for example, as illustrated in FIG. 40A, the output control unit 108 displays the image of the hand only reflecting a finger position, a hand position, an arm position, and a hand shape of the appropriate user at another point. According to the display example, in a case where the familiarity between the users is low, physical information of the users is not transmitted to each other, so that psychological resistance of each user can be reduced.

Furthermore, after the familiarity between the user at another point and the user at the principal point becomes the predetermined threshold or larger, the output control unit 108 may display the image of the hand of the user at the another point in a display mode in which the physical characteristics (for example, the size of the hand, the thickness of the arm, and the like) and the gender of the user at the another point are further reflected. In this case, for example, as illustrated in FIG. 40B, the output control unit 108 may change the size of the hand in the image of the hand of the user according to the size of the hand of the user included in the transmission information acquired from the another point. Furthermore, the output control unit 108 may change the thickness of the arm in the image of the hand of the user according to the thickness of the arm of the user included in the transmission information acquired from the another point. Furthermore, the output control unit 108 may change the display color of the image of the hand of the user according to the gender of the user at the another point (for example, a female is display in red and a male is displayed in blue).

Note that, as a modification, for example, the output control unit 108 at a point of a role performing facilitation may display, regarding each of individual users at all the other points currently in communication, the image of the hand of the user in a display mode in which all of information of the user are reflected in a constant manner.

11-2. Effect

As described above, according to the tenth embodiment, the amount of information (type of information or the like) to be disclosed to the user at another point can be increased or decreased according to the familiarity with the user at the another point. As a result, the users are expected to more casually use the system.

12. Eleventh Embodiment

The tenth embodiment has been described above. Next, an eleventh embodiment of the present disclosure will be described.

In the eleventh embodiment, at each point, an input unit 120 including only one microphone (sound input device) and an output unit 124 including only one speaker (sound output device) is assumed. In this case, if simultaneous utterance of users located at a plurality of points in communication is detected, the output unit 124 can simultaneously output the uttered sounds. As a result, a user at a principal point cannot know which user at which point is currently speaking.

As will be described below, according to the eleventh embodiment, a display mode of an image of a hand of a user at another point can be changed according to a sound collection result of the utterance of the user at the another point.

12-1. Configuration

12-1-1. Information Generation and Reproduction Rule DB 130

In an information generation and reproduction rule DB 130 according to the eleventh embodiment, registered content illustrated in FIG. 41 can be further added in addition to the registered content illustrated in FIG. 11.

12-1-2. Information Generation Unit 102

An information generation unit 102 according to the eleventh embodiment further stores the sound collection result of the utterance of the user acquired by the input unit 120 in transmission information corresponding to the user.

12-1-3. Output Control Unit 108

An output control unit 108 according to the eleventh embodiment changes the display mode of the image of the hand of the user according to the sound collection result of the utterance of the user included in the transmission information acquired from another point. For example, as illustrated in FIG. 41, the output control unit 108 may change transparency and a display color of the image of the hand of the user according to the volume of the collected utterance.

Figure 42:
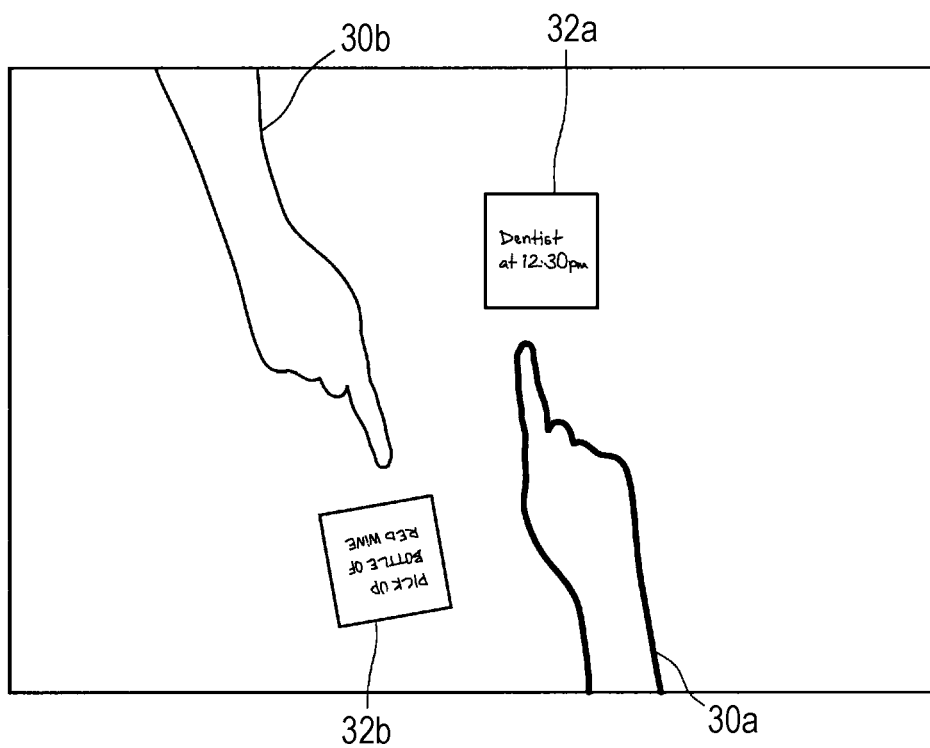
FIG. 42 is a diagram illustrating an example in which display of hands of users is changed according to a sound collection result of an utterance according to the eleventh embodiment.

Alternatively, as illustrated in FIG. 42, the output control unit 108 may blink the image of the hand corresponding to the user who has uttered (an image 30a in the example illustrated in FIG. 42) at timing when the utterance with a fixed volume or larger is collected.

12-2. Effect

As described above, according to the eleventh embodiment, the display mode of the image of the hand of the user at another point can be changed according to the sound collection result of the utterance of the user at the another point. For this reason, even in a case where the user at another point utters using a pronoun such as "please see this", for example, the user at the principal point can easily understand which object (item or the like) the user is pointing at.

Furthermore, the display of the appropriate image can be changed reflecting the strength of the sound and the timing of the utterance. Therefore, for example, as illustrated in FIG. 42, even in a scene where the user at the principal point is simultaneously performing communication with users at a plurality of other points, the user at the principal point can easily understand the relationship between the utterance currently being output and the image of the hand corresponds to the speaker (the user at another point).

13. Twelfth Embodiment

The eleventh embodiment has been described above. Next, a twelfth embodiment according to the present disclosure will be described. In the twelfth embodiment, at each point, an input unit 120 including a plurality microphones (sound input devices) is assumed. For example, the plurality of microphones is configured as a microphone array. Furthermore, a plurality of users being mainly located at each point is assumed.

As will be described below, according to the twelfth embodiment, a display mode of an image of a hand of a user at another point can be changed according to spatial distribution of volume sensed at the another point.

13-1. Configuration

13-1-1. Information Generation and Reproduction Rule DB 130

In an information generation and reproduction rule DB 130 according to the twelfth embodiment, registered content illustrated in FIG. 43 can be further added in addition to the registered content illustrated in FIG. 11.

13-1-2. Information Generation Unit 102

An information generation unit 102 according to the twelfth embodiment further stores the spatial distribution of the volume (at a principal point) sensed by an input unit 120 in transmission information.

13-1-3. Output Control Unit 108

An output control unit 108 according to the twelfth embodiment can further displays, on a screen 20, an image indicating an utterance situation of a user according to information indicating the spatial distribution of the volume sensed at another point included in the transmission information acquired from the another point, and an arm position of the user corresponding to the transmission information specified on the basis of the transmission information.

Figure 44A:
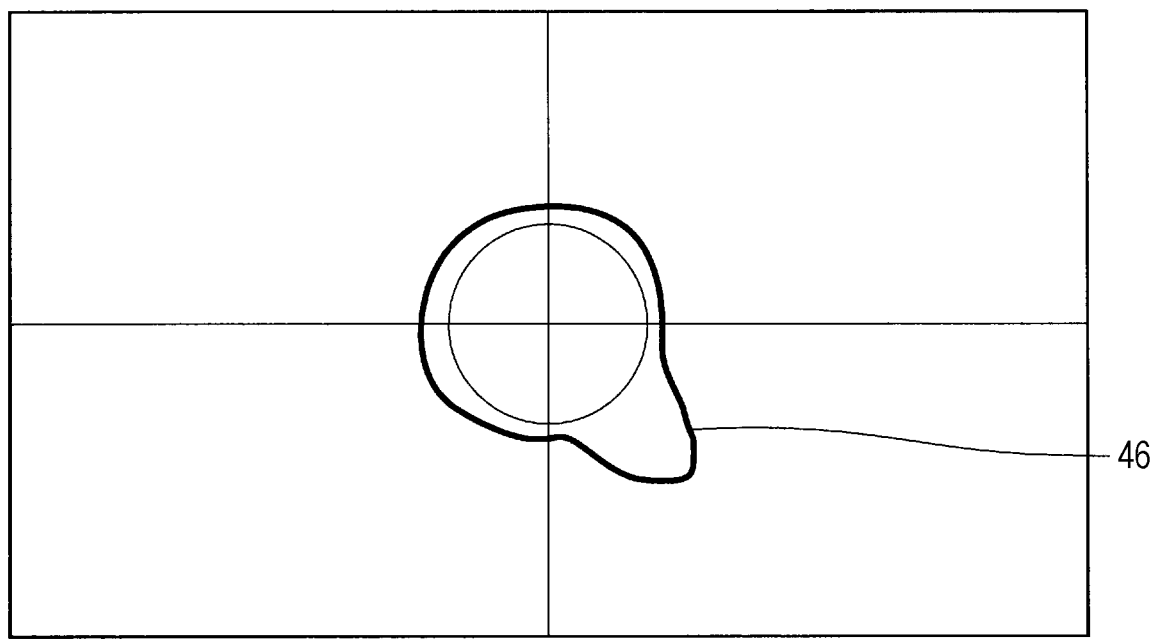
FIG. 44A is a diagram illustrating an example of spatial distribution of volume sensed at another point.
Figure 44B:
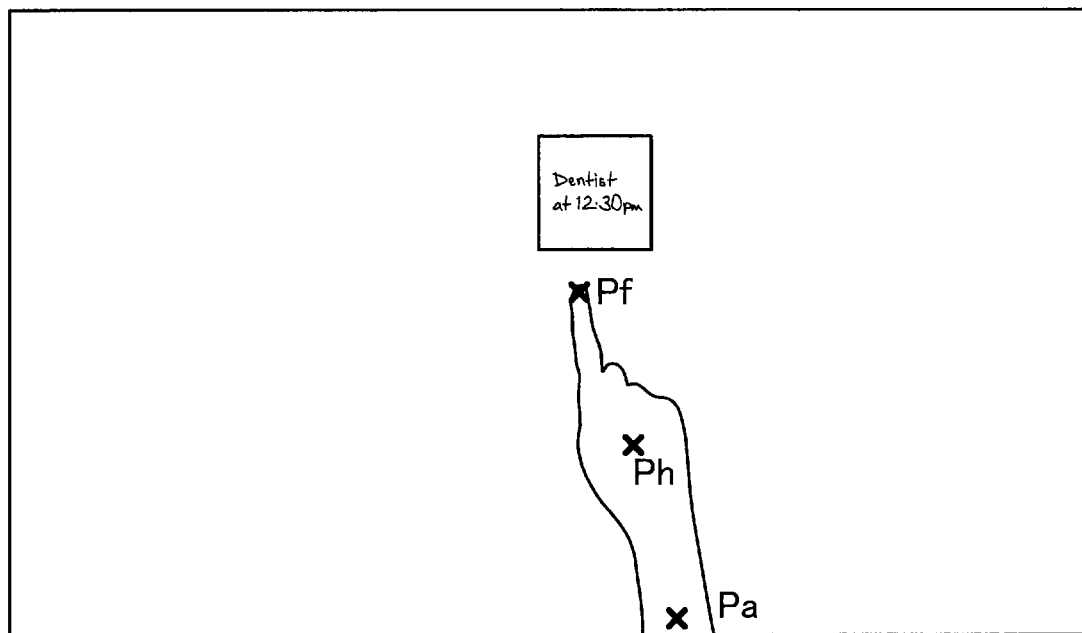
FIG. 44B is a diagram illustrating an example of position information of a hand of a user specified on the basis of transmission information acquired from another point at the timing illustrated in FIG. 44A.
Figure 44C:
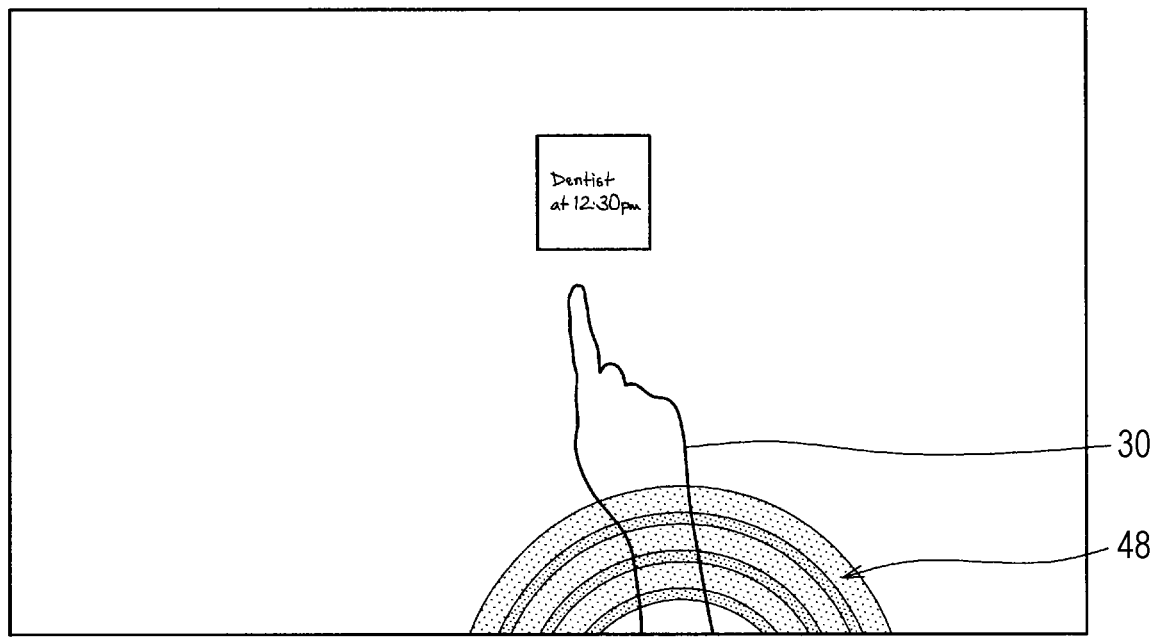
FIG. 44C is a diagram illustrating an example in which an effect is superimposed and displayed only on a portion corresponding to an arm position of a speaker at the timing illustrated in FIG. 44A according to the twelfth embodiment.

Here, the above function will be described in more detail with reference to FIGS. 44A to 44C. For example, it is assumed that distribution 46 of the volume as illustrated in FIG. 44A is specified on the basis of the information indicating the spatial distribution of the volume at another point. FIG. 44A illustrates that the magnitude of a sound coming from a direction corresponding to a lower right side of FIG. 44A is larger than sounds in the other directions. Furthermore, FIG. 44B illustrates an example of a finger position, a hand position, and an arm position of the user at the principal point specified on the basis of the transmission information corresponding to one user at the another point at the timing illustrated in FIG. 44A. Note that FIG. 44B illustrates only the hand of one user. However, the present invention is not limited to the example, and a plurality of users can be simultaneously located at the another point.

In this case, for example, the output control unit 108 first specifies a direction (and a position) of a speaker on the basis of the distribution 46 of the volume illustrated in FIG. 44A. Next, the output control unit 108 specifies a user corresponding to an arm position closest to the specified direction of the speaker, among arm positions of individual users specified from acquired individual transmission information, as the speaker. Then, as illustrated in FIG. 44C, the output control unit 108 superimposes and displays an effect 48 indicating the speaker is uttering only on a part corresponding to the arm position of the speaker.

As a modification, the output control unit 108 may change transparency or a display color of an image of a hand of the speaker or blink the image of the hand of the speaker, in place of (or in addition to) the display of the effect 48.

13-2. Effect

As described above, according to the twelfth embodiment, the display mode of the image of the hand of the user at another point can be changed according to the spatial distribution of the volume sensed at the another point.

14. Thirteenth Embodiment

The twelfth embodiment has been described above. Next, a thirteenth embodiment according to the present disclosure will be described. In the thirteenth embodiment, at each point, an input unit 120 including a plurality microphones (sound input devices) (similarly to the twelfth embodiment) is assumed.

As will be described below, according to the thirteenth embodiment, a sound recognition result of an utterance of a user at another point can be displayed on a screen 20 together with an image of a hand of the user.

14-1. Configuration

14-1-1. Information Generation and Reproduction Rule DB 130

In an information generation and reproduction rule DB 130 according to the thirteenth embodiment, registered content illustrated in FIG. 45 can be further added in addition to the registered content illustrated in FIG. 11.

14-1-2. Information Generation Unit 102

An information generation unit 102 according to the thirteenth embodiment can recognize a sound collection result of the utterance of the user acquired by the input unit 120. Then, the information generation unit 102 further stores spatial distribution of volume (at a principal point) sensed by the input unit 120, a character string of the sound recognition result of the utterance, and collected sound data in transmission information.

14-1-3. Output Control Unit 108

14-1-3-1. Display Example 1

An output control unit 108 according to the thirteenth embodiment displays, on a screen 20, the character string of the sound recognition result of the utterance included in the transmission information acquired from another point in association with the image of the hand of the user corresponding to the transmission information. For example, the output control unit 108 displays, on the screen 20, the character string of the sound recognition result of the utterance in association with the image of the hand of the user at the time of utterance of the user, which is specified on the basis of the acquired transmission information.

Figure 46A:
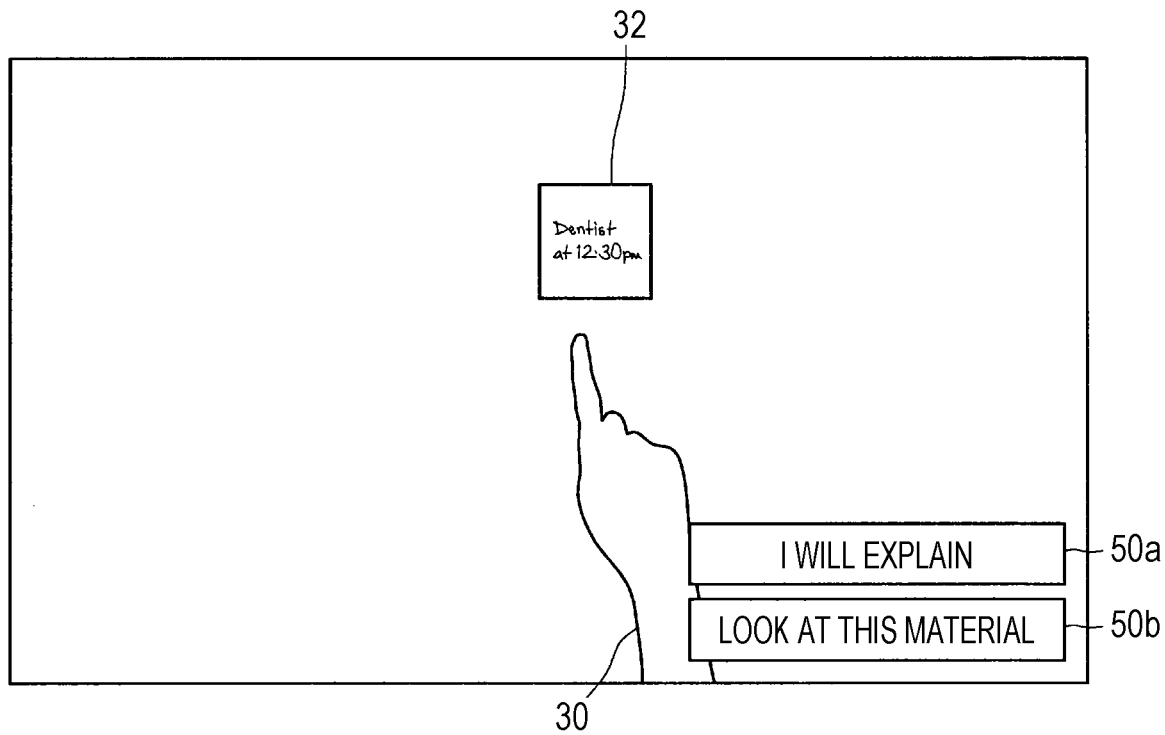
FIG. 46A is a diagram illustrating a display example of sound recognition results of utterances of a user at another point according to the thirteenth embodiment.

As an example, the output control unit 108 first determines whether or not the user corresponding to the transmission information is uttering (or has previously uttered) on the basis of the information indicating the spatial distribution of the sensed volume included in the acquired transmission information. Then, when the user is determined to be uttering, the output control unit 108 displays a character string 50 of the sound recognition result of the utterance included in the transmission information near an arm position of the user at the principal point, as illustrated in FIG. 46A, for example.

Alternatively, the output control unit 108 may display the character string of the sound recognition result of the utterance in association with an object corresponding to a pointing position of the user. For example, the output control unit 108 may display the character string of the sound recognition result of the utterance near the object pointed at by the user.

14-1-3-2. Display Example 2

Figure 46B:
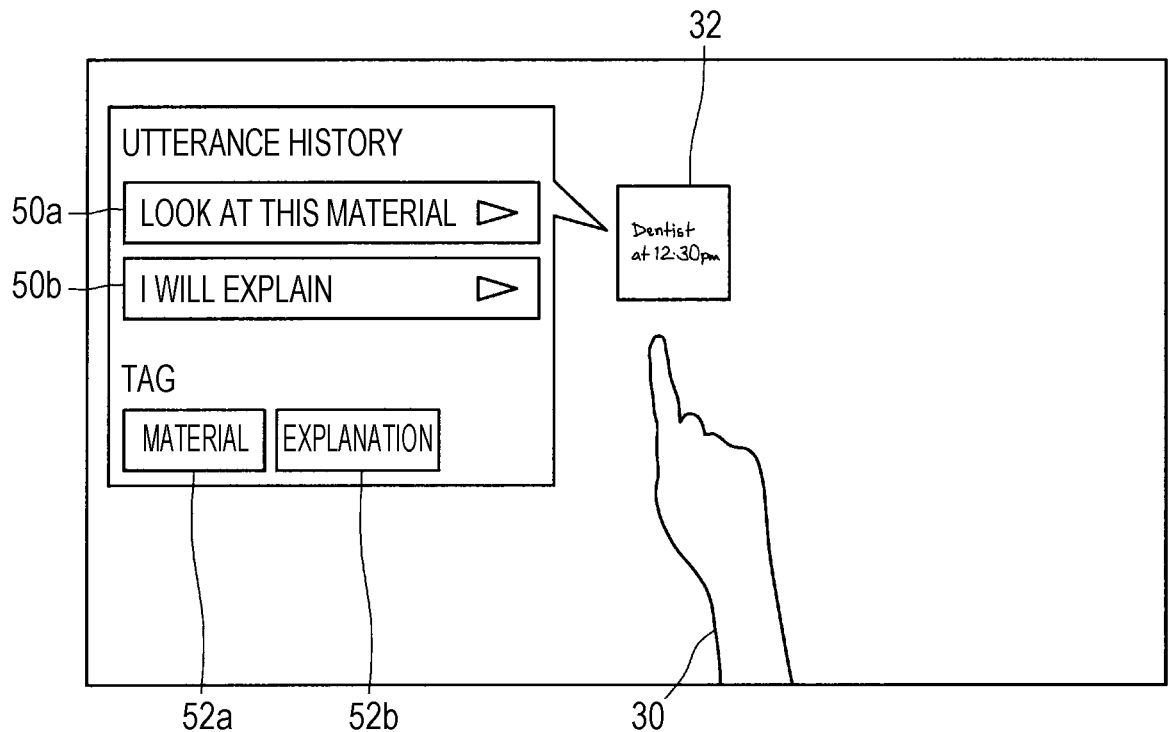
FIG. 46B is a diagram illustrating another display example of the sound recognition results of utterances of a user at another point according to the thirteenth embodiment.

Moreover, the output control unit 108 may further display, on the screen 20, one or more keywords (for example, nouns, or the like) obtained from a result of a morphological analysis for the character string of the sound recognition result, as tag information. For example, the output control unit 108 first performs the morphological analysis for the character string of the sound recognition result. Then, as illustrated in FIG. 46B, the output control unit 108 may display the character string 50 of the sound recognition result and one or more keywords 52 obtained from the result of the morphological analysis in association with an object 32 pointed at by the user.

Moreover, the output control unit 108 may further store, in a storage unit 128, the one or more keywords (tag information) obtained from the result of the morphological analysis for the character string of the sound recognition result in association with other various types of information. The other various types of information may include, for example, the sound recognition result, identification information of the user who has uttered, identification information of the object pointed at by the user at the time of utterance, time and data information of the utterance, sound binary data at the time of appropriate communication, or the like.

Thereby, these pieces of information can be used as meeting minutes. Furthermore, in a scene where recorded video data (or recorded sound data) of the meeting is reproduced to look back on the meeting, the tag information can be displayed together with the recorded video data. Therefore, the realistic feeling can be improved. Moreover, since a search can be conducted using the tag information or the other types of information as a key. Therefore, the recorded video data of a desired meeting can be searched and desired reproduction timing of certain recorded video data can be searched.

14-2. Effect

As described above, according to the thirteenth embodiment, the sound recognition result of the utterance of the user at another point can be displayed together with the image of the hand of the user at the another point.

15. Fourteenth Embodiment

The thirteenth embodiment has been described above. Next, a fourteenth embodiment according to the present disclosure will be described. In the fourteenth embodiment, at each point, an input unit 120 including a plurality of microphones (sound input devices) and an output unit 124 including a plurality speakers (sound output devices) is assumed.

As will be described below, according to the fourteenth embodiment, a sound image of an utterance of a user collected at another point can be localized near an arm position of the user at a principal point.

15-1. Configuration

15-1-1. Information Generation and Reproduction Rule DB 130

In an information generation and reproduction rule DB 130 according to the fourteenth embodiment, registered content illustrated in FIG. 47 can be further added in addition to the registered content illustrated in FIG. 11.

15-1-2. Information Generation Unit 102

An information generation unit 102 according to the fourteenth embodiment further stores information indicating spatial distribution of volume (at a principal point) sensed by the input unit 120 (similarly to the thirteenth embodiment) and collected sound data in transmission information.

15-1-3. Output Control Unit 108

Figure 48:
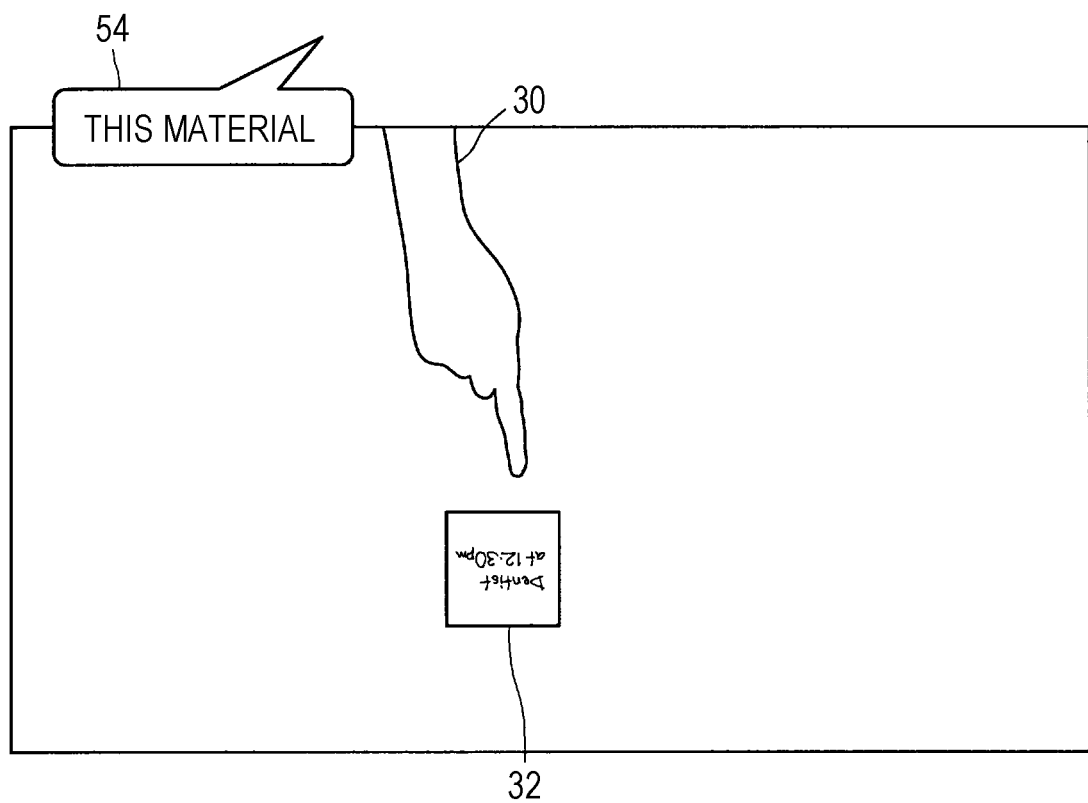
FIG. 48 is a diagram illustrating an example in which a sound of an utterance is localized in a direction in which volume intensity of the utterance of a user at another point is the largest according to the fourteenth embodiment.

An output control unit 108 according to the fourteenth embodiment causes the plurality of microphones included in the output unit 124 to output the sound data included in the transmission information on the basis of the information indicating the spatial distribution of the sensed volume included in the acquired transmission information. For example, as illustrated in FIG. 48, the output control unit 108 controls outputs of the plurality of microphones to localize the sound of the utterance in a direction (at an angle) in which volume intensity indicated by the information indicating the spatial distribution of the volume is the largest. Thereby, an expression in which the sound of the utterance is heard at the principal point from the same direction as the direction in which the user has uttered at the another point can be realized.

15-2. Effect

As described above, according to the fourteenth embodiment, the sound image of the utterance of the user collected at another point can be localized near an arm position of the user at the principal point.

16. Fifteenth Embodiment

The fourteenth embodiment has been described above. Next, a fifteenth embodiment according to the present disclosure will be described. As will be described below, according to the fifteenth embodiment, when a user at any of other points having uttered is detected, an object arranged at the another point can be emphasized and displayed. For example, the object can be focused and displayed.

Figure 50A:
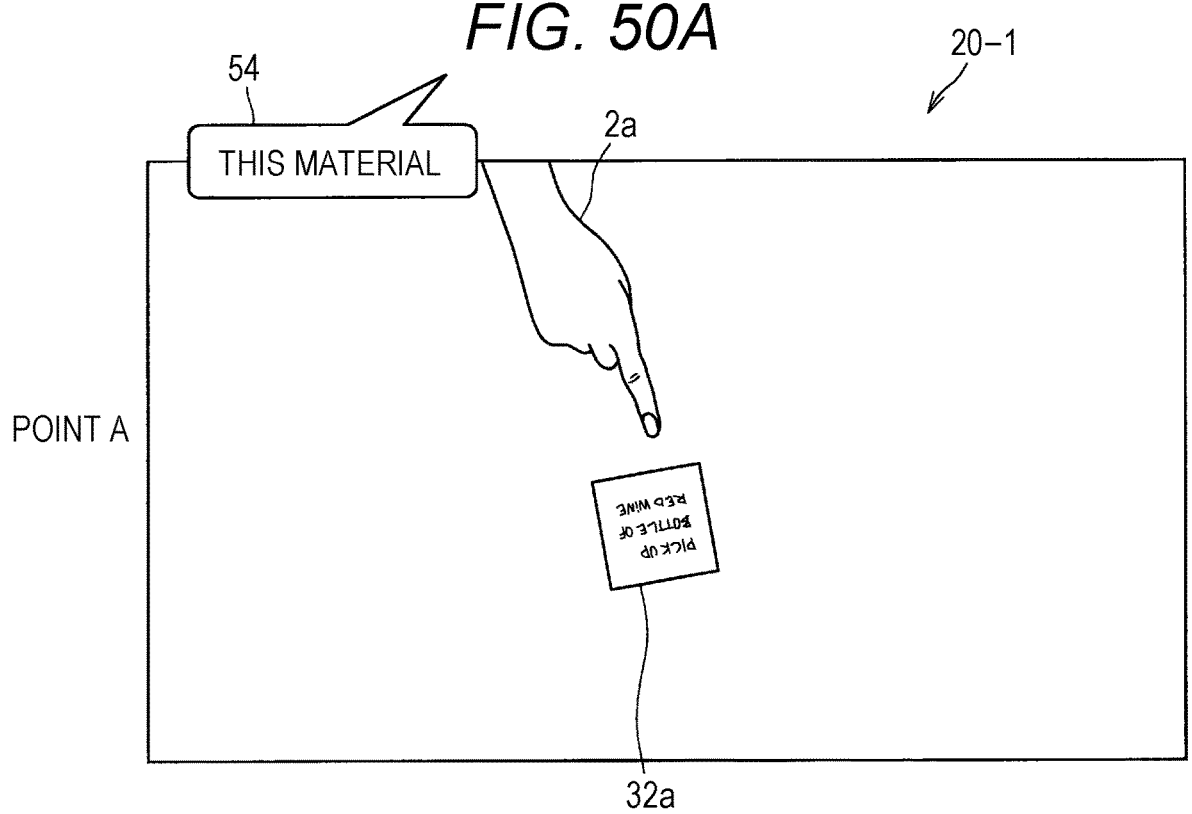
FIG. 50A is a diagram illustrating an example in which a sticky note 32 is arranged on a screen 20 at a point A.
Figure 50B:
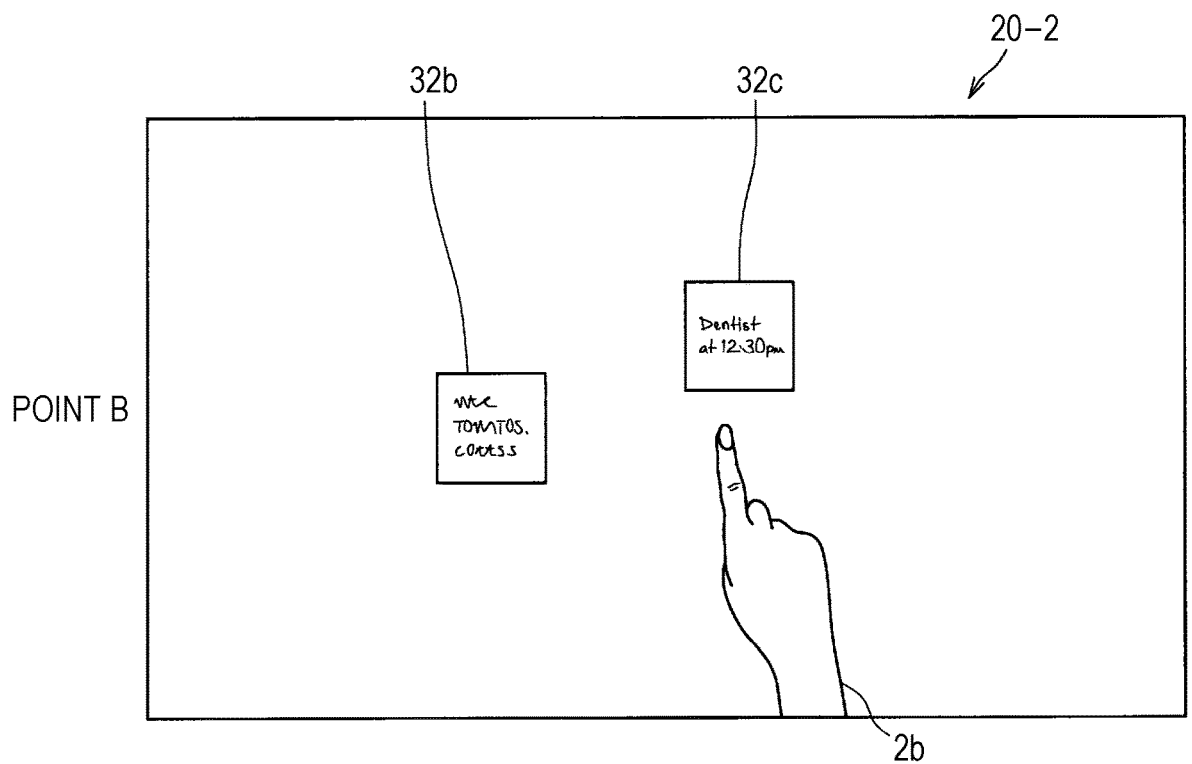
FIG. 50B is a diagram illustrating an example in which the sticky note 32 is arranged on the screen 20 at a point B.

In the fifteenth embodiment, for each point, an object previously arranged by a user at the point being stored is assumed. For example, as illustrated in FIG. 50A, when a sticky note 32a is arranged in advance on a screen 20-1 at a point A, the point A and the sticky note 32a are stored in a storage unit 128 in association with each other. Furthermore, as illustrated in FIG. 50B, when a sticky note 32b and a sticky note 32c are arranged in advance on a screen 20-2 at a point B, the point B and the sticky note 32b and the sticky note 32c are stored in the storage unit 128 in association with one another.

16-1. Configuration

16-1-1. Information Generation and Reproduction Rule DB 130

In an information generation and reproduction rule DB 130 according to the fifteenth embodiment, registered content illustrated in FIG. 49 can be further added in addition to the registered content illustrated in FIG. 11.

16-1-2. Information Generation Unit 102

An information generation unit 102 according to the fifteenth embodiment further stores a sound collection result of an utterance of a user acquired by an input unit 120 in transmission information corresponding to the user (similarly to the eleventh embodiment).

16-1-3. Output Control Unit 108

Figure 50C:
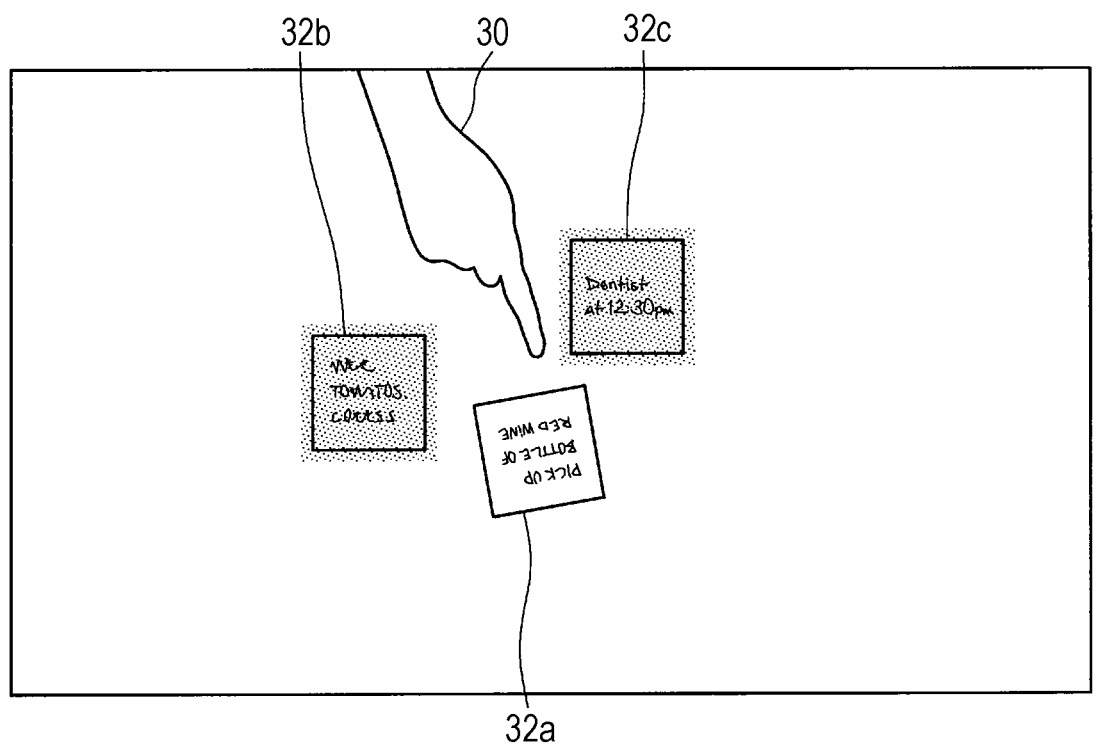
FIG. 50C is a diagram illustrating an example of focusing and displaying an image of the sticky note 32 arranged at the "point A" according to the fifteenth embodiment.

When a user corresponding to transmission information having uttered is specified on the basis of the transmission information acquired from each of a plurality of other points currently in communication, for example, an output control unit 108 according to the fifteenth embodiment emphasizes and displays an object (and/or an image of a hand of the user at the another point) arranged in advance at a point corresponding to the transmission information stored in the storage unit 128. For example, when the user at the "point A" having uttered is detected, the output control unit 108 may display an image of the sticky note 32a arranged in advance at the "point A" as it is, and display images of other objects (the sticky note 32b and the sticky note 32c in the example illustrated in FIG. 50C) in a blurred manner, as illustrated in FIG. 50C. Alternatively, the output control unit 108 may display the image of the sticky note 32a in a more emphasized manner while displaying the images of the other objects as they are (for example, blinking the images or increasing the luminance).

16-2. Effect

As described above, according to the fifteenth embodiment, when the user at any of other points having uttered is detected, the object arranged at the another point can be emphasized and displayed.

For example, even if insufficient words such as "that mentioned earlier" are uttered in the middle of a discussion, the object arranged at the point of the speaker can be emphasized and displayed. Therefore, the intention of the utterance of the user can be easily understood. For example, users at other points can easily understand what purpose the user at the point has arranged the appropriate object in the past discussion. Thus, for example, the user can discuss while compensating for the context as compared to a case where all objects are uniformly displayed.

17. Sixteenth Embodiment

The fifteenth embodiment has been described above. Next, a sixteenth embodiment of the present disclosure will be described. As will be described below, according to the sixteenth embodiment, a display mode of an image corresponding to an object can be changed according to the number of times of a user pointing at the object.

17-1. Configuration

17-1-1. Processing Unit 100

A processing unit 100 according to the sixteenth embodiment records, for each object arranged (displayed) on a screen, the number of times of at least one user pointing at the object, and stores the number of times in a storage unit 128, for example.

17-1-2. Output Control Unit 108

An output control unit 108 according to the sixteenth embodiment changes a display mode of an image corresponding to an object according to a cumulative number of times of pointing at the object, of each object. For example, the output control unit 108 changes a display mode of an image corresponding to an individual object to make an object with a larger number of pointed times stand out.

Here, the above function will be described in more detail with reference to FIGS. 51A to 51C. FIGS. 51A to 51C illustrate examples in which three sticky notes 32 (objects) are arranged on a screen 20, and the cumulative number of times of pointing for a sticky note 32b is the largest in the three sticky notes 32. For example, as illustrated in the right diagram in FIG. 51A, the output control unit 108 may make, regarding each of the individual sticky notes 32, a display size of an image corresponding to the sticky note 32 larger as the cumulative number of times of the user pointing at the sticky note 32 is larger.

Alternatively, as illustrated in the right diagram in FIG. 51B, the output control unit 108 may illuminate, regarding each of the individual sticky notes 32, the sticky note 32 according to the cumulative number of times of the user pointing at the sticky note 32. For example, the output control unit 108 may illuminate only the sticky note 32 in which the cumulative number of times of the user pointing at the sticky note 32 is a predetermined number of times.

Alternatively, as illustrated in the right diagram in FIG. 51C, the output control unit 108 may display, regarding each of the individual sticky notes 32, individual characters described on the sticky note 32 thicker or larger as the cumulative number of times of the user pointing at the sticky note 32 is larger.

17-2. Effect

As described above, according to the sixteenth embodiment, the display mode of the image corresponding to the object can be changed according to the number of times of the user pointing at the object. Thereby, the user can grasp the importance of the individual object by simply looking at the image corresponding to the individual object.

18. Seventeenth Embodiment

The sixteenth embodiment has been described above. Next, a seventeenth embodiment according to the present disclosure will be described. As will be described below, according to the seventeenth embodiment, when an image corresponding to an object arranged (displayed) on a screen at another point is displayed on a screen at a principal point, a display mode of the image can be appropriately changed according to attribute information of a user at the principal point.

Here, the attribute information of the user includes, for example, age, gender, nationality, use language, or the like, of the user. Note that, the attribute information of an individual user can be registered in advance at the time of starting use of an information processing system 10 according to each embodiment. Alternatively, a processing unit 100 may estimate the age and nationality of the individual user on the basis of a recognition result of utterance content, voice quality, and the like, of the individual user. Alternatively, the processing unit 100 may estimate the age and gender of the individual user on the basis of a recognition result of the sizes of a hand, an arm, and the like, of the individual user.

18-1. Configuration

18-1-1. Output Control Unit 108

An output control unit 108 according to the seventeenth embodiment changes, when displaying, on the screen at the principal point, an image corresponding to an object arranged (displayed) on the screen at another point, the display mode of the image according to the attribute information of the user at the principal point.

Figure 52A:
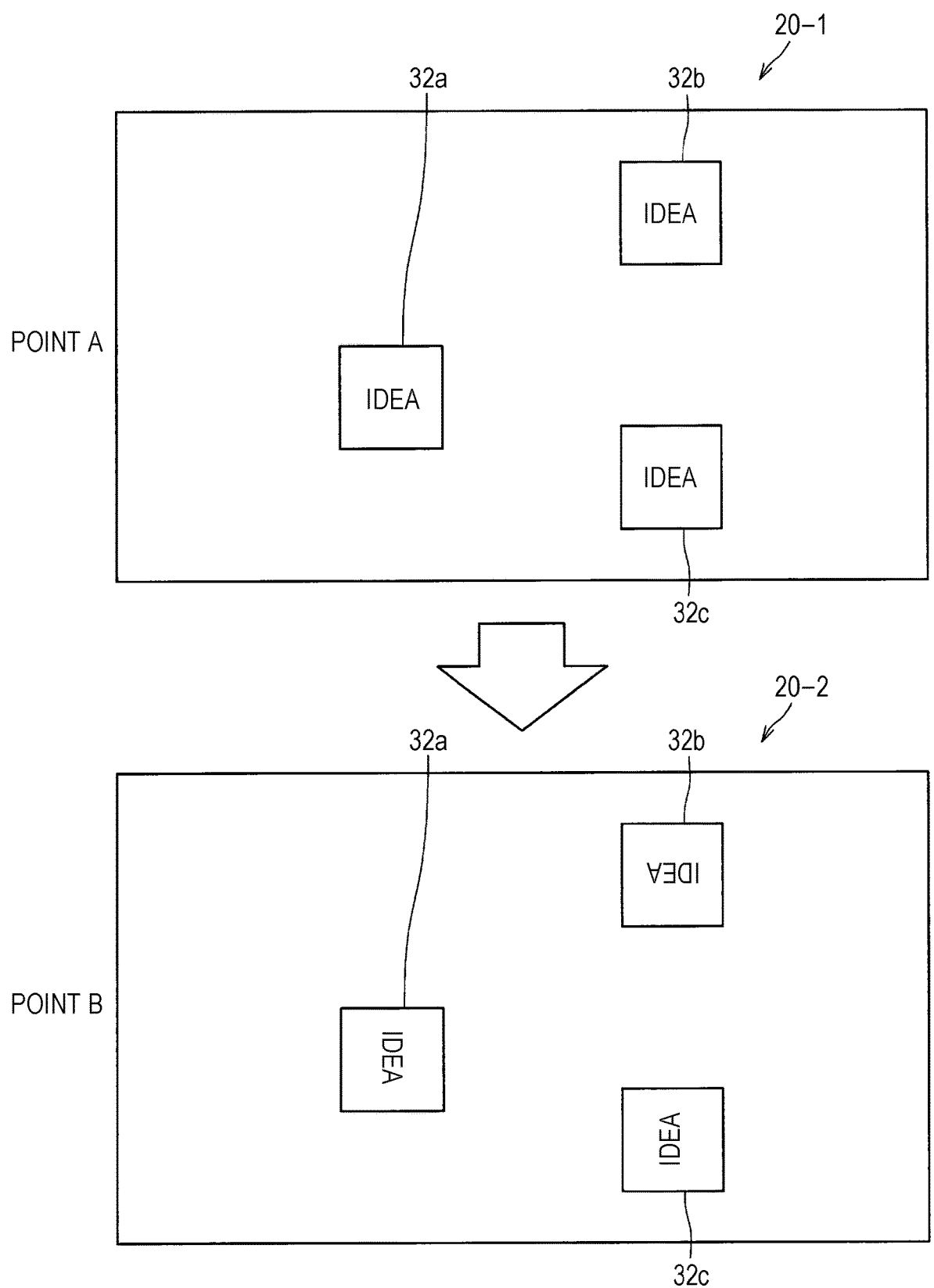
FIG. 52A is a diagram illustrating a display example of images on a screen 20 at a principal point, the images corresponding to objects on the screen 20 at another point, according to a seventeenth embodiment.

Here, the above function will be described in more detail with reference to FIGS. 52A to 52D. FIG. 52A to FIG. 52D illustrate examples in which three sticky notes 32 (objects) are displayed on the screen 20 at another point ("point A"), and images corresponding to the three sticky notes 32 are displayed on the screen 20 at the principal point ("point B", "point C", "point D", or "point E"). For example, as illustrated in FIG. 52A, regarding each of the individual sticky notes 32 displayed on the screen 20 at the "point A", an output control unit 108 may rotate a display direction of an image corresponding to the sticky note 32 according to positions of one or more users located at the principal point ("point B").

Figure 52B:
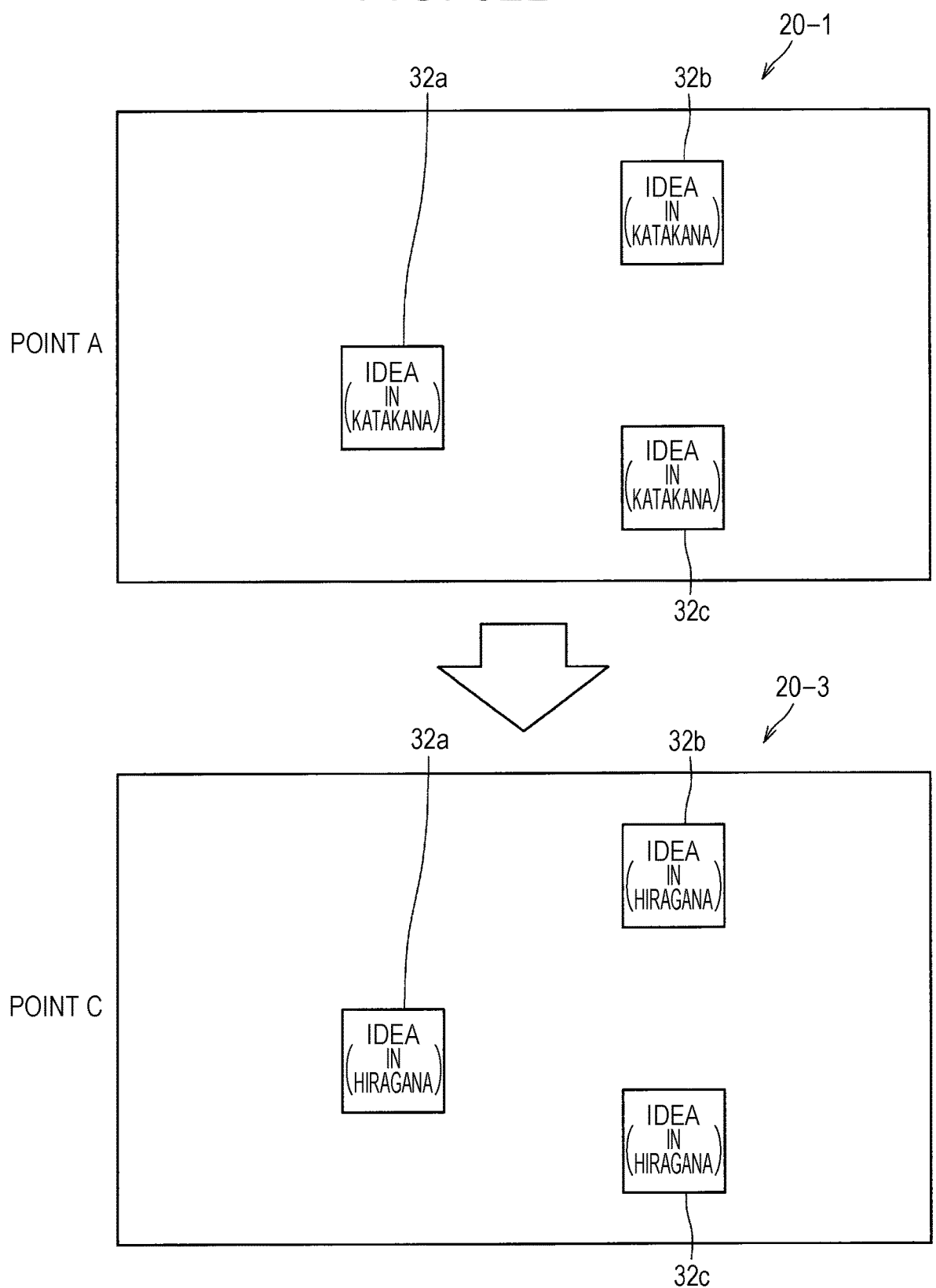
FIG. 52B is a diagram illustrating a display example of images on a screen 20 at a principal point, the images corresponding to objects on the screen 20 at another point, according to the seventeenth embodiment.

Alternatively, the output control unit 108 may convert a character string described on the object according to a knowledge level or a recognition level of the user at the principal point, and then display an image after conversion on the screen at the principal point. For example, in a case where the user at the principal point ("point C") is a child, the output control unit 108 may convert the character string described on the sticky note 32 into a character string for children of the same language, and display an image including the character string after conversion on the screen at the principal point, regarding each of the individual sticky notes 32 displayed on the screen 20 at the "point A", as illustrated in FIG. 52B. FIG. 52B illustrates an example in which a character string in "katakana" is converted into a character string in "hiragana".

Figure 52C:
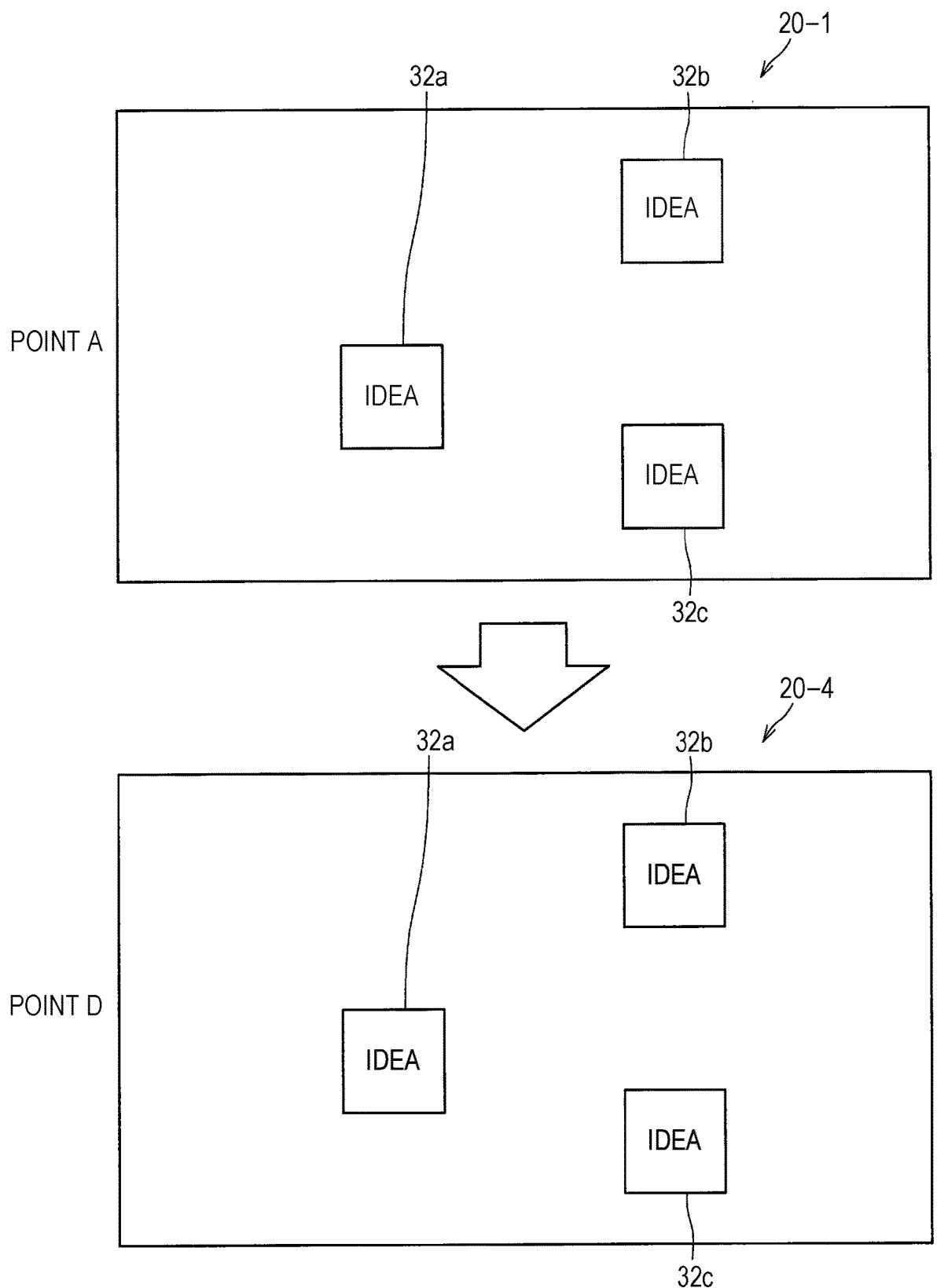
FIG. 52C is a diagram illustrating a display example of images on a screen 20 at a principal point, the images corresponding to objects on the screen 20 at another point, according to the seventeenth embodiment.

Alternatively, in a case where the user at the principal point ("point C") is an elderly person, the output control unit 108 may display an image with thick or enlarged individual characters in the sticky note 32 on the screen at the principal point, regarding each of the individual sticky notes 32 displayed on the screen 20 at the "point A", as illustrated in FIG. 52C.

Figure 52D:
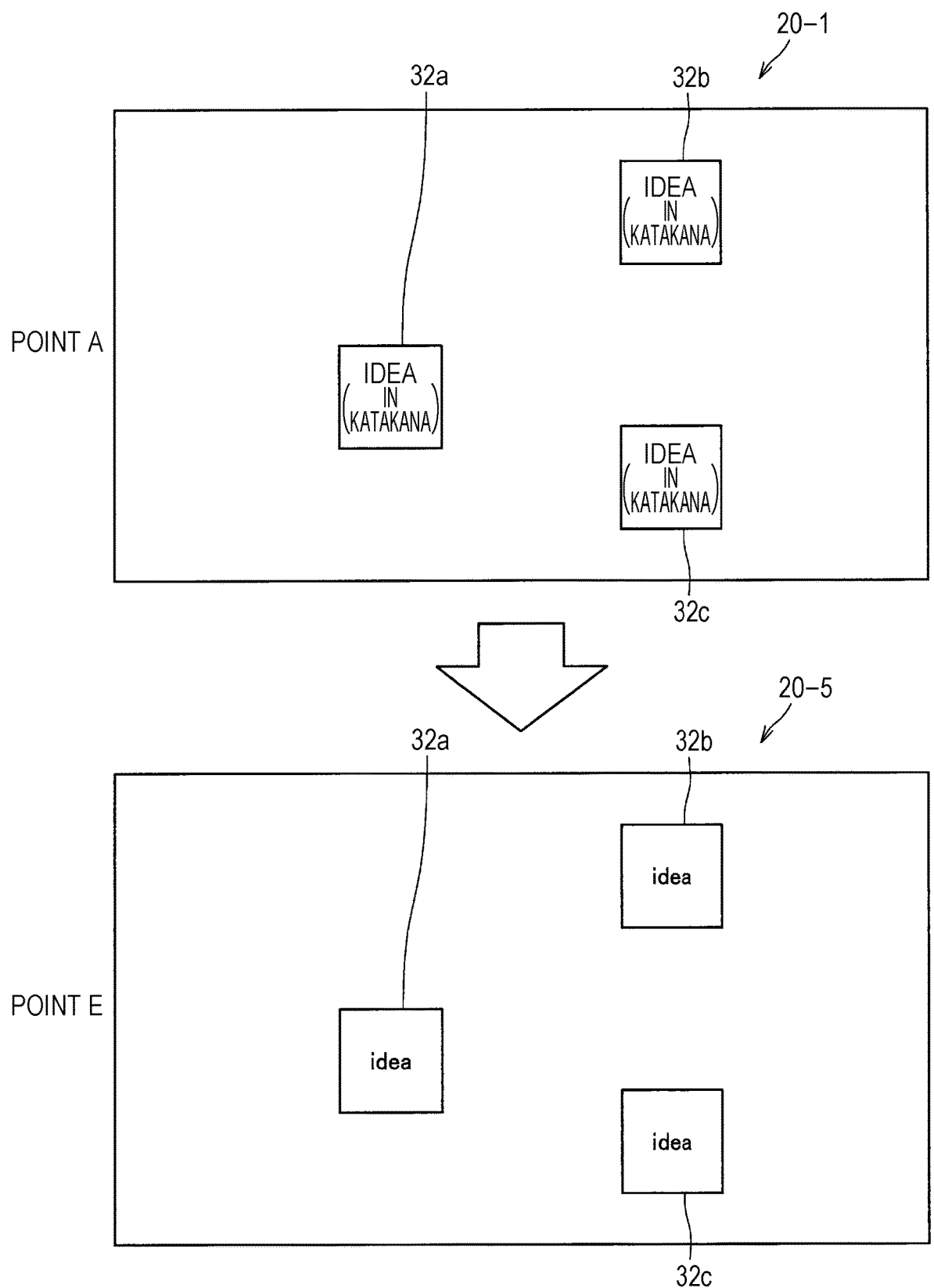
FIG. 52D is a diagram illustrating a display example of images on a screen 20 at a principal point, the images corresponding to objects on the screen 20 at another point, according to the seventeenth embodiment.

Alternatively, as illustrated in FIG. 52D, the output control unit 108 may translate the character string described on the sticky note 32 into the use language ("English" in the example illustrated in FIG. 52D) of the user at the principal point ("point D") and display an image including the character string in the translated language on the screen at the principal point, regarding the sticky note 32 displayed on the screen 20 at the "point A".

18-2. Effect

As described above, according to the seventeenth embodiment, when the image corresponding to the object arranged (displayed) on the screen at another point is displayed on the screen at the principal point, the display mode of the image can be appropriately changed according to the attribute information of the user at the principal point. Thereby, for example, at the time of a meeting between different points, the above processing is performed in real time, whereby each user can discuss without stress, even in a case where the knowledge level or the recognition level of the user at each point is different or the use language is different.

19. Eighteenth Embodiment

The seventeenth embodiment has been described above. Next, an eighteenth embodiment of the present disclosure will be described. As will be described below, according to the eighteenth embodiment, recorded data of a discussion between different points can be divided or combined in a time direction or a space direction.

In the eighteenth embodiment, when a discussion is performed between different points, a processing unit 100 periodically records information of movement of fingers of the users in discussion, and information of individual objects arranged (displayed) on a screen 20 to a storage unit 128.

19-1. Combining in Time Direction

Figure 53A:
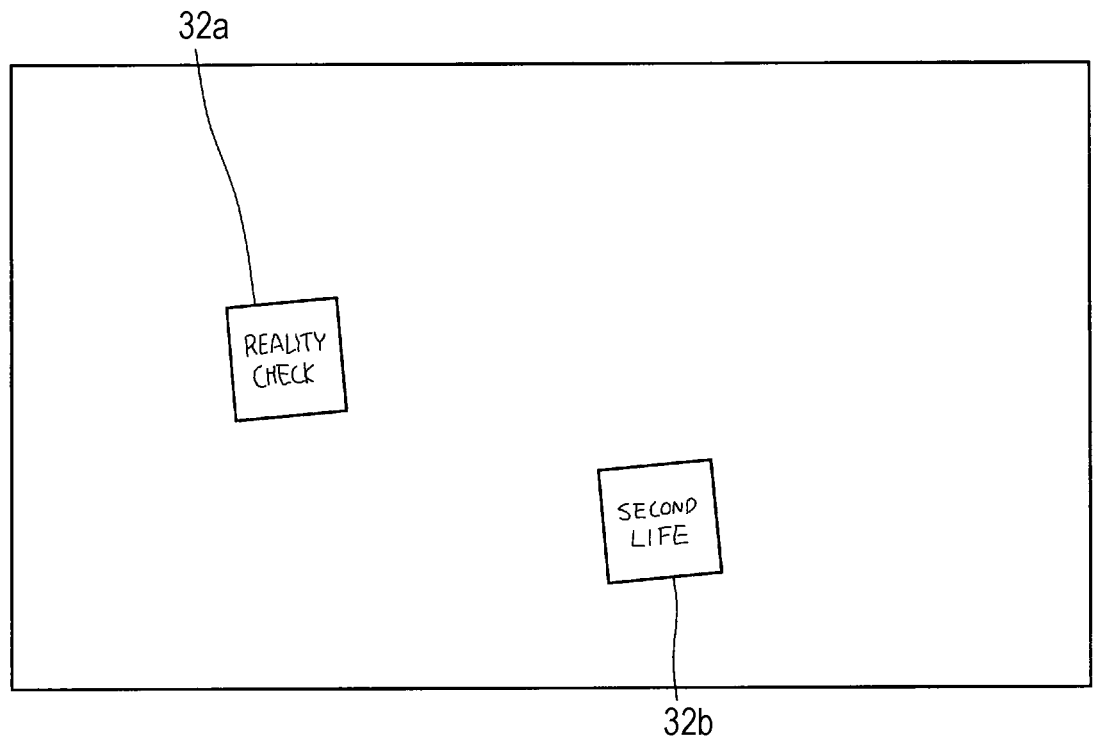
FIG. 53A is a diagram illustrating an example of dividing and combining recorded data of a discussion between different points in a time direction according to an eighteenth embodiment.
Figure 53B:
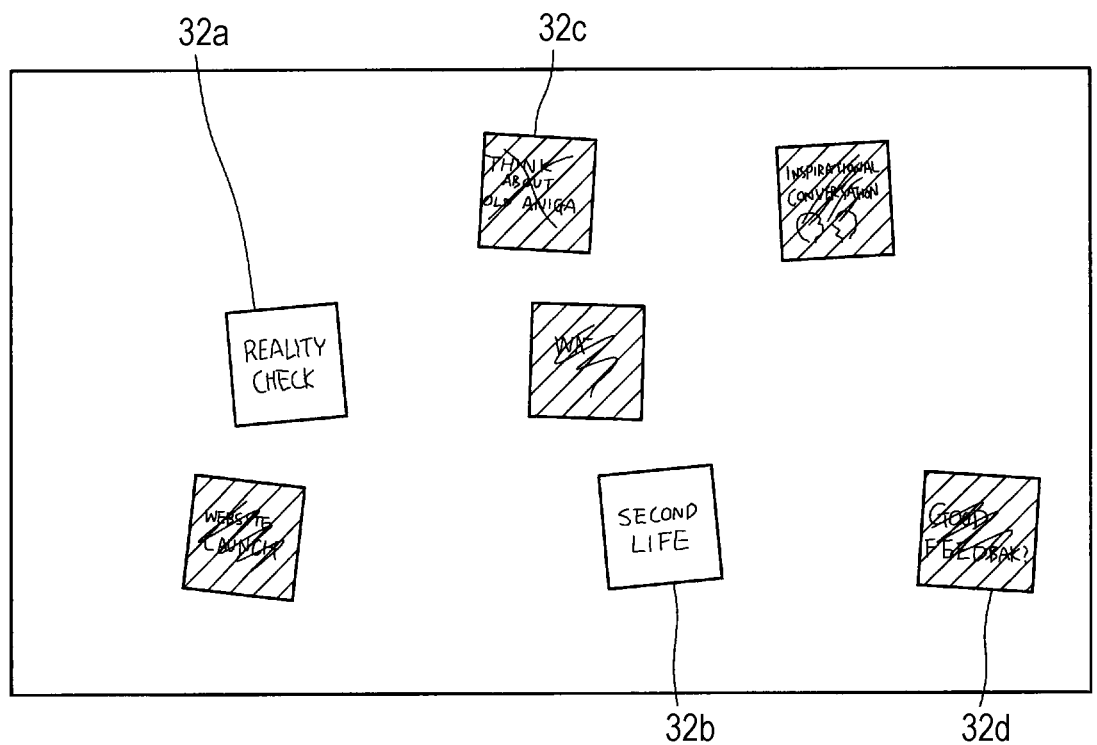
FIG. 53B is a diagram illustrating an example of dividing and combining recorded data of a discussion between different points in a time direction according to the eighteenth embodiment.

Here, an example of dividing and combining recorded data of a discussion between different points in a time direction according to the eighteenth embodiment will be described with reference to FIGS. 53A to 53D. FIGS. 53A and 53B are diagrams illustrating examples of a positional relationship among individual objects 32 arranged on screens 20 at the plurality of points, which are acquired during discussion performed among the plurality of points. For example, FIG. 53A illustrates the positional relationship of the objects 32 at the start of the discussion. Furthermore, FIG. 53B illustrates the positional relationship of the objects 32 at the end of the discussion.

Figure 53C:
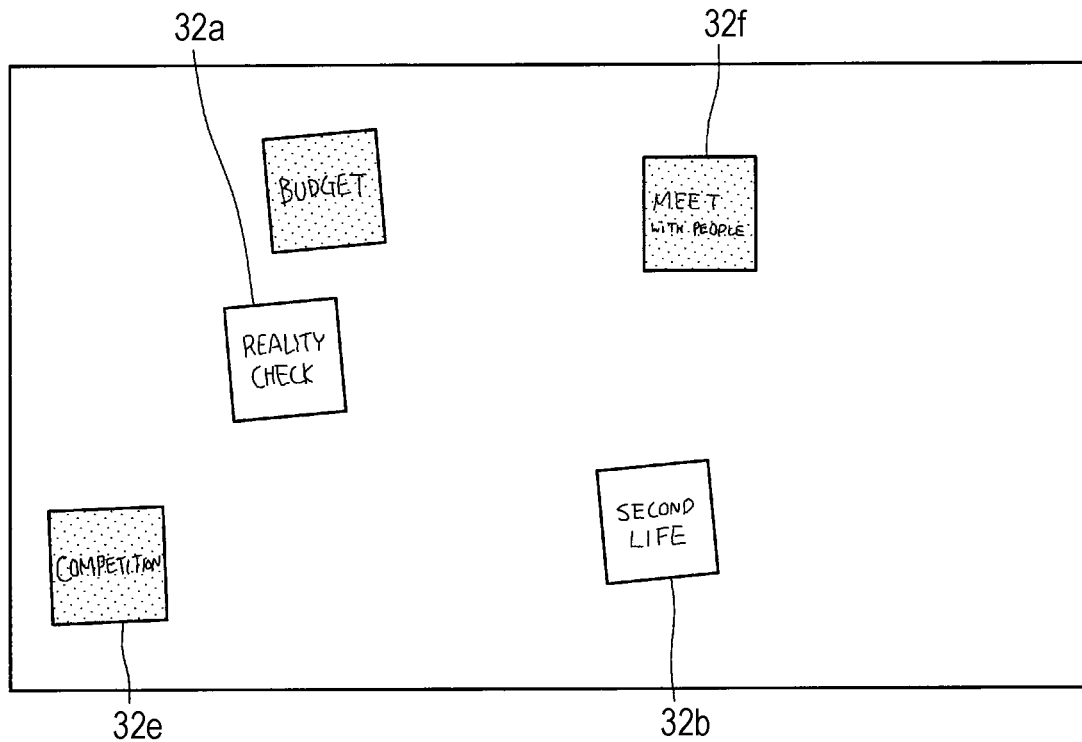
FIG. 53C is a diagram illustrating an example of dividing and combining recorded data of a discussion between different points in a time direction according to the eighteenth embodiment.
Figure 53D:
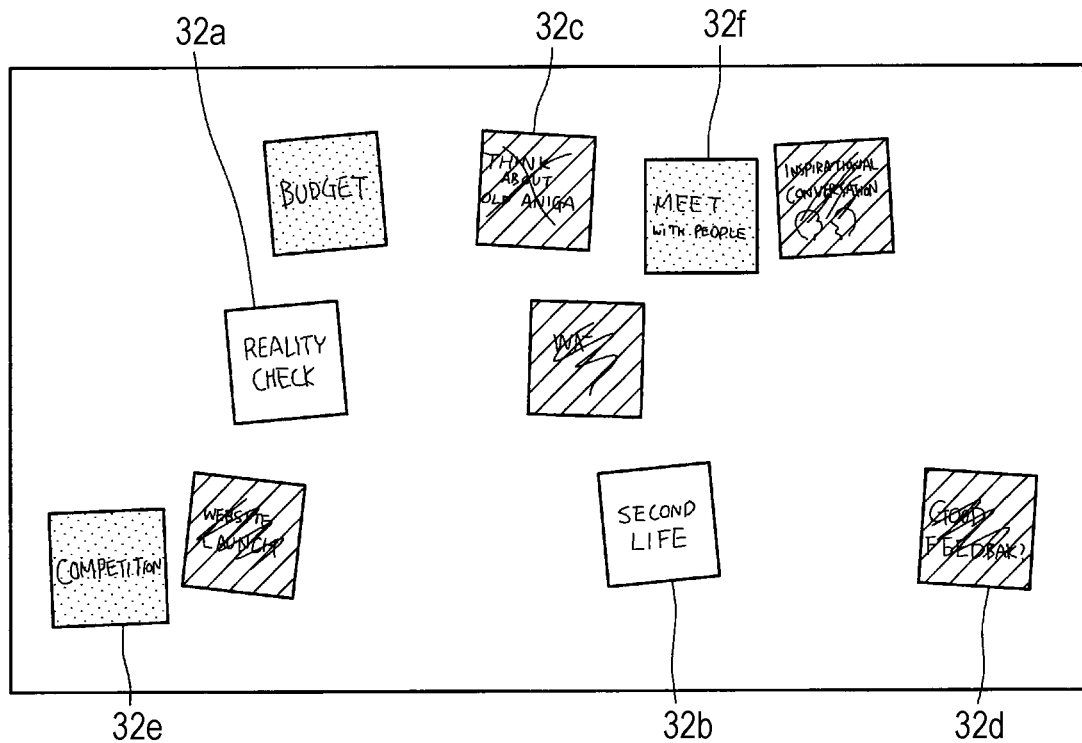
FIG. 53D is a diagram illustrating an example of dividing and combining recorded data of a discussion between different points in a time direction according to the eighteenth embodiment.

Thereafter, the user can re-do the discussion by going back in time (for example, playing back a recorded video, or the like). Then, as a result of the re-discussion, the state of the screen 20 at the timing in FIG. 53B changes to the state as illustrated in FIG. 53C (in place of FIG. 53B). In this case, the user can extract only desired parts from the recording data of the first discussion and the recording data of the second discussion, and combine the extracted data, as illustrated in FIG. 53D.

Alternatively, a user who has not participated in the discussion can also refer to the content of the discussion later, and can relive the discussion with highly realistic feeling. At that time, the playback speed can also be adjusted. Furthermore, according to the eighteenth embodiment, it is only necessary to store the information of the movement of the finger of each user and the information of the individual objects arranged (or displayed) on the screen 20, and there is no need to store the content of the discussion as a video, for example. Therefore, the amount of data to be recorded can be suppressed.

19-2. Combining in Space Direction

Figure 54A:
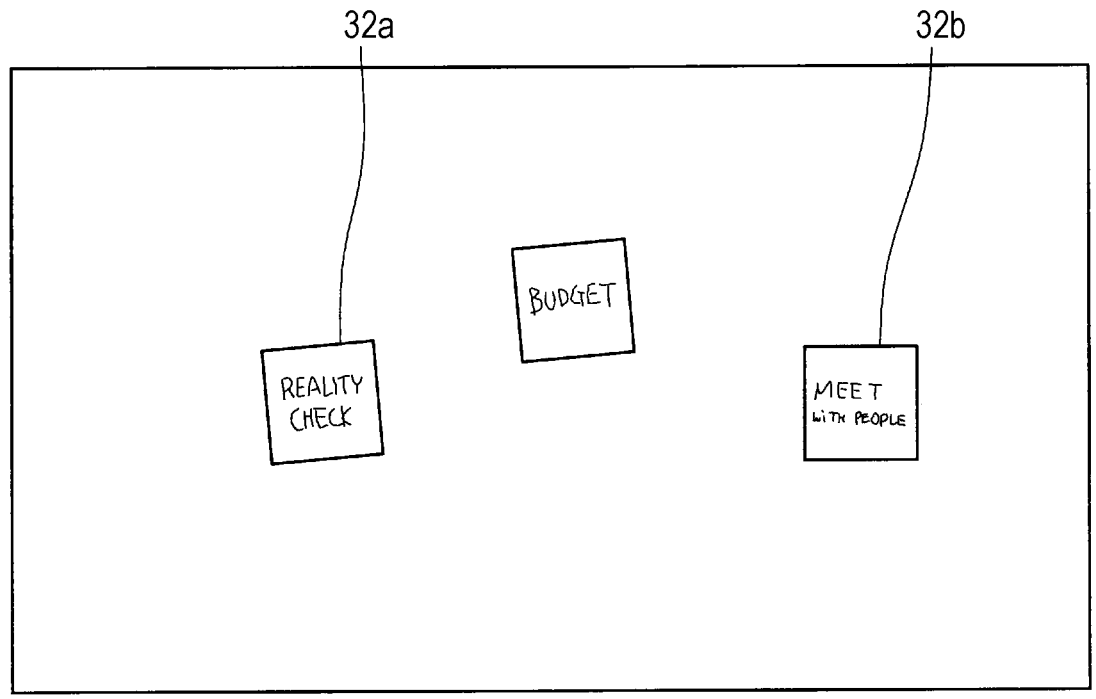
FIG. 54A is a diagram illustrating an example of dividing and combining recorded data of a discussion between different points in a space direction according to the eighteenth embodiment.
Figure 54B:
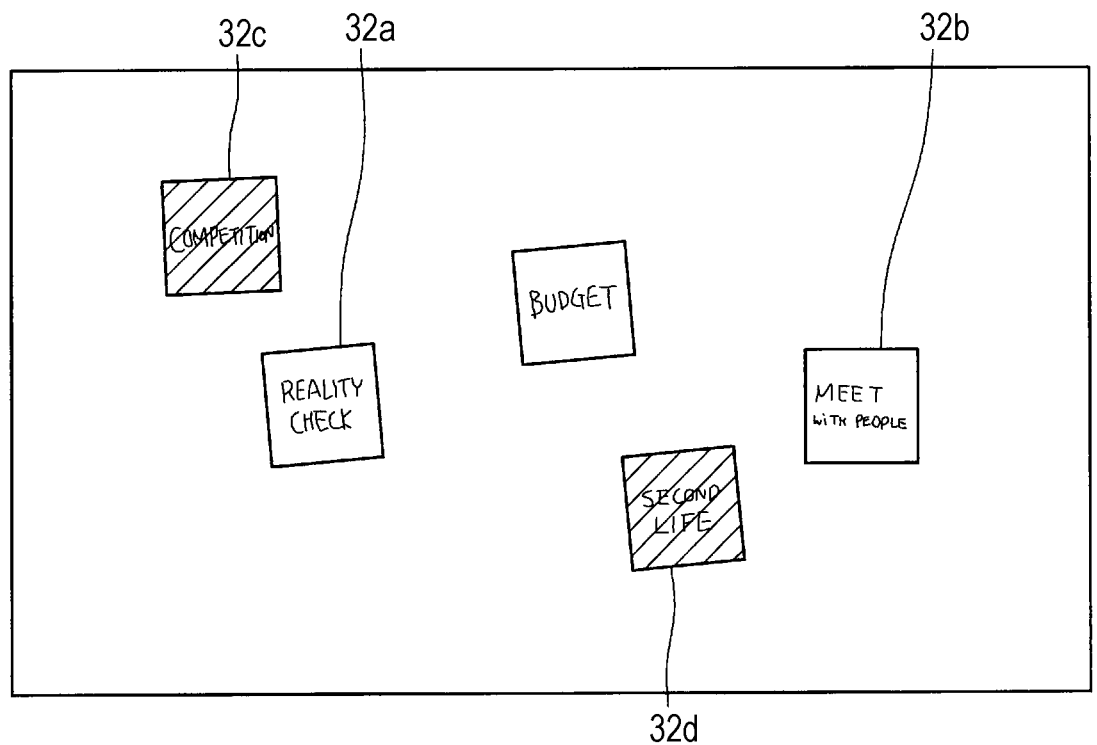
FIG. 54B is a diagram illustrating an example of dividing and combining recorded data of a discussion between different points in a space direction according to the eighteenth embodiment.

Next, an example of dividing and combining recorded data of a discussion between different points in a space direction according to the eighteenth embodiment will be described with reference to FIGS. 54A to 54D. For example, first, a discussion is performed among a plurality of points together. FIG. 54B is a diagram illustrating an example of a positional relationship among individual objects 32 arranged on screens 20 at the plurality of points, which are acquired during discussion performed among the plurality of points.

Figure 54C:
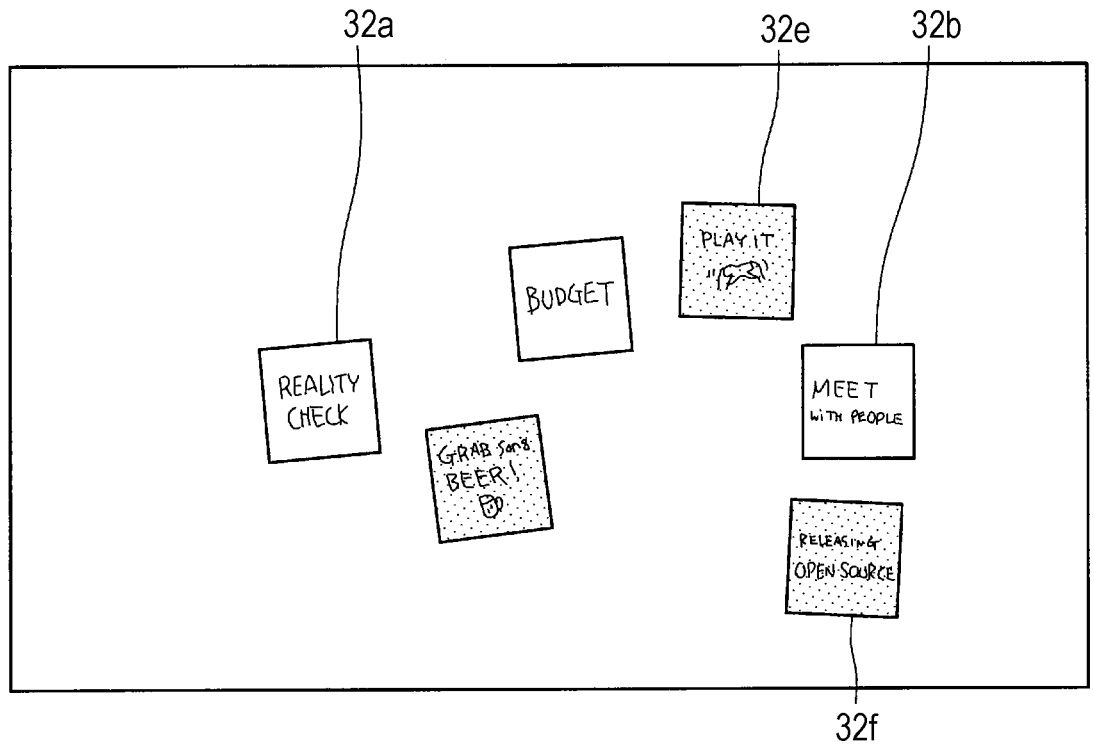
FIG. 54C is a diagram illustrating an example of dividing and combining recorded data of a discussion between different points in a space direction according to the eighteenth embodiment.

Thereafter, the users can be divided for each point or into predetermined groups and have a discussion using the recorded data acquired during the discussion. For example, the users are divided into a "group A" and a "group B", and have a discussion in each group. As a result, in the "group A", the state of the screen 20 at the timing in FIG. 54A changes to the state as illustrated in FIG. 54B (in place of FIG. 54A). Furthermore, in the "group B", the state of the screen 20 at the timing in FIG. 54A changes to the state as illustrated in FIG. 54C (in place of FIG. 54A).

Figure 54D:
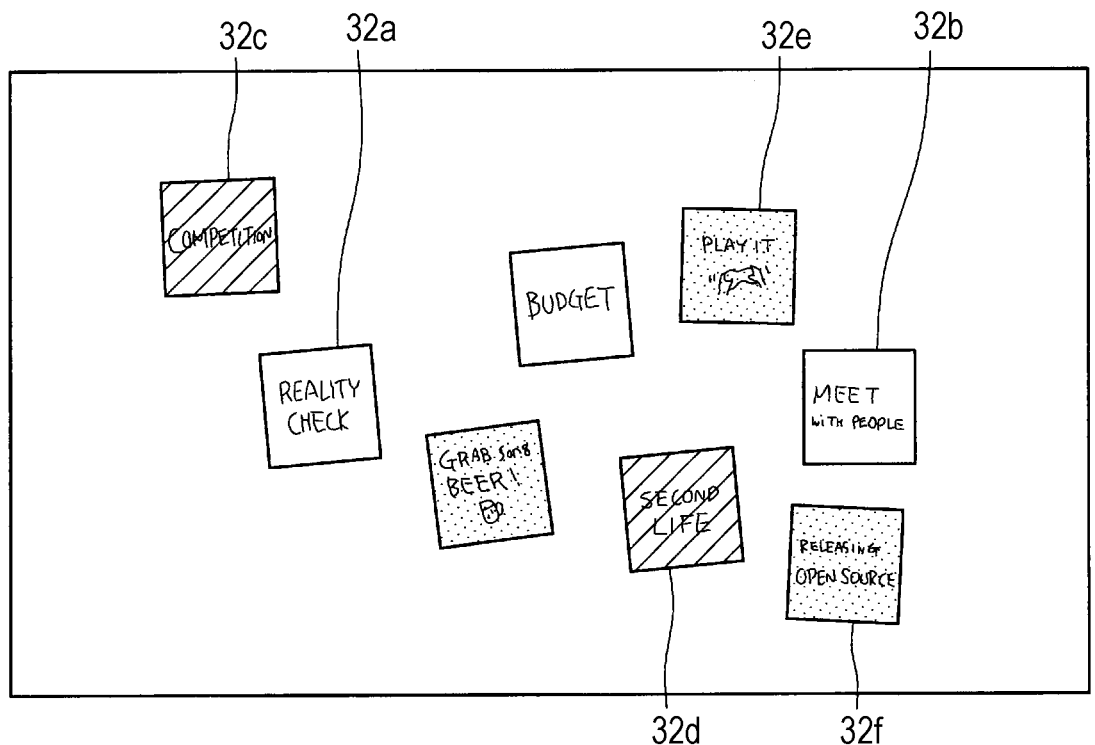
FIG. 54D is a diagram illustrating an example of dividing and combining recorded data of a discussion between different points in a space direction according to the eighteenth embodiment.

In this case, the user can obtain composite data as illustrated in FIG. 54D, for example, by bringing the recorded data of the "group A" discussion and the recorded data of the "group B" discussion. Moreover, the results of the discussions in the groups can be compared.

19-2-1. Modifications

Moreover, regarding the composited recording data, the output control unit 108 may change the display mode of the image corresponding to each object according to the group that has operated each object, the importance for each object, or the like. For example, the output control unit 108 may display the image of an object determined to be important in many groups more emphatically than the images of other objects.

19-3. Effect

As described above, according to the eighteenth embodiment, the recorded data of a discussion among different points can be divided or combined in the time direction or the space direction.

20. Nineteenth Embodiment

The eighteenth embodiment has been described above. Next, a nineteenth embodiment of the present disclosure will be described. As will be described below, according to the nineteenth embodiment, in a scene where communication is performed between different points, a user can control information at a principal point to be shared with another point only at desired timing or not to be shared with another point only at desired timing.

20-1. Configuration

20-1-1. Transmission Control Unit 104

20-1-1-1. Instruction of Shared Object

A transmission control unit 104 according to the nineteenth embodiment causes a communication unit 126 to transmit only information of an object specified by the user, of one or more objects arranged (displayed) on a screen 20 at a principal point, to an information processing system 10 at another point.

Here, the above function will be described in more detail with reference to FIGS. 55A and 55B. FIG. 55A is a diagram illustrating an example of an appearance of the screen 20-1 at the principal point ("point A"). Furthermore, FIG. 55B is a diagram illustrating an example of an appearance of a screen 20-2 at another point ("point B") at timing illustrated in FIG. 55A.

As illustrated in the right diagram in FIG. 55A, in a situation where a sticky note 32a is not shared with the "point B", assuming that a user at the principal point instructs to share the sticky note 32a with the "point B", by uttering "this" while pointing at the sticky note 32a, for example. In this case, the transmission control unit 104 first adds the sticky note 32a to a group of "objects shared with the point B". Then, the transmission control unit 104 causes the communication unit 126 to transmit information (for example, a captured image, or the like) of the individual objects included in the group to the "point B". As a result, as illustrated in the right diagram in FIG. 55B, an image corresponding to the sticky note 32a is newly displayed on a screen 20-2b at the "point B".

According to this control example, for example, information of all of objects (for example, a coffee cup 32 illustrated in FIG. 55A and the like) that the user does not instruct to share with another point is not displayed at the another point. Therefore, even if a table at the principal point is not cleared off, the user can have a meeting without uncomfortable feeling. Then, a meeting can be performed by sharing only the minimum necessary objects to be discussed with another point.

20-1-1-2. Instructions Regarding Shared Screen

Moreover, the transmission control unit 104 can cause the communication unit 126 to transmit display instruction information regarding a screen shared with another point to the another point on the basis of an instruction by the user.

The screen shared with the another point can be a screen corresponding to a captured image of the screen 20 at the principal point.

Figure 56A:
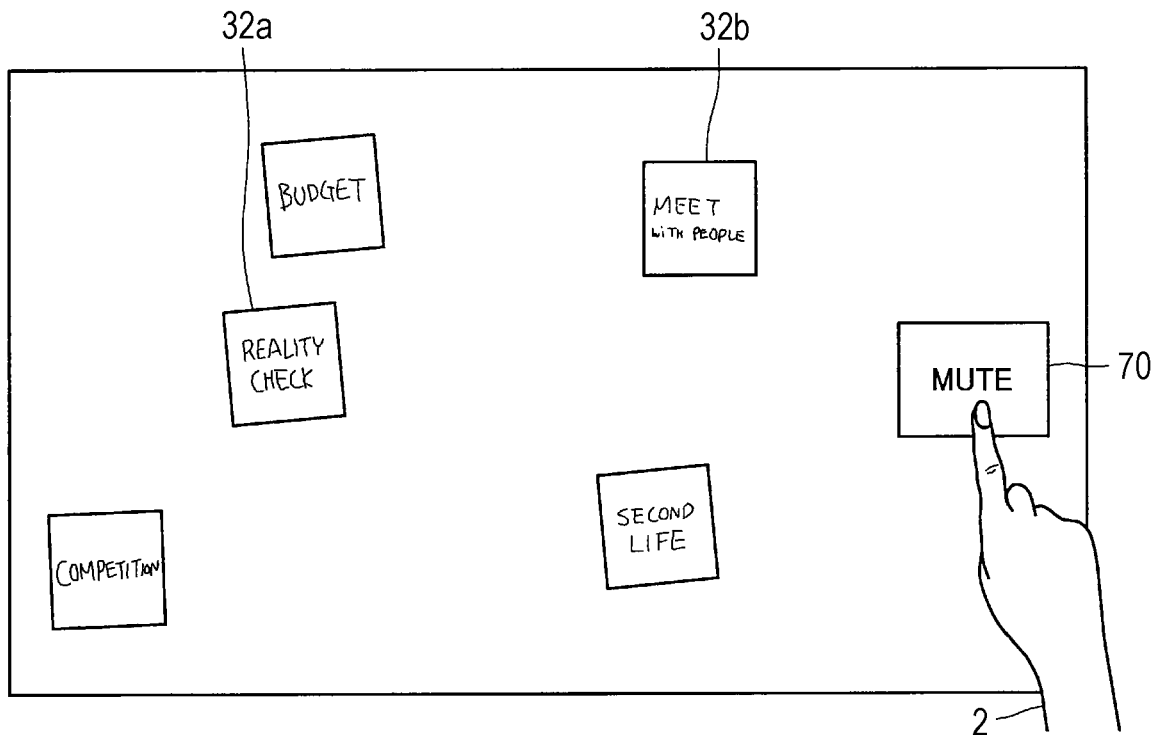
FIG. 56A is a diagram illustrating an operation example for interrupting sharing of a video of a screen 20 at principal point according to a nineteenth embodiment.
Figure 56B:
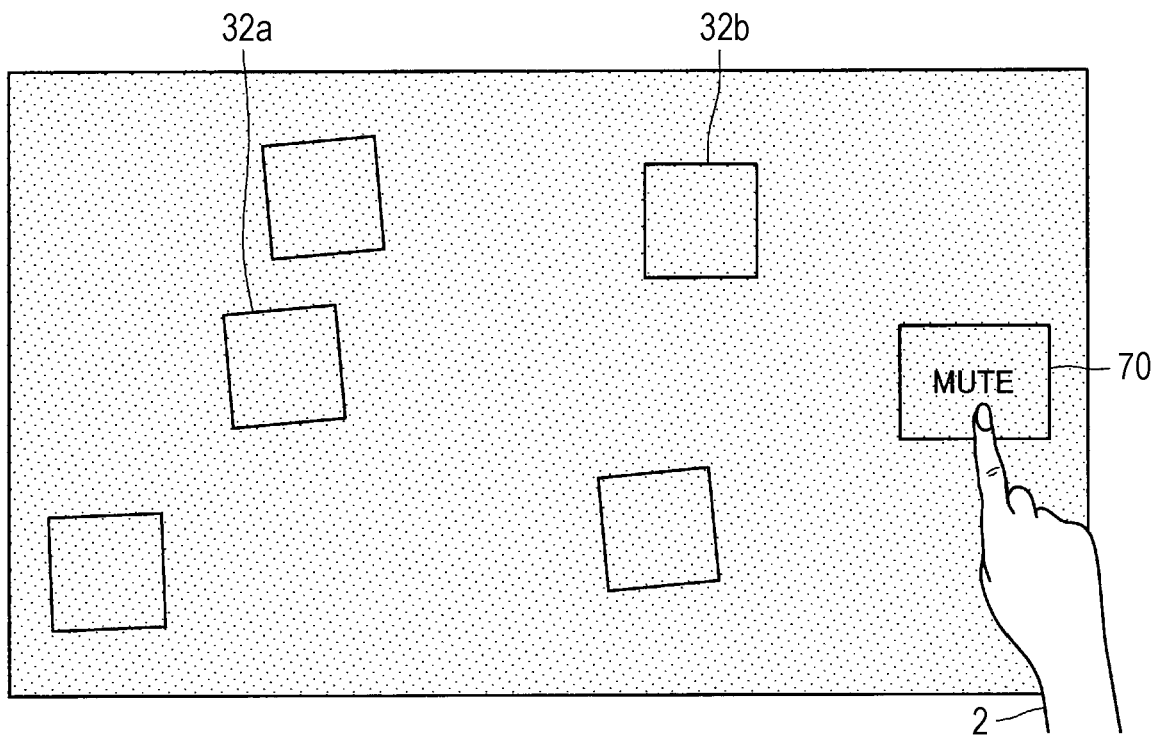
FIG. 56B is a diagram illustrating a display example of a video of an appropriate screen 20 at another point by the operation illustrated in FIG. 56A.

For example, as illustrated in FIG. 56A, while the user is pressing a GUI button 70 for interrupting the sharing of the screen, which is displayed on the screen 20 at the principal point, the transmission control unit 104 causes the communication unit 126 to transmit the display instruction information for displaying the screen to be shared with the another point in a blurred manner to the another point. As a result, as illustrated in FIG. 56B, the screen is displayed in a blurred manner at the another point.

According to the control example, the user can explicitly instruct the timing to share the video of the screen 20 at the principal point with another point. For example, in the middle of a meeting, the user can perform an instruction not to share only a material that the user does not want the user at another point to see or only discussion that the user does not want the user at another point to hear.

20-2. Effect

As described above, according to the nineteenth embodiment, in the scene where communication is performed between different points, a user can control information at the principal point to be shared with another point only at desired timing or not to be shared with another point only at desired timing.

21. Twentieth Embodiment

The nineteenth embodiment has been described above. By the way, when a user located in a certain place operates an operation body (for example, a hand of the user, or the like), if a captured video of the user at the time of operation can be displayed in another place together with an image corresponding to the operation body, the realistic feeling can be further improved.

Next, a twentieth embodiment of the present disclosure will be described. As will be described below, according to the twentieth embodiment, when the user located in a certain place operates the operation body, the image corresponding to the operation body and a captured video of a space including the user can be simultaneously displayed in a different place.

21-1. System

Figure 57:
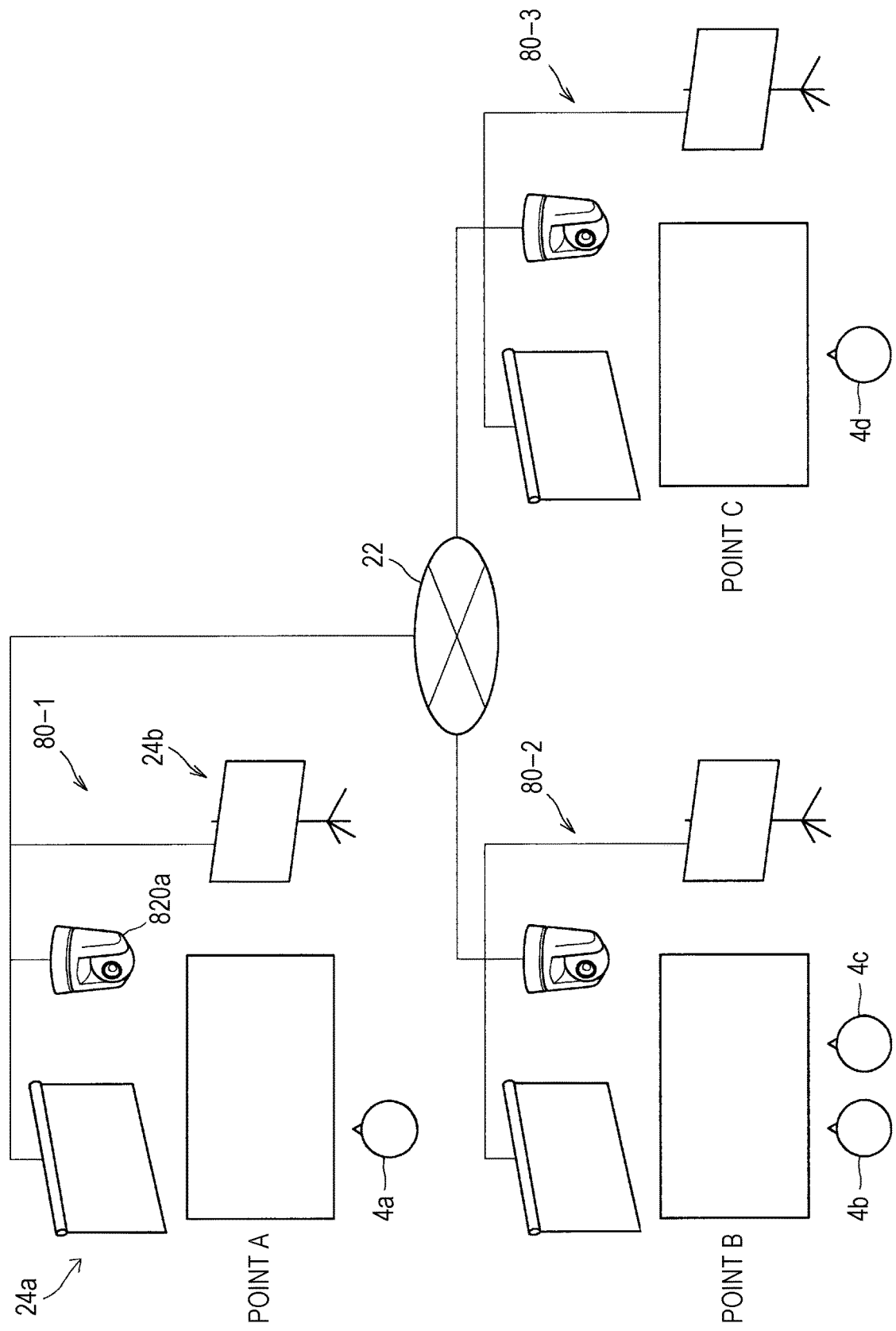
FIG. 57 is a diagram illustrating an example in which telepresence systems 80 installed at a plurality of points is connected via a communication network 22 according to a twentieth embodiment.

First, a configuration example of a system according to the twentieth embodiment will be described with reference to FIGS. 57 and 58. As illustrated in FIG. 57, in the twentieth embodiment, an information processing system 10 (not illustrated in FIG. 57) and a telepresence system 80 being installed for each point (place) is assumed. The telepresence system 80 is, for example, a video conferencing system.

Figure 58:
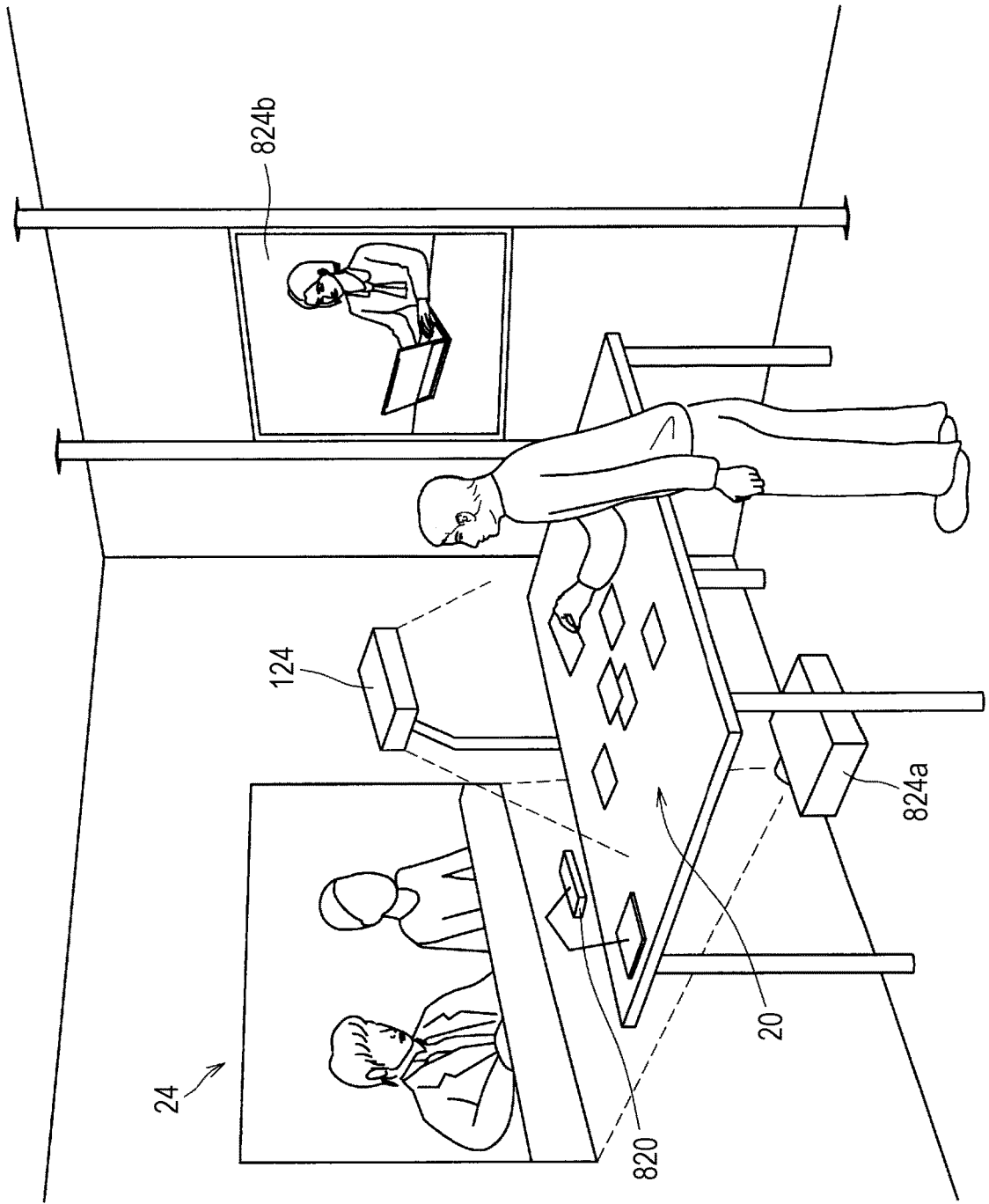
FIG. 58 is a diagram illustrating an application example of an information processing system 10 and the telepresence system 80 at a certain point.

FIG. 58 is a diagram illustrating an application example of the information processing system 10 and the telepresence system 80 at a certain point ("point A"). In the example illustrated in FIG. 58, communication is being performed among three points ("point A", "point B", and "point C"), and the user at the point A is located in front of an output unit 124 (of the information processing system 10). Then, the output unit 124 displays images generated on the basis of transmission information acquired from other points (the point B and the point C) on the screen 20 at the point A (a top plate of a table 90 or the like, for example) according to control of an output control unit 108 (similarly to the first to nineteenth embodiments).

Then, a video that captures the inside of the point B in real time, which is received from the point B, is displayed (projected, for example) by an output unit 824a to be described below on a screen 24 (a wall surface or the like) behind the output unit 124, for example. The video can be a video capturing one or more users at the point B (for example, a front of the users) and a space around the one or more users. Note that the screen 24 is an example of a second display surface according to the present disclosure.

Moreover, as illustrated in FIG. 58, a video capturing an inside of the point C in real time, which is received from the point C, is displayed on an output unit 824b arranged in a side direction of the user at the point A, for example. The video can be a video capturing one or more users at the point C (for example, a front of the users) and a space around the one or more users.

According to the above display example, the user at the point A can simultaneously view images corresponding to the users at the point B and the point C displayed on the screen 20, and the videos capturing the users at the point B and the point C in real time. For this reason, the users at different points can communicate with higher realistic feeling.

21-2. Configuration

Figure 59:
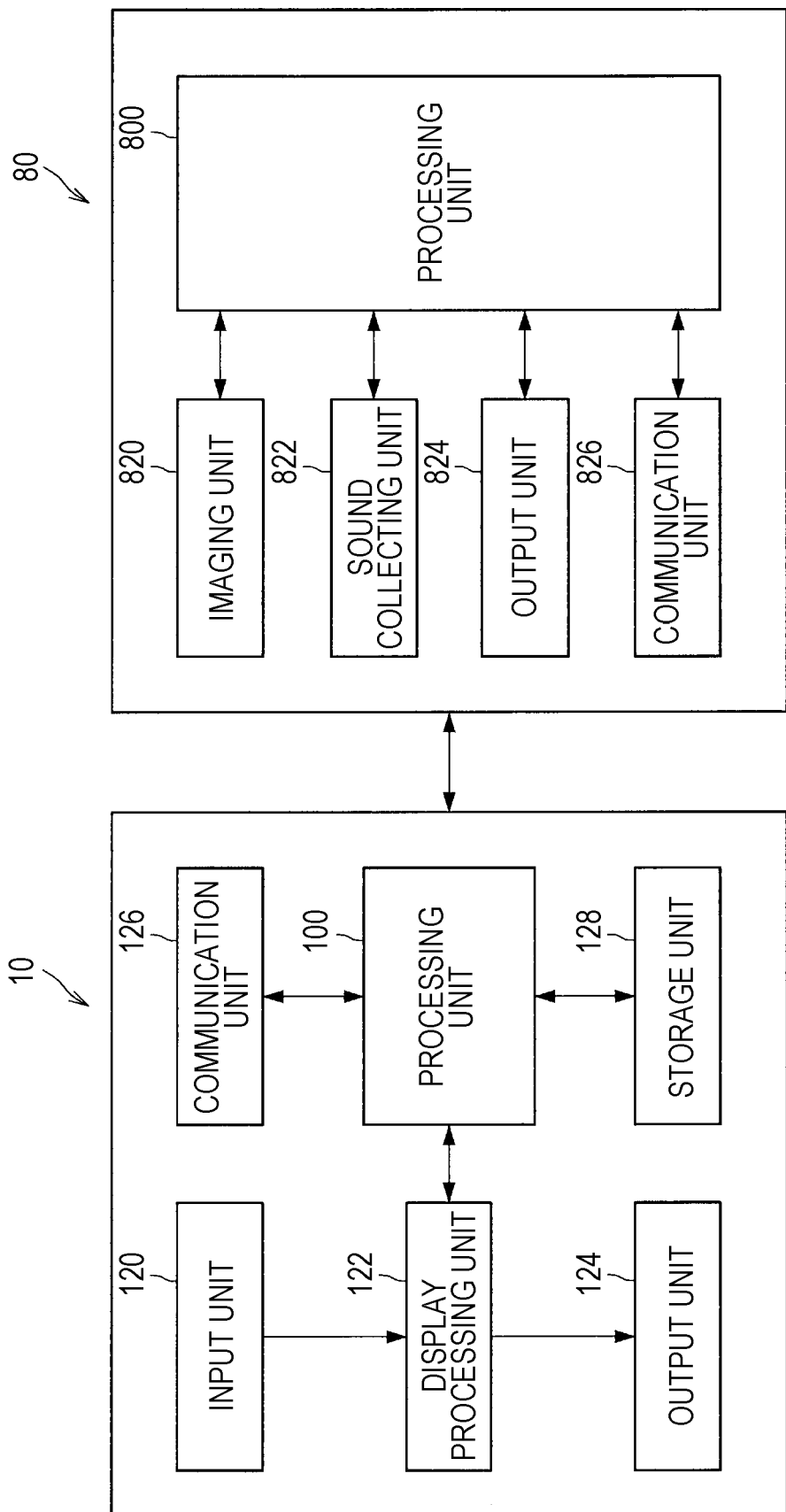
FIG. 59 is a block diagram illustrating an example of a functional configuration of the information processing system 10 and the telepresence system 80 according to the twentieth embodiment.

The configuration example of the system according to the twentieth embodiment has been described above. Next, a functional configuration according to the twentieth embodiment will be described in detail. FIG. 59 is a block diagram illustrating an example of functional configurations of the information processing system 10 and the telepresence system 80 according to the twentieth embodiment. Note that the information processing system 10 and the telepresence system 80 having the functional configurations illustrated in FIG. 59 can be installed at each point.

21-2-1. Information Processing System 10

The functional configuration of the information processing system 10 according to the twentieth embodiment can be similar to one or more of the first to nineteenth embodiments described above. For example, the information processing system 10 according to the twentieth embodiment may be able to execute all the functions and processing described with reference to FIGS. 1 to 56B in a similar manner.

For example, similarly to the seventh embodiment described with reference to FIG. 33 and the like, the output control unit 108 may change display positions of images corresponding to hands of individual users located at a plurality of other points currently in communication according to the points where the individual users are located. In the example illustrated in FIG. 58, the output control unit 108 may determine (change) the display position of the image of the hand corresponding to the user on the screen 20 according to the position of the screen 24 corresponding to each point and the display position of the individual user in the captured video at the point displayed on the screen 24, by the telepresence system 80. For example, the output control unit 108 may determine the display position of the image of the hand on the screen 20 such that the display position of the individual user at the point displayed on the screen 24 corresponding to the each position and the display position of the image of the hand corresponding to the user projected on the screen 20 correspond with each other (for example, the positional relationship is matched).

For example, the information processing system 10 may display the image corresponding to the hand of the user in the point B displayed on the screen 24, on the screen 20 with reference to the side of the screen 24 in FIG. 58. Furthermore, the information processing system 10 may display the image corresponding to the hand of the user in the point C displayed on the output unit 824b, on the screen 20 with reference to the side of the output unit 824b.

21-2-2. Telepresence System 80

As illustrated in FIG. 59, the telepresence system 80 according to the twentieth embodiment includes a processing unit 800, an imaging unit 820, a sound collection unit 822, an output unit 824, and a communication unit 826.

21-2-2-1. Processing Unit 800

The processing unit 800 (also referred to as an output control unit) can include one or more processing circuits (for example, a CPU, a GPU, and the like). The processing unit 800 centrally controls the telepresence system 80.

For example, the processing unit 800 causes the output unit 824 to output the captured video and sound of one or more other points received from the other points. As an example, as illustrated in FIG. 58, the processing unit 800 causes different output units 824 to display (for example, project) received captured videos of one or more other points.

Furthermore, the processing unit 800 causes the communication unit 826 to sequentially transmit the video captured in real time by the imaging unit 820, and the sound data collected in real time by the sound collection unit 822 to all the other points currently in communication, for example.

21-2-2-2. Imaging Unit 820

The imaging unit 820 causes an imaging element such as a charge coupled device (CCD) or a complementary metal oxide semiconductor (CMOS) to image external light through a lens to capture an image (moving image, or the like). For example, the imaging unit 820 captures an appearance of one or more users located at the principal point (that is, a point where the appropriate telepresence system 80 is installed) and a space around the one or more users.

Moreover, the imaging unit 820 may include, for example, a stereo camera capable of recording information in the depth direction by capturing an image using two lenses.

21-2-2-3. Sound Collection Unit 822

The sound collection unit 822 includes, for example, a sound input device such as a microphone. The sound collection unit 822 collects a sound (for example, an utterance of the user at the principal point, or the like) emitted at the principal point.

21-2-2-4. Output Unit 824

The output unit 824 may include, for example, a display device such as a projector, an LCD, or an OLED. Moreover, the output unit 824 may include a sound output device such as, for example, a speaker. The output unit 824 displays (for example, projects) a video or outputs sound according to the control of the processing unit 800.

21-2-2-5. Communication Unit 826

The communication unit 826 transmits and receives various types of information to and from the telepresence system 80 at another point. For example, the communication unit 826 transmits the video captured by the imaging unit 820, the sound data collected by the sound collection unit 822 and the like to the telepresence system 80 at another point according to the control of the processing unit 800. Furthermore, the communication unit 826 receives a video captured at another point and the like from the telepresence system 80 at the another point.

21-2-3. Modifications

Note that the functional configurations according to the twentieth embodiment are not limited to the above-described example. For example, the information processing system 10 and the telepresence system 80 may be integrally configured instead of being separately provided. As an example, all the functions of the processing unit 800 may be included in the processing unit 100, instead of providing the processing unit 800. Similarly, the input unit 120, the imaging unit 820, and the sound collection unit 822 may be integrally configured. Furthermore, the output unit 124 and the output unit 824 may be integrally configured. Furthermore, the communication unit 126 and the communication unit 826 may be integrally configured.

21-3. Effect

As described above, according to the twentieth embodiment, when the user located in a certain place operates the operation body, the image corresponding to the operation body and the captured video of a space including the user can be simultaneously displayed in a different place. For this reason, the users at different points can communicate with higher realistic feeling.

22. Hardware Configuration

Figure 60:
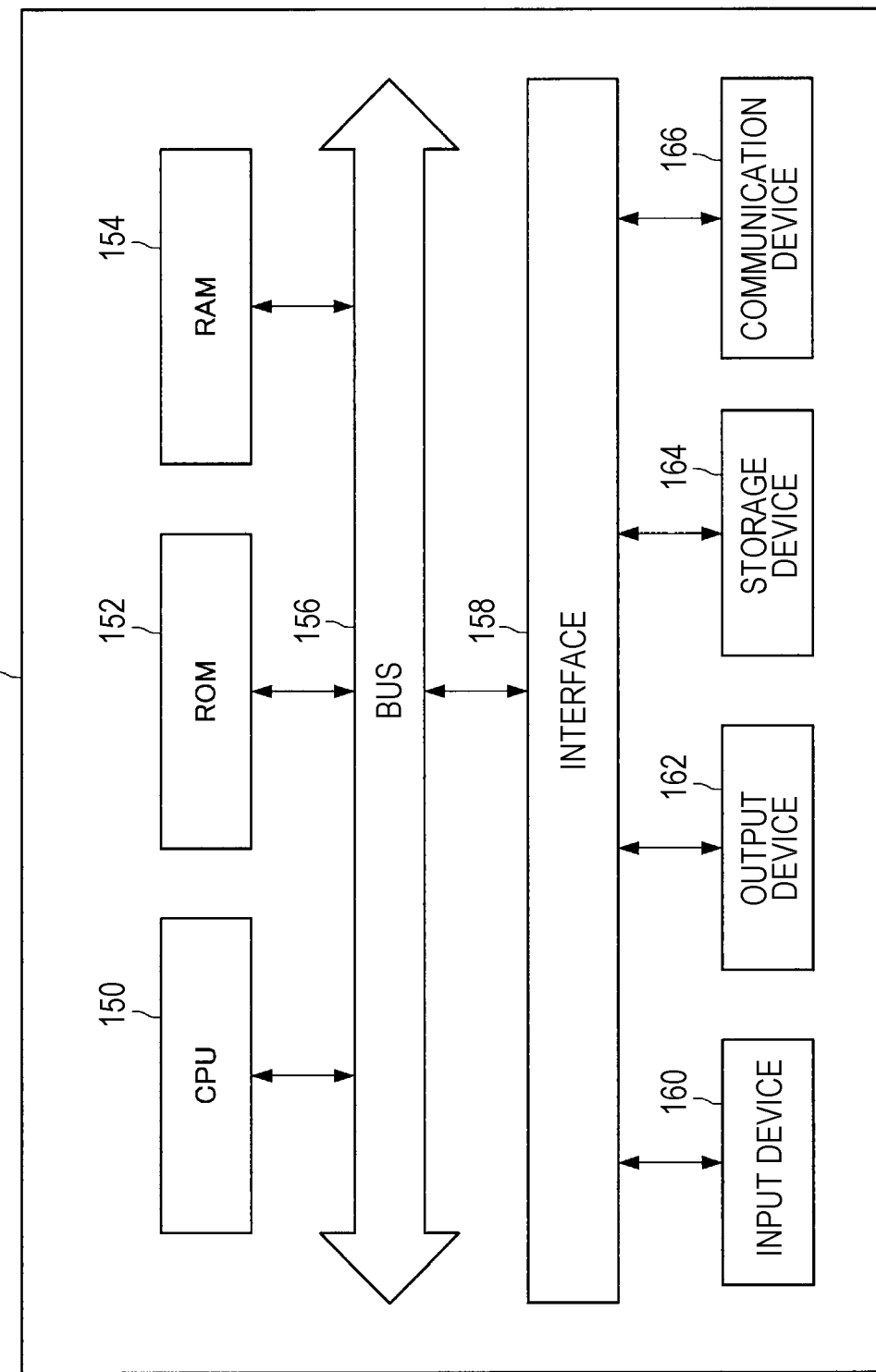
FIG. 60 is an explanatory diagram illustrating an example of a hardware configuration of the information processing system 10 common to the embodiments.

The twentieth embodiment has been described above. Next, a hardware configuration of the information processing system 10 common to the embodiments will be described with reference to FIG. 60. As illustrated in FIG. 60, the information processing system 10 includes a CPU 150, a read only memory (ROM) 152, a random access memory (RAM) 154, a bus 156, an interface 158, an input device 160, an output device 162, a storage device 164, and a communication device 166.

The CPU 150 functions as an arithmetic processing device and a control device, and controls the overall operation in the information processing system 10 according to various programs. Furthermore, the CPU 150 can also realize the functions of the processing unit 100 and the display processing unit 122 in the information processing system 10. The CPU 150 can be configured by a processor such as a microprocessor.

The ROM 152 stores a program and control data such as calculation parameters used by the CPU 150, and the like.

The RAM 154 temporarily stores the program to be executed by the CPU 150, or the like, for example.

The bus 156 is configured by a CPU bus and the like. The bus 156 connects the CPU 150, the ROM 152, and the RAM 154 to one another.

The interface 158 connects the input device 160, the output device 162, the storage device 164, and the communication device 166 to the bus 156.

The input device 160 includes input means (for example, a touch panel, a button, a switch, a dial, a lever, a microphone, or the like) for the user to input information. Moreover, the input device 160 includes an input control circuit or the like, that generates an input signal on the basis of an input by the user and outputs the input signal to the CPU 150. The input device 160 can realize the function of the input unit 120 in the information processing system 10.

The output device 162 includes, for example, a display device such as a projector, a liquid crystal display device, an organic light emitting diode (OLED) device, or a lamp. Furthermore, the output device 162 includes a sound output device such as a speaker. The output device 162 can realize the function of the output unit 124 in the information processing system 10.

The storage device 164 is a device for storing data. The storage device 164 includes a storage medium, a recording device that records data in the storage medium, a reading device that reads data from the storage medium, a deletion device that deletes data recorded in the storage medium, or the like. The storage device 164 can realize the function of the storage unit 128 in the information processing system 10.

The communication device 166 is a communication interface configured by a communication device for being connected to the communication network 22. Furthermore, the communication device 166 may be a wireless LAN compatible communication device, a long term evolution (LTE) compatible communication device, or a wire communication device performing communication by wire. The communication device 166 can realize the function of the communication unit 126 in the information processing system 10.

23. Modifications

The favorable embodiments of the present disclosure have been described in detail with reference to the accompanying drawings, but the present disclosure is not limited to such examples. It is obvious that persons having ordinary knowledge in the technical field to which the present disclosure belongs can conceive various modifications or alterations within the scope of the technical idea described in the claims, and the modifications and alterations are naturally understood to belong to the technical scope of the present disclosure.

23-1. First Modification

The configuration of the information processing system 10 according to each embodiment is not limited to the example described above. For example, although FIG. 9 illustrates an example in which the display processing unit 122 and the processing unit 100 are separately provided, the present invention is not limited to the example, and the display processing unit 122 and the processing unit 100 may be integrally configured.

Furthermore, although FIG. 9 illustrates an example in which the information acquisition unit 106 is included in the processing unit 100, the present invention is not limited to the example, and the information acquisition unit 106 may be integrally configured with the input unit 120 or the display processing unit 122.

23-2. Second Modification

An apparatus (information processing apparatus) including the processing unit 100 according to each embodiment may include one or more of the input unit 120, the display processing unit 122, or the output unit 124. For example, the information processing apparatus may be a projector including the processing unit 100, the display processing unit 122, and the output unit 124.

Alternatively, the information processing apparatus may be integrally configured with the table 90. Alternatively, the information processing apparatus may be connected to at least one of the input unit 120, the display processing unit 122, and the output unit 124 via the communication network 22. For example, the information processing apparatus may be a server, a general-purpose personal computer (PC), a tablet terminal, a game machine, a mobile phone such as a smartphone, a portable music player, a television receiver, for example, a head mounted display (HMD), augmented reality (AR) glasses, a wearable device such as a smart watch, a robot, or the like.

23-3. Third Modification

The steps in the flow of the processing described above may not necessarily be processed in the described order. For example, the steps may be processed in an appropriately changed order. Furthermore, the steps may be partially processed in parallel or individually instead of being chronologically processed. Furthermore, some of the described steps may be omitted or another step may be added.

Furthermore, according to each embodiment described above, a computer program for causing the hardware such as the CPU 150, the ROM 152, and the RAM 154 to exhibit functions equivalent to the functions of the configurations of the information processing system 10 (particularly the processing unit 100) according to each embodiment described above. Furthermore, a storage medium that has stored the computer program can be provided.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that following configurations also belong to the technical scope of the present disclosure.

(1)

An information processing system including:

an information acquisition unit configured to acquire first transmission information according to an operation of an operation body related to a first user located in a first place, the first transmission information being for communication with a second user located in a second place; and an output control unit configured to display, on a display surface in the second place, an image corresponding to the operation body generated on the basis of a pointing position of the operation body in the second place and a first virtual position of the first user in the second place, the pointing position and the first virtual position being specified on the basis of the first transmission information.

(2)

The information processing system according to (1), in which a second virtual position of the first user between the pointing position of the operation body in the second place and the first virtual position of the first user in the second place is further specified on the basis of the first transmission information, and the image corresponding to the operation body is generated further on the basis of the second virtual position of the first user.

(3)

The information processing system according to (2), in which the information acquisition unit further acquires a sensing result of at least one object located on a display surface in the first place, and the output control unit further displays an image corresponding the at least one object on the display surface in the second place.

(4)

The information processing system according to (3), in which the operation body related to the first user is a hand of the first user, and in a case where an operation to move the at least one object is specified on the basis of the first transmission information, the output control unit moves a display position of the image corresponding to the at least one object according to the specified operation.

(5)

The information processing system according to (2) or (3), in which the operation body related to the first user is a hand of the first user, the pointing position of the operation body is a pointing position of the hand of the first user, and in a case where the hand of the first user having been slid on the display surface in the first place is specified on the basis of the first transmission information, the output control unit further displays an image indicating a locus of the pointing position of the hand of the first user being slid on the display surface in the second place.

(6)

The information processing system according to any one of (2) to (5), in which the operation body related to the first user is a hand of the first user, the pointing position of the operation body is a pointing position of the hand of the first user, in a case where a relationship among the pointing position of the hand of the first user, the second virtual position of the first user, and the first virtual position of the first user becomes a predetermined relationship, the first virtual position of the first user and/or the second virtual position of the first user are corrected on the basis of the pointing position of the hand of the first user, and the output control unit displays an image corresponding to the operation body generated on the basis of the pointing position of the hand of the first user, the second virtual position of the first user after the correction, and the first virtual position of the first user after the correction on the display surface in the second place.

(7)

The information processing system according to any one of (2) to (6), in which the operation body related to the first user is a hand of the first user, the pointing position of the operation body is a pointing position of the hand of the first user, in a case where a distance between the second virtual position of the first user and the first virtual position of the first user becomes larger than a predetermined distance, the pointing position of the hand of the first user and the second virtual position of the first user are each corrected on the basis of the first virtual position of the first user, and the output control unit displays an image corresponding to the operation body generated on the basis of the pointing position of the hand of the first user after the correction, the second virtual position of the first user after the correction, and the first virtual position of the first user on the display surface in the second place, and further displays an image indicating the pointing position of the hand of the first user before correction in association with the image corresponding to the operation body on the display surface in the second place.

(8)

The information processing system according to any one of (2) to (7), in which the first transmission information further includes attribute information of the first user, and the output control unit changes a value of a display parameter of the image corresponding to the operation body according to the attribute information of the first user.

(9)

The information processing system according to any one of (2) to (8), in which the information acquisition unit further acquires information indicating familiarity between the first user and the second user, and the output control unit changes a display mode of the image corresponding to the operation body according to the familiarity between the first user and the second user.

(10)

The information processing system according to any one of (2) to (9), in which the operation body related to the first user is a hand of the first user, the first transmission information further includes a sensing result of a height of the hand of the first user with reference to a display surface in the first place, and the output control unit changes a value of a display parameter of the image corresponding to the operation body according to the sensing result of the height of the hand of the first user.

(11)

The information processing system according to any one of (1) to (10), in which the operation body related to the first user is a hand of the first user, the pointing position of the operation body is a pointing position of the hand of the first user, the information acquisition unit further acquires, regarding each of a plurality of users located in a plurality of places including the first place and other than the second place, transmission information corresponding to the user according to an operation of a hand of the user, the transmission information being for communication with the second user, regarding the each of a plurality of users, a pointing position of the hand of the user in the second place and a first virtual position of the user in the second place are specified on the basis of the transmission information corresponding to the user, and regarding the each of a plurality of users, the output control unit displays an image corresponding to the hand of the user generated on the basis of the pointing position of the hand of the user and the first virtual position of the user in the second place, on a display surface in the second place, and in a case where a relationship among first virtual positions of the plurality of users in the second place becomes a predetermined relationship, the output control unit changes, regarding the each of a plurality of users, the display position of the image corresponding to the hand of the user according to a place where the user is located.

(12)

The information processing system according to any one of (2) to (11), in which the operation body related to the first user is a hand of the first user, the pointing position of the operation body is a pointing position of the hand of the first user, in a case where a relationship between the first virtual position of the first user and a position of the second user in the second place becomes a predetermined relationship, the first virtual position of the first user is corrected on the basis of the position of the second user and the pointing position of the hand of the first user, and the output control unit displays an image corresponding to the operation body generated on the basis of the pointing position of the hand of the first user and the first virtual position of the first user after the correction on the display surface in the second place.

(13)

The information processing system according to any one of (2) to (12), in which the operation body related to the first user is an operation device used by the first user, the first virtual position of the first user in the second place is determined on the basis of a pointing position of the operation body in the second place, in a case where the pointing position of the operation body is changed, the first virtual position of the first user is changed following the change by an amount smaller than a change amount of the pointing position of the operation body, and the output control unit displays an image corresponding to the operation body generated on the basis of the pointing position of the operation body after the change and the first virtual position of the first user after the change, on the display surface in the second place.

(14)

The information processing system according to any one of (2) to (13), in which the operation body related to the first user is a hand of the first user, the image corresponding to the operation body is an image indicating the hand of the first user, the first transmission information includes a sound collection result of an utterance of the first user, and the output control unit changes a display mode of the image indicating the hand of the first user according to the sound collection result of an utterance of the first user.

(15)

The information processing system according to any one of (2) to (14), in which the operation body related to the first user is a hand of the first user, the image corresponding to the operation body is an image indicating the hand of the first user, the first transmission information further includes information indicating spatial distribution of a volume sensed in the first place, and the output control unit further displays an image indicating an utterance situation of the first user according to the spatial distribution of a volume sensed in the first place and the first virtual position of the first user, on the display surface in the second place.

(16)

The information processing system according to any one of (2) to (15), in which the first transmission information includes a sound collection result of an utterance of the first user, and the output control unit further displays a sound recognition result for the sound collection result of an utterance of the first user in association with the image corresponding to the operation body or the pointing position of the operation body in the second place on the display surface in the second place.

(17)

The information processing system according to any one of (2) to (16), in which the first transmission information further includes a sound collection result of an utterance of the first user and information indicating spatial distribution of a volume sensed in the first place, a plurality of sound output control units is arranged in the second place, and the output control unit further causes the plurality of sound output units to output the sound collection result of an utterance of the first user according to the spatial distribution of a volume sensed in the first place.

(18)

The information processing system according to any one of (2) to (17), in which the first transmission information includes a sound collection result of an utterance of the first user, and when the first user having uttered is detected, the output control unit displays an image corresponding to a first object arranged in the first place and an image corresponding to a second object arranged in a place other than the first place on the display surface in the second place such that the image corresponding to a first object has higher visibility than the image corresponding to a second object.

(19)

An information processing method including:

acquiring first transmission information according to an operation of an operation body related to a first user located in a first place, the first transmission information being for communication with a second user located in a second place; and displaying, by a processor, on a display surface in the second place, an image corresponding to the operation body generated on the basis of a pointing position of the operation body in the second place and a first virtual position of the first user in the second place, the pointing position and the first virtual position being specified on the basis of the first transmission information.

(20)

A program for causing a computer to function as:

an information acquisition unit configured to acquire first transmission information according to an operation of an operation body related to a first user located in a first place, the first transmission information being for communication with a second user located in a second place; and an output control unit configured to display, on a display surface in the second place, an image corresponding to the operation body generated on the basis of a pointing position of the operation body in the second place and a first virtual position of the first user in the second place, the pointing position and the first virtual position being specified on the basis of the first transmission information.

(21)

An information processing system including:

an information acquisition unit configured to acquire first transmission information according to an operation of an operation body related to a first user located in a first place, the first transmission information being for communication with a second user located in a second place, and a imaged video of a space including the first user imaged in a period including an operation time of the operation body, and an output control unit configured to display, on a first display surface in the second place, an image corresponding to the operation body generated on the basis of a pointing position of the operation body in the second place and a first virtual position of the first user in the second place, the pointing position and the first virtual position being specified on the basis of the first transmission information, and displays the imaged video on a second surface in the second place.

REFERENCE SIGNS LIST

10 Information processing system
20 Screen
22 Communication network
90 Table
100 Processing unit
102 Information generation unit
104 Transmission control unit
106 Information acquisition unit
108 Output control unit
120 Input unit
122 Display processing unit
124 Output unit
126 Communication unit
128 Storage unit
130 Information generation and reproduction rule DB
132 Information conformity rule DB

The invention claimed is:

1. An information processing system comprising:
circuitry configured to
acquire first transmission information according to an operation of an operation body related to a first user located in a first place, the first transmission information being for communication with a second user located in a second place;
initiate display, in the second place, of an image corresponding to the operation body generated on a basis of a pointing position of the operation body in the first place, the pointing position being specified on a basis of the first transmission information; and
initiate display, in the second place, of an image indicating a locus of the pointing position of the operation body in a case where the operation body in the first place having been moved is specified on a basis of the first transmission information.

2. The information processing system according to claim 1, wherein
the circuitry is further configured to
acquire a sensing result of at least one object located in the first place, and
initiate display of an image corresponding the at least one object in the second place.

3. The information processing system according to claim 2, wherein
the operation body related to the first user is a hand of the first user, and in a case where an operation to move the at least one object is specified on a basis of the first transmission information, the circuitry is configured to move a display position of the image corresponding to the at least one object according to the specified operation.

4. The information processing system according to claim 1, wherein
the operation body related to the first user is a hand of the first user,
the pointing position of the operation body is a pointing position of the hand of the first user, and
in a case where the hand of the first user having been slid on a display surface in the first place is specified on a basis of the first transmission information, the circuitry is configured to initiate display of the image indicating the locus of the pointing position of the hand of the first user being slid on a display surface in the second place.

5. The information processing system according to claim 1, wherein
the first transmission information includes attribute information of the first user, and
the circuitry changes a value of a display parameter of the image corresponding to the operation body according to the attribute information of the first user.

6. The information processing system according to claim 1, wherein the circuitry
further acquires information indicating familiarity between the first user and the second user, and
changes a display mode of the image corresponding to the operation body according to the familiarity between the first user and the second user.

7. The information processing system according to claim 1, wherein
the operation body related to the first user is a hand of the first user,
the first transmission information includes a sensing result of a height of the hand of the first user with reference to a display surface in the first place, and
the circuitry changes a value of a display parameter of the image corresponding to the operation body according to the sensing result of the height of the hand of the first user.

8. The information processing system according to claim 1, wherein
the operation body related to the first user is a hand of the first user,
the image corresponding to the operation body is an image indicating the hand of the first user,
the first transmission information includes a sound collection result of an utterance of the first user, and
the circuitry changes a display mode of the image indicating the hand of the first user according to the sound collection result of the utterance of the first user.

9. The information processing system according to claim 1, wherein
the operation body related to the first user is a hand of the first user,
the image corresponding to the operation body is an image indicating the hand of the first user,
the first transmission information includes information indicating spatial distribution of a volume sensed in the first place, and
the circuitry is further configured to initiate display, in the second place, of an image indicating an utterance situation of the first user according to the spatial distribution of the volume sensed in the first place.

10. The information processing system according to claim 1, wherein
the first transmission information includes a sound collection result of an utterance of the first user, and
the circuitry is further configured to initiate display, in the second place, of a sound recognition result for the sound collection result of the utterance of the first user in association with the image corresponding to the operation body or the pointing position of the operation body in the second place on a display surface.

11. The information processing system according to claim 1, wherein
the first transmission information includes a sound collection result of an utterance of the first user and information indicating spatial distribution of a volume sensed in the first place,
a plurality of speakers is arranged in the second place, and
the circuitry is further configured to cause the plurality of speakers to output the sound collection result of the utterance of the first user according to the spatial distribution of the volume sensed in the first place.

12. The information processing system according to claim 1, wherein
the first transmission information includes a sound collection result of an utterance of the first user, and
when the first user having uttered is detected, the circuitry initiates display, in the second place, of an image corresponding to a first object arranged in the first place and an image corresponding to a second object arranged in a place other than the first place such that the image corresponding to the first object has higher visibility than the image corresponding to the second object.

13. An information processing method comprising:
acquiring first transmission information according to an operation of an operation body related to a first user located in a first place, the first transmission information being for communication with a second user located in a second place;
displaying, by a processor, in the second place, an image corresponding to the operation body generated on a basis of a pointing position of the operation body in the first place, the pointing position being specified on a basis of the first transmission information; and
displaying, in the second place, an image indicating a locus of the pointing position of the operation body in a case where the operation body in the first place having been moved is specified on a basis of the first transmission information.

14. A non-transitory computer-readable medium having embodied thereon a program, which when executed by a computer causes the computer to execute a method, the method comprising:
acquiring first transmission information according to an operation of an operation body related to a first user located in a first place, the first transmission information being for communication with a second user located in a second place;
displaying, in the second place, an image corresponding to the operation body generated on a basis of a pointing position of the operation body in the first place, the pointing position being specified on a basis of the first transmission information; and
displaying, in the second place, an image indicating a locus of the pointing position of the operation body in a case where the operation body in the first place having been moved is specified on a basis of the first transmission information.

* * * * *